United States Patent [19]

Yamada et al.

[11] Patent Number: 5,224,157
[45] Date of Patent: Jun. 29, 1993

[54] MANAGEMENT SYSTEM FOR MANAGING MAINTENANCE INFORMATION OF IMAGE FORMING APPARATUS

[75] Inventors: Hirokazu Yamada; Kanako Hamano; Hideo Ito, all of Osaka, Japan

[73] Assignee: Minolta Camera Kabushiki Kaisha, Osaka, Japan

[21] Appl. No.: 526,900

[22] Filed: May 22, 1990

[30] Foreign Application Priority Data

| May 22, 1989 | [JP] | Japan | 1-128022 |
| May 22, 1989 | [JP] | Japan | 1-128023 |
| May 22, 1989 | [JP] | Japan | 1-128024 |
| Aug. 2, 1989 | [JP] | Japan | 1-200719 |
| Aug. 2, 1989 | [JP] | Japan | 1-200720 |
| Aug. 2, 1989 | [JP] | Japan | 1-200721 |
| Aug. 2, 1989 | [JP] | Japan | 1-200722 |

[51] Int. Cl.⁵ ........................................ H04M 11/00
[52] U.S. Cl. .................................. 379/100; 379/106; 355/206
[58] Field of Search ............... 379/100, 102, 106, 107, 379/93, 96-98, 274, 386; 355/202-206

[56] References Cited

U.S. PATENT DOCUMENTS

| 3,997,873 | 12/1976 | Thorton | 355/201 |
| 4,086,434 | 4/1978 | Bocchi | 379/91 |
| 4,104,486 | 8/1978 | Martin et al. | |
| 4,162,396 | 7/1979 | Howard et al. | 235/304 |
| 4,167,322 | 9/1979 | Yano et al. | 355/3 R |
| 4,173,408 | 11/1979 | Stewart | 355/202 |
| 4,179,212 | 12/1979 | Lahr | 355/202 |
| 4,241,237 | 12/1980 | Paraskevakos et al. | |
| 4,322,813 | 3/1982 | Howard et al. | |
| 4,361,851 | 11/1982 | Asip et al. | 358/84 |
| 4,390,953 | 6/1983 | Johnstone | 364/474 |
| 4,398,819 | 8/1983 | Schron | 355/14 R |
| 4,496,237 | 1/1985 | Schron | 355/14 C |
| 4,497,037 | 1/1985 | Kato et al. | |
| 4,549,044 | 10/1985 | Durham | 379/106 |
| 4,553,830 | 11/1985 | Nguyen | 355/206 |
| 4,583,834 | 4/1986 | Seko et al. | |
| 4,586,147 | 4/1986 | Tadokoro | 364/550 |
| 4,589,080 | 5/1986 | Abbott et al. | 364/552 |
| 4,686,699 | 8/1987 | Wilkie | 379/93 |
| 4,739,366 | 4/1988 | Braswell et al. | |
| 4,766,548 | 8/1988 | Cedrone et al. | 364/479 |
| 4,797,706 | 1/1989 | Sugishima et al. | 355/14 R |
| 4,821,312 | 4/1989 | Horton et al. | 379/102 |
| 4,893,248 | 1/1990 | Pitts et al. | 364/464.01 |
| 4,937,621 | 6/1990 | Shimizu et al. | 355/206 |
| 4,979,132 | 12/1980 | Sugimoto | 364/520 |
| 4,994,926 | 2/1991 | Gordon et al. | 358/400 |
| 4,996,703 | 2/1991 | Gray | 379/40 |
| 4,999,672 | 3/1991 | Rice, Jr. et al. | 355/202 |
| 5,023,817 | 6/1991 | Au et al. | 364/550 |
| 5,057,866 | 10/1991 | Hill, Jr. et al. | 355/200 |
| 5,077,581 | 12/1991 | Suzuki | 355/200 |
| 5,077,582 | 12/1991 | Kravette et al. | 356/206 |
| 5,081,680 | 1/1992 | Bennett | 380/50 |
| 5,084,875 | 1/1992 | Weinberger et al. | 371/291 |

FOREIGN PATENT DOCUMENTS

| 59-142559 | 8/1984 | Japan. | |
| 60-90460 | 5/1985 | Japan | 379/106 |
| 63-301667 | 12/1988 | Japan. | |

OTHER PUBLICATIONS

Research Newsletter published by Dataquest, "Remote Diagnostics—Took Kit of the Future", 1989, pp. 1-6.

Primary Examiner—James L. Dwyer
Assistant Examiner—Wing F. Chan
Attorney, Agent, or Firm—Burns, Doane, Swecker & Mathis

[57] ABSTRACT

There is disclosed a management system comprising an information management apparatus for managing maintenance information of image forming apparatuses, and a transmitter connected to the image forming apparatuses. In the management system, the transmitter transmits the maintenance information to the information management apparatus through a telephone line and an exchange unit, and a line controller connects the telephone to the telephone line so as to speak using the telephone normally, and further, cancels the connection of the telephone to the telephone line and connects the transmitter to the telephone line when the transmitter transmits the maintenance information to the information management apparatus.

41 Claims, 51 Drawing Sheets

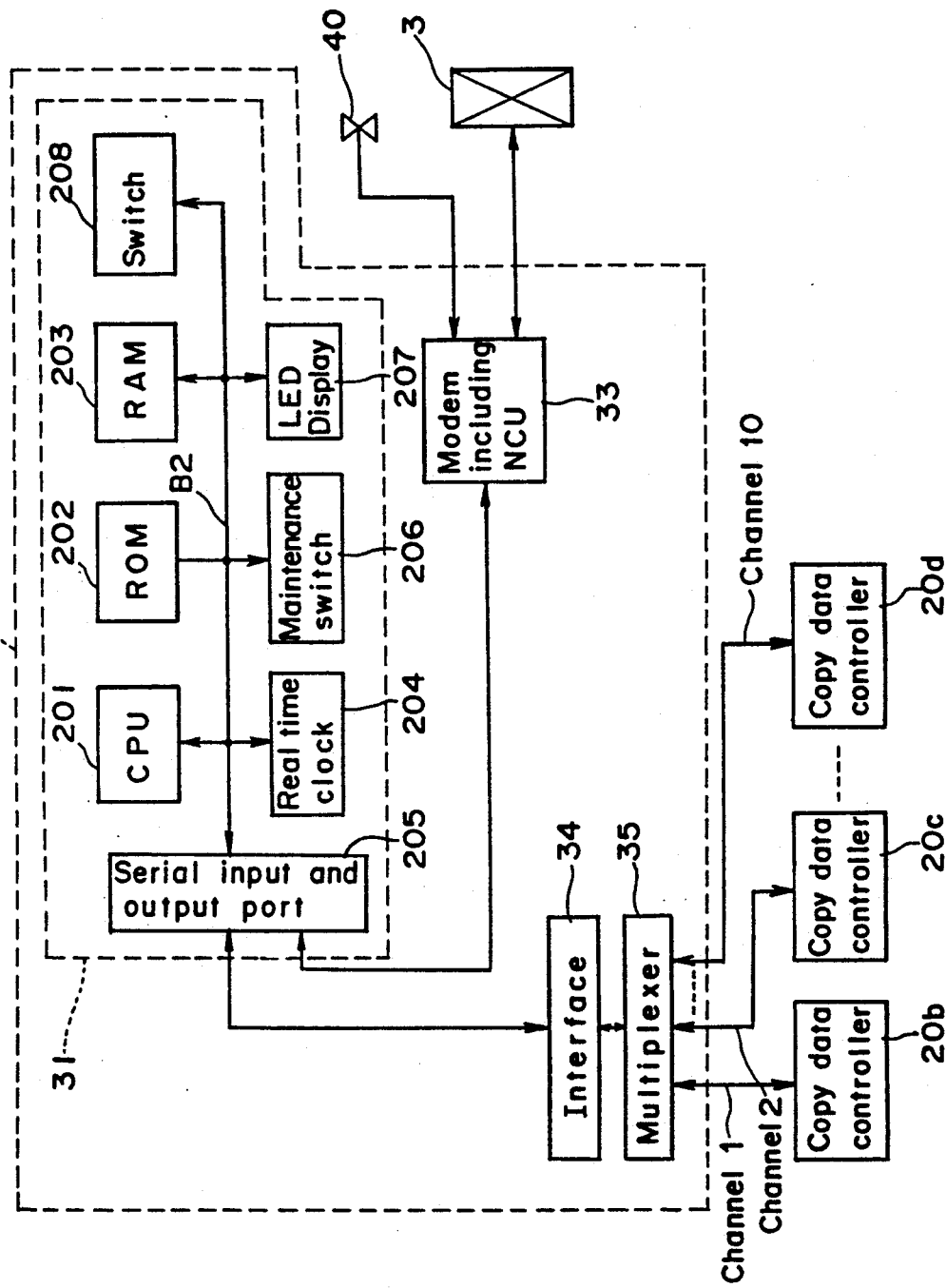

Fig. 6b

| Display of LEDs L1 to L10 | Selection item | Operation method |
|---|---|---|
| ⓞ●●●●●●●●● (Year: 1,2; Month: 3,4; Day of week: 5,6; Hour: 7,8; Min: 9,10)<br>1 2 3 4 5 6 7 8 9 10 | 10 years (1st digit) | SEL = 8 + ADJ |
| ●ⓞ●●●●●●●● | 1 year (2nd digit) | SEL = 9 + ADJ |
| ●●ⓞ●●●●●●● | 10 months (3rd digit) | SEL = 0 + ADJ |
| ●●●ⓞ●●●●●● | 1 month (4th digit) | SEL = 3 + ADJ |
| ●●●●ⓞ●●●●● | 10 days (5th digit) | SEL = 1 + ADJ |
| ●●●●●ⓞ●●●● | 1 day (6th digit) | SEL = 4 + ADJ |
| ●●●●●●ⓞ●●● | 10 hours (7th digit) | SEL = 1 + ADJ |
| ●●●●●●●ⓞ●● | 1 hour (8th digit) | SEL = 4 + ADJ |
| ●●●●●●●●ⓞ● | 10 minutes (9th digit) | SEL = 2 + ADJ |
| ●●●●●●●●●ⓞ | 1 minute (10th digit) | SEL = 8 + ADJ |
| ⓞ●●●●●●●●● | 11th digit | |
| ⋮ | ⋮ | |
| ●●●●●●●●ⓞⓞ | 19th digit | |

Fig. 12a
Data of number of all copies

| Receipt command | Serial No. | Number of all copies |
|---|---|---|

Fig. 12b
Data of number of times of occurrence of paper jam in respective positiones

| Receipt command | Position code | No.of times of occurrence of paper jam | Position code | No.of times of occurrence of paper jam | ... | Position code | No.of times of occurrence of paper jam |
|---|---|---|---|---|---|---|---|

Fig. 12c
Data of number of times of occurrence of trouble in respective positiones

| Receipt command | Position code | No.of times of occurrence of trouble | Position code | No.of times of occurrence of trouble | ... | Position code | No.of times of occurrence of trouble |
|---|---|---|---|---|---|---|---|

Fig. 12d
Data of number of copies of respective sizes in respective sections

| Receipt command | Section code | Number of copies | | | | | ... | Section code | Number of copies | | | | |
|---|---|---|---|---|---|---|---|---|---|---|---|---|---|
| | | Size1 | Size2 | Size3 | Size4 | Size5 | | | size1 | size2 | size3 | size4 | size5 |

Fig. 12e
Time data

| Receipt command | Year | Month | Day | Hour | Min. | Sec. |
|---|---|---|---|---|---|---|

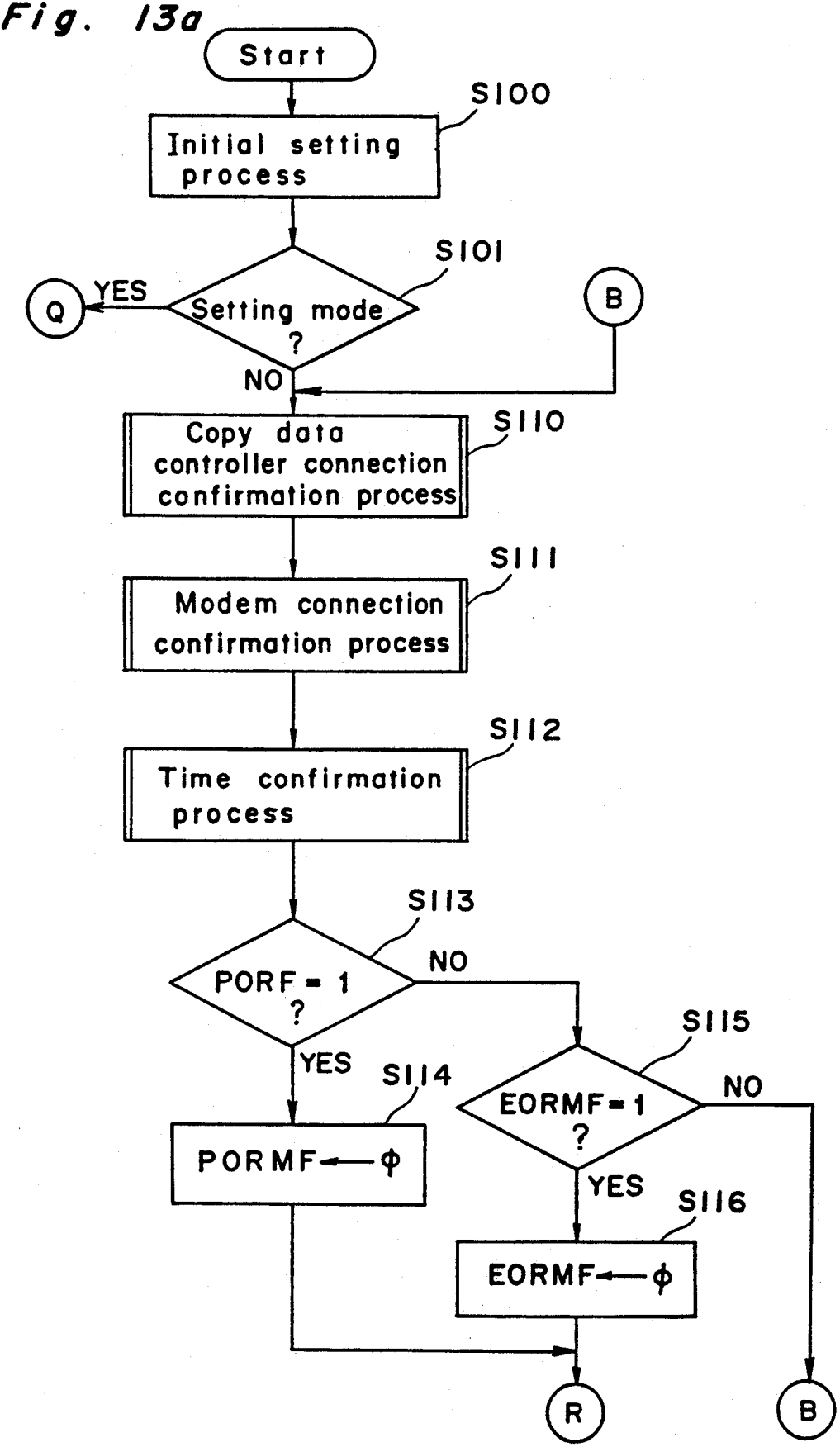

MANAGEMENT SYSTEM FOR MANAGING MAINTENANCE INFORMATION OF IMAGE FORMING APPARATUS

BACKGROUND OF THE INVENTION

1. Field of the Invention

The present invention relates to a management system for managing maintenance information of image forming apparatuses such as copying machinees, printers, more particularly, to a management system for managing maintenance information of image forming apparatuses wherein a host computer is connected through a communication line to the image forming apparatuses.

2. Description of Related Art

Conventionally, there has been put into practice a remote diagnosis system having a polling communication system for collecting maintenance data of copying machines by transmitting them from respective terminal units of copying machines to a central host computer through telephone lines. In the remote diagnosis system, each terminal unit of a copying machine transmits the maintenance data to the central host computer when the number of copies becomes a predetermined value.

In order to construct the conventional remote diagnosis system, it is necessary to extend the telephone lines only for this remote diagnosis system. Therefore, the construction cost thereof is expensive. Further, there is such a problem that the efficiency of utilization of the telephone lines is relatively low since each terminal unit of the copying machine transmits the maintenance data to the central host computer when the number of copies becomes the predetermined value.

Furthermore, in the conventional remote diagnosis system of this type, each terminal unit cannot call the host computer. Therefore, for example, each terminal unit cannot inform the host computer of a maintenance timing which is judged based on the number of times of troubles caused in the copying machine, the operation time thereof, and an accumulated number of copies thereof.

SUMMARY OF THE INVENTION

An essential object of the present invention is to provide an improved management system for managing maintenance information of image forming apparatuses.

Another object of the present invention is to provide a management system for managing maintenance information of image forming apparatuses utilizing a telephone line, which is capable of being constructed without extending a telephone line.

A further object of the present invention is to provide a management system for managing maintenance information of image forming apparatuses which is a construction cost lower than the conventional system.

A still further object of the present invention is to provide a management system for managing maintenance information of image forming apparatuses which has a high efficiency of utilization of the communication line for transmitting maintenance information data of the image forming apparatus.

A still more further object of the present invention is to provide a management system for correctly managing maintenance information of plural image forming apparatuses.

A more further object of the present invention is to provide a management system for managing maintenance information of image forming apparatuses having an occupied time of a communication line for transmitting maintenance information data of the image forming apparatuses which is shorter than that of the conventional system.

A more still further object of the present invention is to provide a management system for managing maintenance information of image forming apparatuses having an operation efficiency of the image forming apparatuses which is higher than that of the conventional system.

A more still more further object of the present invention is to provide a management system for managing maintenance information of image forming apparatuses which is capable of transmitting necessary maintenance information data at a suitable timing from the image forming apparatuses to a host computer.

A furthermore another object of the present invention is to provide a management system for managing maintenance information of image forming apparatuses which is capable of being operated with a simple operation.

A still furthermore another object of the present invention is to provide a method provided for a management system for managing maintenance information of plural image forming apparatuses having an operation efficiency of the image forming apparatuses which is higher than that of the conventional system.

A more still furthermore another object of the present invention is to provide a method provided for a management system for managing maintenance information of plural image forming apparatuses which is capable of transmitting necessary maintenance information data at a suitable timing from the image forming apparatuses to a host computer.

In order to accomplish the above objects, according to one aspect of the present invention, there is provided a management system for managing maintenance information of image forming apparatuses comprising:

an image forming apparatus for forming an image on a piece of paper;

a telephone connected to another telephone through a telephone line and an exchange unit;

an information management apparatus for managing maintenance information of said image forming apparatuses;

transmission means connected to said image forming apparatuses, said transmission means transmitting said maintenance information to said information management apparatus through said telephone line and said exchange unit; and connection means for connecting said telephone to said telephone line so as to speak using said telephone normally, and for canceling the connection of said telephone to said telephone line and connecting said transmission means to said telephone line when said transmission means transmits said maintenance information to said information management apparatus.

According to another aspect of the present invention, there is provided a management system for managing maintenance information of image forming apparatuses comprising:

image forming apparatuses;

an information management apparatus connected to a telephone line, said information management apparatus managing maintenance information of said image forming apparatuses; and transmission control means connected to said image forming apparatuses and said telephone line, said transmission control means comprising:

count means for counting a present time;

storage means for storing a predetermined origination time;

origination means for originating to said information management apparatus when said present time counted by said count means coincides with said predetermined origination time; and means for transmitting said maintenance information to said information management apparatus after it becomes possible to communicate with said information management apparatus.

According to a further aspect of the present invention, there is provided a management system for managing maintenance information of image forming apparatuses comprising:

image forming apparatuses;

an information management apparatus for managing maintenance information of said image forming apparatuses; and transmission means connected to said image forming apparatuses, said transmission means transmitting said maintenance information to said information management apparatus through a telephone line;

said transmission means comprising:

first means for transmitting said maintenance information to said information management apparatus when a first condition for transmitting said maintenance information is effected; and second means for transmitting said maintenance information to said information management apparatus when a second condition which is different from said first condition is effected;

wherein said first means transmits said maintenance information after waiting for a predetermined time when said telephone is being used in the case that said first condition is effected, and said second means supervises the using state of said telephone line when said telephone line is being used in the case that said second condition is effected, and transmits said maintenance information as soon as said telephone line is not being used.

According to a still further aspect of the present invention, there is provided a management system for managing maintenance information of image forming apparatuses comprising:

image forming apparatuses;

an information management apparatus for managing maintenance information of said image forming apparatuses;

transmission means connected to said image forming apparatuses, said transmission means transmitting said maintenance information to said information management apparatus through a telephone line;

first transmission request means connected to said image forming apparatuses and said transmission means, said first transmission request means regularly requesting said transmission means to transmit said maintenance information; and second transmission request means connected to said image forming apparatus and said transmission means, said second transmission request means unregularly requesting said transmission means to transmit said maintenance information;

wherein said transmission means transmits said maintenance information when requested by said first and second transmission request means, and executes one of controls which are different from each other depending on said regular request of said first transmission request means or said unregular request of said second transmission request means when said telephone line is being used in the case of said transmission request.

According to a still more further aspect of the present invention, there is provided a management system for managing maintenance information of image forming apparatuses comprising;

plural image forming apparatuses;

an information management apparatus for managing maintenance information of each of said image forming apparatuses;

plural transmission means for transmitting said maintenance information to said information management apparatus through telephone lines, each of said transmission means respectively connected to each of said image forming apparatuses, each of said transmission means being operable in a first processing mode for transmitting said maintenance information and a second processing mode for executing a process other than said transmission process;

origination means for execute an origination process so as to connect each of said transmission means to said information management apparatus; and control means for controlling each of said transmission means and said origination means to enabling said origination means to execute said origination process after setting in said processing mode all of said transmission means from which said maintenance information is to be transmitted upon transmitting said maintenance information.

According to a more further aspect of the present invention, there is provided a management system for managing maintenance information of image forming apparatuses comprising:

plural image forming apparatuses;

an information management apparatus for managing maintenance information of each of said plural image forming apparatuses;

plural transmission means for transmitting said maintenance information to said information management apparatus through telephone lines, each of said plural transmission means being respectively connected to each of said plural image forming apparatuses, each of plural transmission means being operable in a first processing mode for transmitting said maintenance information and a second processing mode for executing a process other than said transmission process;

origination means for executing an origination process so as to connect said information management apparatus to each of said plural transmission means through a telephone line; and control means for controlling each of said plural transmission means to set them in said first processing mode after executing said origination process upon transmitting said maintenance information.

According to a more still further aspect of the present invention, there is provided a management system for managing maintenance information of image forming apparatuses comprising:

plural image forming apparatuses;

an information management apparatus for managing maintenance information of each of said plural image forming apparatuses;

plural transmission means for transmitting said maintenance information to said information management apparatus, each of plural transmission means being respectively connected to each of said plural image forming apparatus, each of said plural transmission means being operable in a first processing mode for transmitting said maintenance information and in a second processing mode for executing a process other than said transmission process;

communication means for communicating with said information management apparatus through a telephone line;

origination means for executing an origination process so as to connect said information management apparatus to said communication means through said telephone line;

connection means for sequentially connecting each of said plural transmission means to said communication means one by one so as to transmit said maintenance information from said transmission means to said information management apparatus when said telephone line is connected between said communication means and said information management apparatus; and control means for controlling each of said plural transmission means so as to set it in said first processing mode after said telephone line is connected between said communication means and said information management apparatus by said origination process upon transmitting said maintenance information.

According to a more still more further aspect of the present invention, in a management system for managing maintenance information of plural image forming apparatuses, there is provided a method for transmitting maintenance information of each of said plural image forming apparatuses from each of plural data control apparatuses respectively connected to each of said plural image forming apparatuses to an information management apparatus through a communication line, including steps of:

prohibiting said plural image forming apparatuses from executing an image forming process; and connecting each of said plural data control apparatuses to said information management apparatus through said telephone line after completing said prohibiting step.

According to a furthermore another aspect of the present invention, in a management system for managing maintenance information of at least two image forming apparatuses, there is provided a method for transmitting maintenance information of first and second image forming apparatuses from first and second data control apparatuses respectively connected to said first and second image forming apparatuses to an information management apparatus through a communication line, including steps of:

prohibiting said first and second image forming apparatuses from executing an image forming process;

connecting said first data control apparatus to said information management apparatus through said communication line after completing said prohibiting step;

executing a communication process between said first data control apparatus and said information management apparatus;

disconnecting said communication line between said first data control apparatus and said information management apparatus, and connecting a communication line between said second data control apparatus and said information management apparatus;

executing a communication process between said second data control apparatus and said information management apparatus; and disconnecting said communication line between said second data control apparatus and said information management apparatus.

According to a still furthermore another aspect of the present invention, in a management system for managing maintenance information of at least two image forming apparatuses, there is provided a method for transmitting maintenance information of first and second image forming apparatuses from first and second data control apparatuses respectively connected to said first and second image forming apparatuses to an information management apparatus through an on-line controller and a communication line, including steps of:

connecting said on-line controller to said information management apparatus through said communication line;

prohibiting said first image forming apparatus from executing an image forming process and connecting said first data control means to said on-line controller;

executing a communication process between said first data control apparatus and said information management apparatus;

prohibiting said second image forming apparatus from executing an image forming process and connecting said second data control apparatus to said on-line controller; and executing a communication process between said second data control apparatus and said information management apparatus.

BRIEF DESCRIPTION OF THE DRAWINGS

These and other objects and features of the present invention will become clear from the following description taken in conjunction with the preferred embodiment thereof with reference to the accompanying drawings, in which:

FIG. 5 is a block diagram showing a on-line controller shown in FIG. 1;

FIG. 6b is a front view showing displays of the monitor LEDs L1 to L10 and the operation method of the maintenance switches shown in FIG. 6a;

FIGS. 12a to 12e are diagrams showing formats of all the data which are transmitted from the copy data controller to the center control unit and vice versa;

FIGS. 13a to 13e are flowcharts showing a main routine of the on-line controller shown in FIG. 1;

DETAILED DESCRIPTION OF THE PREFERRED EMBODIMENT

A copy data management system of a preferred embodiment according to the present invention will be described below in an order of the following items with reference to the attached drawings.

Figure 1:
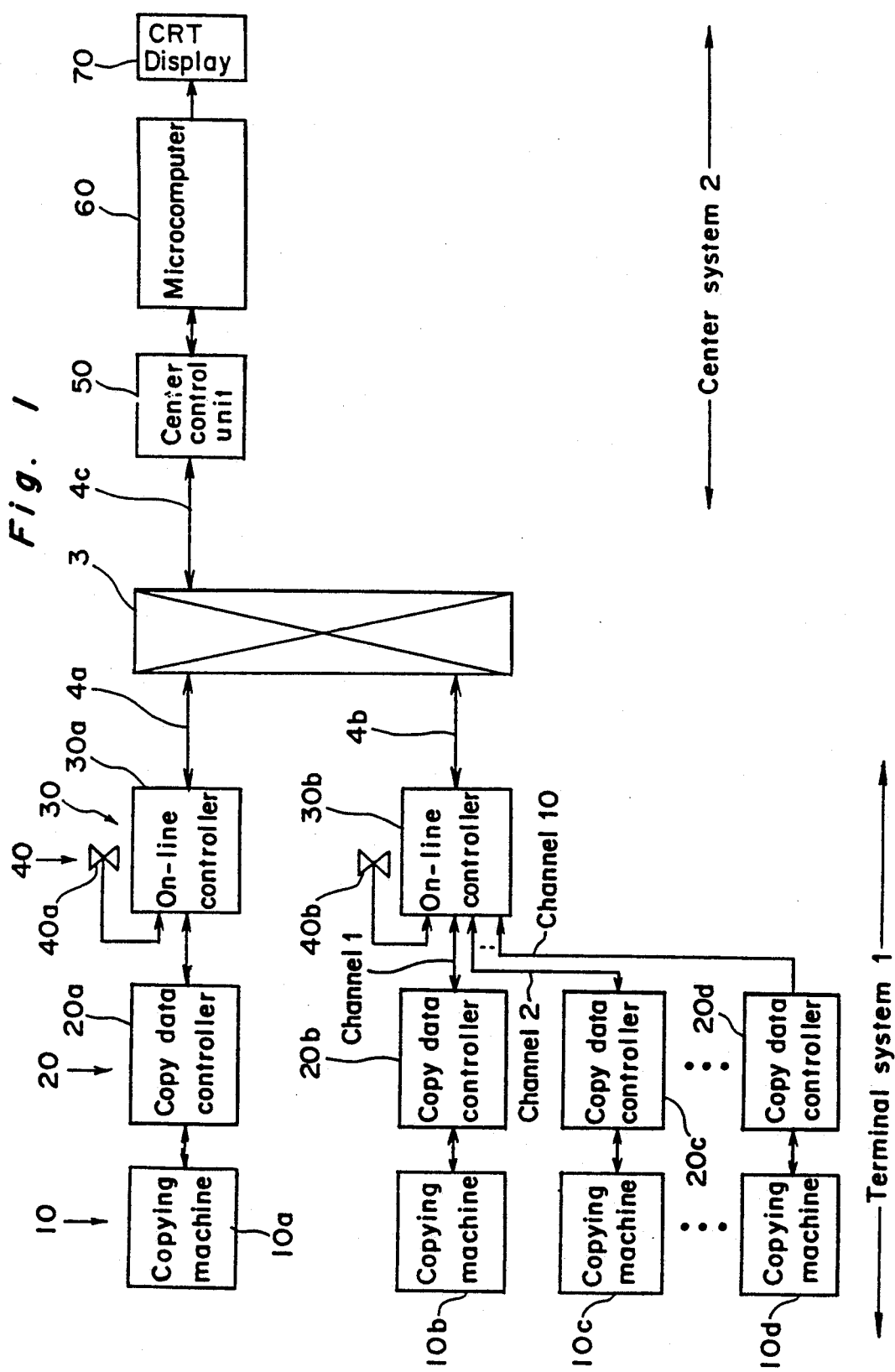
FIG. 1 is schematic block diagram showing a copy data management system of a preferred embodiment according to the present invention.

(1) Composition of Copy data management system
(2) Protocol in First protocol mode and Second protocol mode
(3) Format of Communication data
(4) Process of On-line controller
(5) Process of Copy data controller
(6) Process of Center control unit (1) Composition of Copy Data Management System FIG. 1 shows the copy data management system of the preferred embodiment according to the present invention.

Referring to FIG. 1, the copy data management system for managing maintenance information of copying machines 10a to 10d comprises a terminal system 1 for counting copy data such as the number of copies, the number of times of occurrence of paper jam, the number of times of occurrence of trouble in the copying machines 10a to 10d (generically referred to as copying machines 10 hereinafter), and a center system 2 for summing up the copy data of respective copying machines 10 which are counted by the terminal system 1. The terminal system 1 and the center system 2 are connected through an exchange unit 3 provided by a telecommunication company and subscriber telephone lines 4a, 4b and 4c so as to transmit and receive the above-mentioned copy data.

The terminal system 1 comprises the copying machines, copy data controllers 20a to 20d (generically referred to as copy data controllers 20 hereinafter), on-line controllers 30a and 30b (generically referred to as on-line controllers 30 hereinafter), and telephones 40a and 40b (generically referred to as telephones 40 hereinafter).

The copy data controller 20 is connected one by one to each copying machine 10. The copy data controller 20 counts the copy data of the connected copying machine 10, and detects operation states of the copying machine 10 such as such an operation state whether or not the copying machine 10 is turned on, such an operation state whether or not the copying machine 10 is copying. Further, the copy data controller 20 controls the operation of the connected copying machine 10 so as to permit or prohibit the copying operation thereof responsive to the kind of a magnetic card inserted to the copy data controller 20 and the control processing state which is described later in detail. It is to be noted that each copy data controller 20 has a fixed serial number.

The on-line controller 30 is connected to one or plural copy data controllers 20, and one telephone 40. In a telephone mode, the on-line controller 30 connects the telephone 40 to the exchange unit 3 through the telephone line 4a or 4b. On the other hand, in a communication mode, the on-line controller 30 connects the copy data controller 20 to the center control unit 50 through the exchange unit 3 so as to control the communication between the copy data controller 20 and the center control unit 50. The number of the copy data controllers 20 to be connected to one on-line controller 30 is limited within the maximum limit of 10. It is to be noted that the communication lines between respective copy data controller 20 and the on-line controller 30 are referred to as channels 1 to 10 hereinafter.

The center system 2 comprises a center control unit 50, a microcomputer 60, and a CRT display 70.

The center control unit 50 is connected to the exchange unit 3 through the telephone line 4c. The center control unit 50 receives the copy data which are transmitted from the terminal system 1, and sums up the above copy data at a preset closing time after receiving the copy data and storing them therein. The microcomputer 60 is connected to the center control unit 50. The microcomputer 60 controls the operation of the center control unit 50, and displays the summed up copy data outputted from the center control unit 50 on the CRT display 70.

Figure 2:
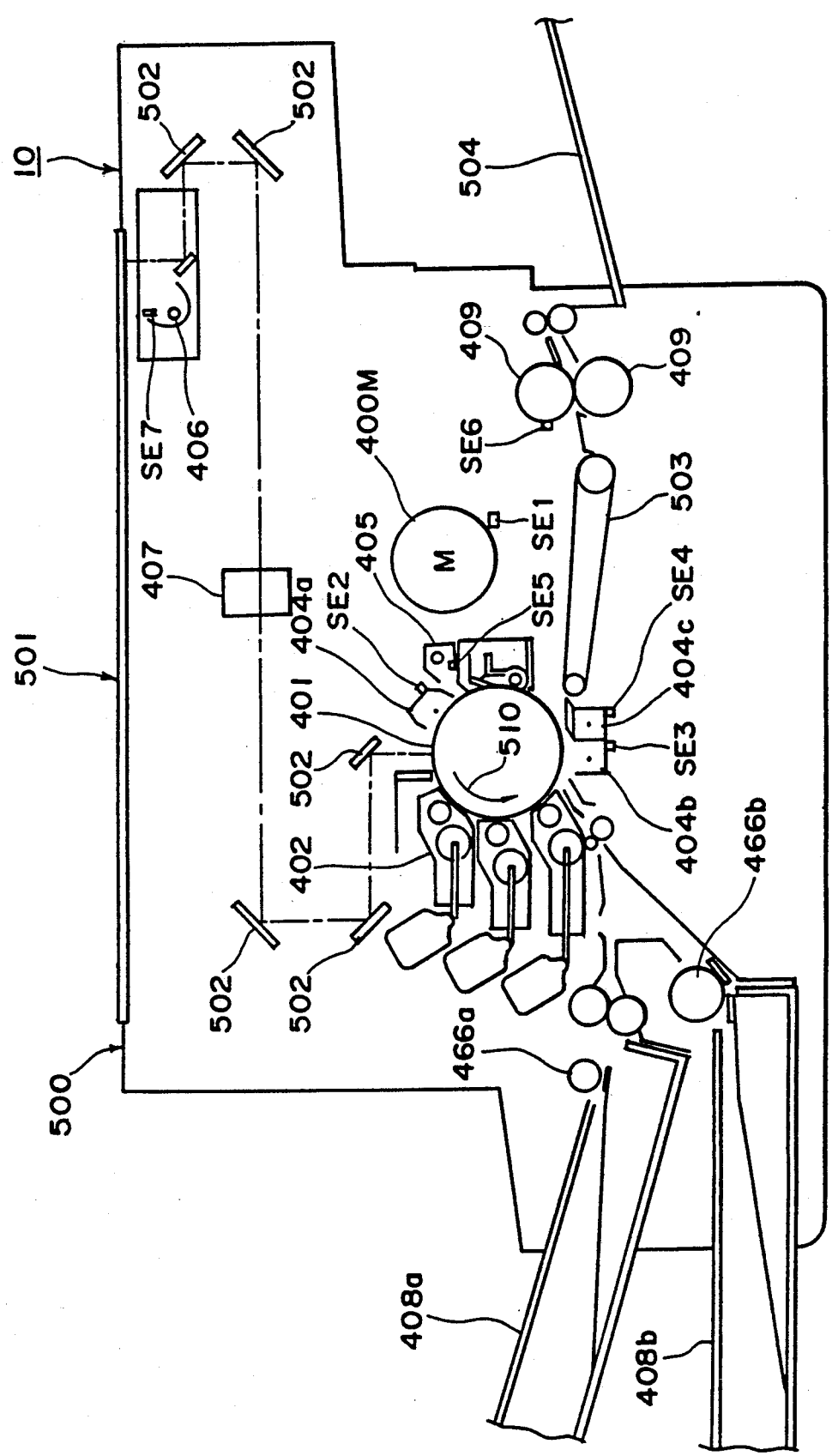
FIG. 2 is a schematic cross sectional view showing a copying machine shown in FIG. 1.

FIG. 2 shows the copying machine 10 shown in FIG. 1.

Referring to FIG. 2, a document which is set on a document table 500 and is covered by a document cover 501 is illuminated by an exposure lamp 406, and light reflected by the document is projected onto a photoconductive drum 401 through reflection mirrors 502 and a focus lens 407 so as to form the document image onto the surface of the photoconductive drum 401.

Around the photoconductive drum 401 which is rotated in a rotation direction as indicated by an arrow 510 at a predetermined constant speed, there are provided in the counterclockwise direction a developing unit 402, a transfer charger 404b, a separation charger 404c, an eraser lamp 405 for discharging the charge on the surface of the photoconductive drum 401, and a corona charger 404a. The electrostatic latent image is formed on the surface of the photoconductive drum 401 when the above document image is formed thereon, and the electrostatic latent image is developed into a visible toner image with toner by the developing unit 402.

On the other hand, a piece of copying paper which is set on either paper feeding cassette 408a or 408b is taken out by either paper feeding roller 466a or 466b, and is transported into the transfer charger 404b. The above visible toner image is transferred onto the copying paper by the transfer charger 404b, and then, the copying paper is separated from the photoconductive drum 401 by the separation charger 404c. Thereafter, the copying paper is transported into fixing rollers 409 by a transportation belt 503, and then, the visible toner image transferred on the copying paper is fixed thereon by the fixing rollers 409. Thereafter, the copying paper is discharged onto a paper discharging tray 504.

It is to be noted that the photoconductive drum 401, the paper feeding rollers 466a and 466b, the transportation belt 503 and the fixing rollers 409 are rotated by a main motor 400M.

In the copying machine 10, there are provided a photosensor SE1 for optically detecting an abnormal state of the main motor 400M by detecting the rotation speed thereof, a charger sensor SE2 for detecting a current flowing in a charger wire of the corona charger 404a and generating a signal when the current thereof is not fallen within a predetermined range, a charger sensor SE3 for detecting a current flowing in a charger wire of the transfer charger 404b and generating a signal when the current thereof is not fallen within a predetermined range, a charger sensor SE4 for detecting a current flowing in a charger wire of the separation charger 404c and generating a signal when the current thereof is not fallen within a predetermined range, a photosensor SE5 for detecting an abnormal state of the light amount of the eraser lamp 405, a thermal sensor SE6 for detecting an abnormal state of temperature of the fixing rollers 409, and a photosensor SE7 for detecting an abnormal state of the light amount of the exposure lamp 406.

Figure 3:
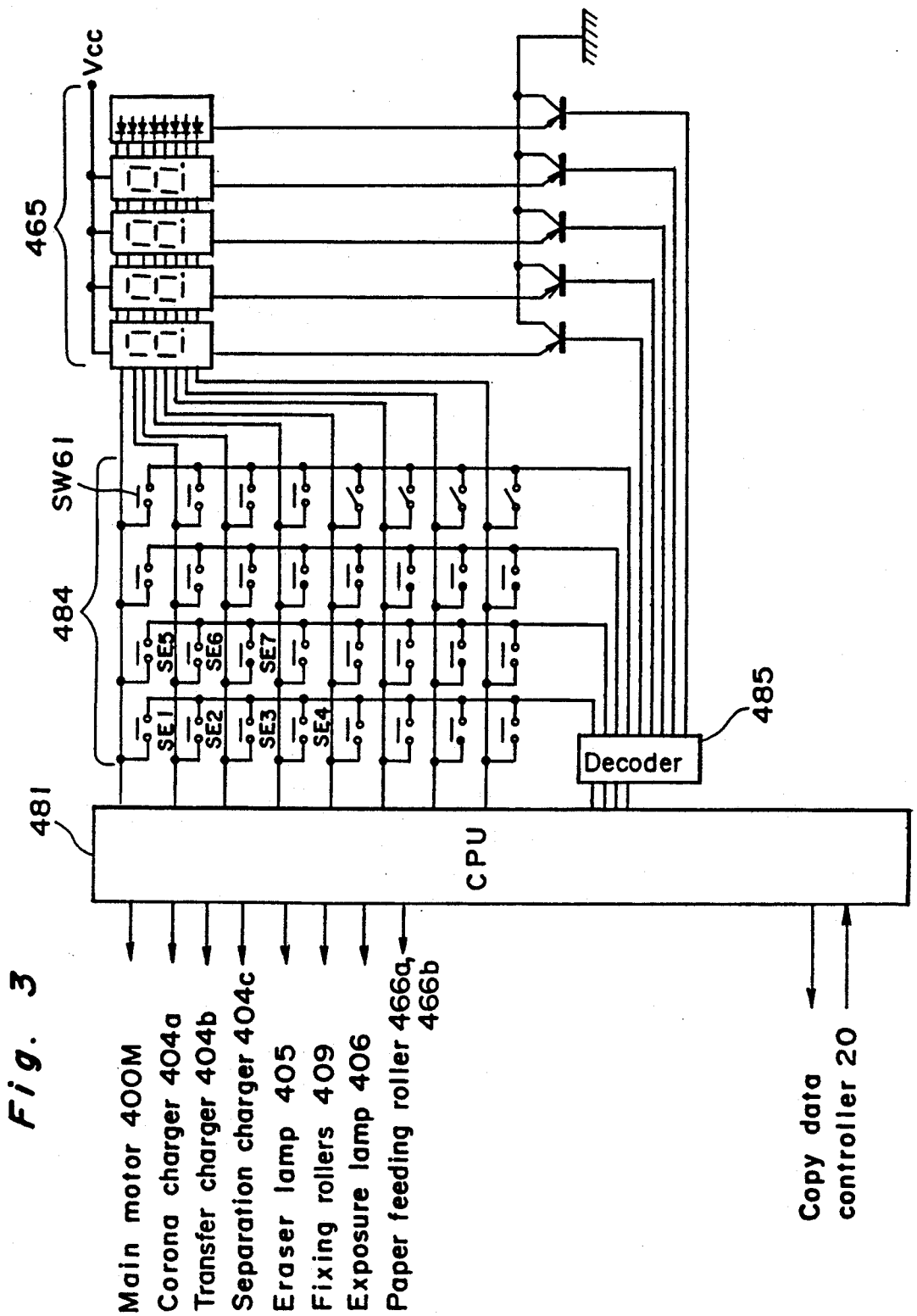
FIG. 3 is a block diagram showing a control circuit of the copying machine shown in FIG. 2.

FIG. 3 shows a control circuit of the copying machine 10 shown in FIG. 2.

Referring to FIG. 3, there are provided a central processing unit (referred to as a CPU hereinafter) 481 for controlling the operation of the copying machine 10 and respective units provided therein, a switch matrix 484 comprising the sensors SE1 to SE7 and a key SW61 for selecting a paper size, and an LED display unit 465. The CPU 481 is connected to the copy data controller 20.

The on/off state of each switch of the switch matrix 484 is decoded by a decoder 485, and the decoded signal is inputted to the CPU 481. When the CPU 481 detects occurrence of a trouble responsive to the signal outputted from the sensors SE1 to SE7 through the decoder 485, the CPU 481 displays the occurrence of the abnormal state thereof on the LED display unit 465, and also transmits a signal representing the occurrence of the trouble.

Figure 4:
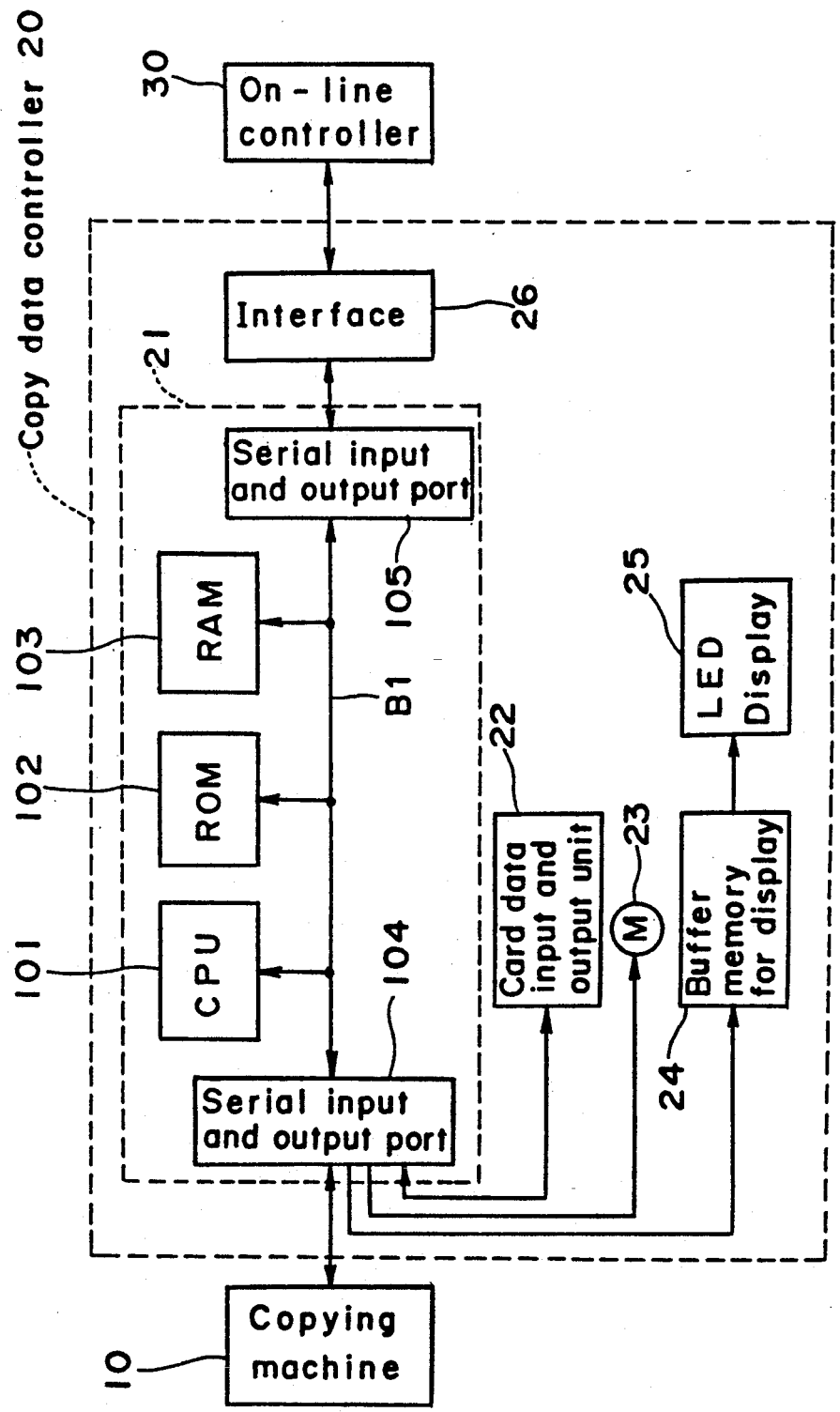
FIG. 4 is a block diagram showing a copy data controller shown in FIG. 1.

FIG. 4 shows the copy data controller 20 shown in FIG. 1.

Referring to FIG. 4, the copy data controller 20 comprises a microcomputer 21 for controlling the operation of the copy data controller 20. The microcomputer 21 comprises CPU 101 for controlling the operation of the microcomputer 21, a read only memory (referred to as a ROM hereinafter) 102 for storing a control program for the CPU 101 and data required for executing the control program, a random access memory (referred to as a RAM hereinafter) 103 for storing flags and for controlling the CPU 101 and the copy data and being used as a working memory, and serial input and output port circuits 104 and 105 for executing the parallel to serial conversion and the serial to parallel conversion in order to communicate with the external units, which are connected to each other through an internal bus B1.

The serial input and output port circuit 104 is connected to the copying machine 10 in order to transmit and receive the copy data and to control the operation of the copying machine 10, and also is connected to an LED display 25 through a buffer memory 24 for display in order to display predetermined data which are described in detail later. The serial input and output circuit 104 is also connected to a card data input and output unit 22 comprising an insertion sensor (not shown) for detecting that a magnetic card has been inserted therein and a magnetic head (not shown) for reading out data stored in the magnetic card and writing data therein. Further, the serial input and output port circuit 104 is connected to a transportation motor 23 for inserting the magnetic card into the unit 22 and discharging it to the outside thereof. Furthermore, the serial input and output port circuit 105 is connected to the on-line controller 30 through the interface circuit 26 in order to transmit and receive data.

The copy data controller constructed as described above has the following three operation modes:

(a) Setting mode (SETM) : an operation mode for setting a present time, an origination time, a telephone number for an origination at a predetermined time, and a telephone number for an emergency origination.

(b) Communication mode (COMM): an operation mode for transmitting and receiving data with the center control unit 50 through the on-line controller 30.

(c) Processing mode (PRCM) : an operation mode for executing internal processings of the copy data controller 20, which is set when both of the setting mode and the communication mode are not set.

There are provided two kinds of magnetic cards as follows:

(a) Summing up card : a card for displaying the copy data stored in the copy data controller 20.

(b) Section card : a code which is different every sections (referred to as a section code hereinafter) is stored in the magnetic card in order to sum up the number of copies every sections of the user. When the section card is inserted into the card data input and output unit 22, the copying operation is permitted in the copying machine 10.

FIG. 5 shows the on-line controller 30 shown in FIG. 1.

Referring to FIG. 5, the on-line controller 30 comprises microcomputer 31 for controlling the operation a of the on-line controller 30. The microcomputer 31 comprises a CPU 201 for controlling the operation of the microcomputer 31, a ROM 202 for storing a control program for the CPU 201 and data required for executing the control program, a RAM 203 for storing flags for controlling the CPU 201 and data such as a preset origination time and being used as a working memory of the CPU 201, a real time clock 204 for counting the present time, a serial input and output port circuit 205 for executing the parallel to serial conversion and the serial to parallel conversion etc. in order to communicate with external units, maintenance switches 206 for setting various kinds of setting items upon the maintenance, a monitor LED 207 for displaying a line connection state with the center control unit 50 and the setting states upon the maintenance, and a switch 208 for setting one of the first and second protocol modes, which are connected to each other through an internal bus B2.

The serial input and output port circuit 205 is connected to respective copy data controllers 20 through an interface circuit 34 and a multiplexer 35 in order to transmit and receive data with respective copy data controllers 20. When only one copy data controller 20 is connected to the on-line controller 30, the on-line controller 30 does not comprise the multiplexer 35, and the interface circuit 34 is directly connected to the copy data controller 20.

Further, the serial input and output port circuit 205 is connected to a modulator and a demodulator (referred to as a modem hereinafter) 33 including a network control unit (referred to as an NCU hereinafter) having a line connection function such as a dialer, in order to communicate with the center control unit 50. The modem 33 is connected to the telephone 40, and also is connected to the exchange unit 3 through a telephone line. The modem 33 connects the telephone 40 to the telephone line so as to speak with another subscriber responsive to control instruction of the microcomputer 31. On the other hand, in the communication mode for communication with the center control unit 50, the modem 33 executes the line connection process upon an incoming call from the center control unit 50 or upon an outgoing call from the on-line controller 30. Then, the modem 33 modulates data inputted from the microcomputer 31 using a predetermined modulation method and transmits modulated data signal to the center control unit 50 through the telephone line and the exchange unit 3. Further, the modem 33 demodulates data signal received from the center control unit 50, and outputs the demodulated data to the microcomputer 31. Upon the completion of the communication mode, the modem 33 cancels the line connection with the telephone line, and also connects the telephone 40 to the telephone line so as to set the telephone mode.

The on-line controller 30 has three operation modes of the setting mode (SETM), the communication mode (COMM) and the processing mode (PRCM) as well as the copy data controller 20. It is to be noted that the on-line controller 30 has the following two origination modes in the communication mode.

(a) Predetermined time origination mode : In the case that the copy data are to be transmitted to the center control unit 50, when the telephone 40 is being used, the on-line controller 30 waits for five minutes, and confirms whether or not the telephone 40 is being used. When the telephone 40 is not used, the copy data are transmitted to the center control unit 50 in this mode.

(b) Emergency origination mode : In the case that the copy data are to be transmitted to the center control unit 50, when the telephone 40 is being used, the copy data are transmitted to the center control unit 50 at this mode as soon as the telephone 40 is not used.

The on-line controller 30 has the following two protocols depending on such a switching process that the copy data controller 20 connectable thereto is switched into the communication mode and a telephone line connection with the center control unit 50.

(a) First protocol mode : After setting the copy data controllers 20 connectable to the on-line controller 30 in the communication mode, the on-line controller 30 is connected to the center control unit 50 through the telephone line. At that time, the center control unit 50 sequentially collects the copy data one by one from all the copy data controllers 20 connectable to the on-line controller 30.

(b) Second protocol mode : After the on-line controller 30 is connected to the center control unit 50 through the telephone line, one copy data controller 20 is set in the communication mode every time data transmission request signal is received from the center control unit 50. Therefore, the copy data are collected every copy data controller 20 after the copy data controller 20 connectable to the on-line controller 30 is set in the communication mode.

Figure 6A:
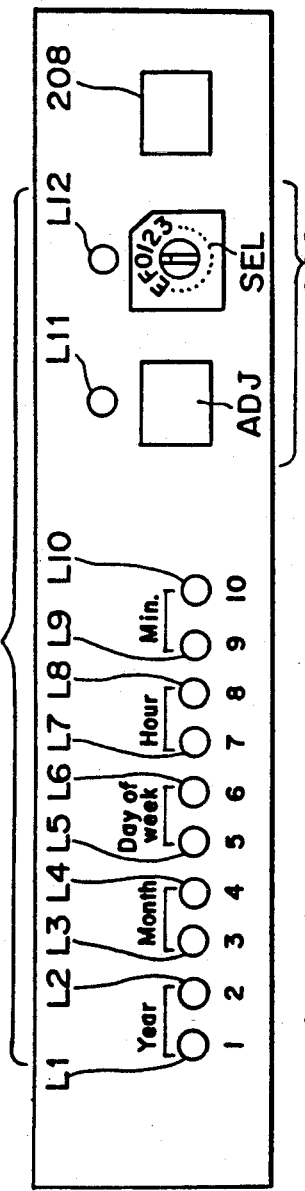
FIG. 6a is a front view showing maintenance switches and monitor LEDs shown in FIG. 5.

One of the protocol modes is selected using the switch 208 shown in FIG. 6a by the operator.

FIG. 6a is a front view showing an operation panel of the on-line controller 30.

As shown in FIG. 6a, there are provided ten monitor LEDs 207 or L1 to L10 on the left side of the operation panel. On the other hand, there are provided two monitor LEDs L11 and L12, and three switches ADJ, SEL and 208 on the right side thereof. The monitor LEDs L1 to L10 display the line connection state with the center control unit 50, and also display the selected item and the selected digit in the setting mode. Further, the monitor LEDs L11 and L12 display a mode state in the setting mode, and also displays an error state upon a self-test of the microcomputer 31. The setting switch ADJ sets the item and the numeral value which are selected by the selection switch SEL, and also is used as a switch for starting the self-test. The selection switch SEL is used for selecting one value among "0" to "9", and also selecting one of six kinds of self-tests "A" to "F". The switch 208 is used for selecting either one of the first protocol mode and the second protocol mode.

FIG. 6b shows an operation method of the maintenance switch 206 and the display of the monitor LEDs 207.

As shown in FIG. 6b, when the selection switch SEL is set at any numeral value and the setting switch ADJ is pressed, there can be set either the position of ten years of a day or the first digit of the telephone number. Thereafter, after the selection switch SEL is set at any value and the setting switch ADJ is pressed, there can be set either the position of one year of the day or the second digit of the telephone number. Similarly, there can be set the position of the day or the digit of the telephone number. In the operation method shown in FIG. 6b, there is shown such an example that there is inputted the day of Mar. 14, 1989 and the time of 14°28'.

Figure 7:
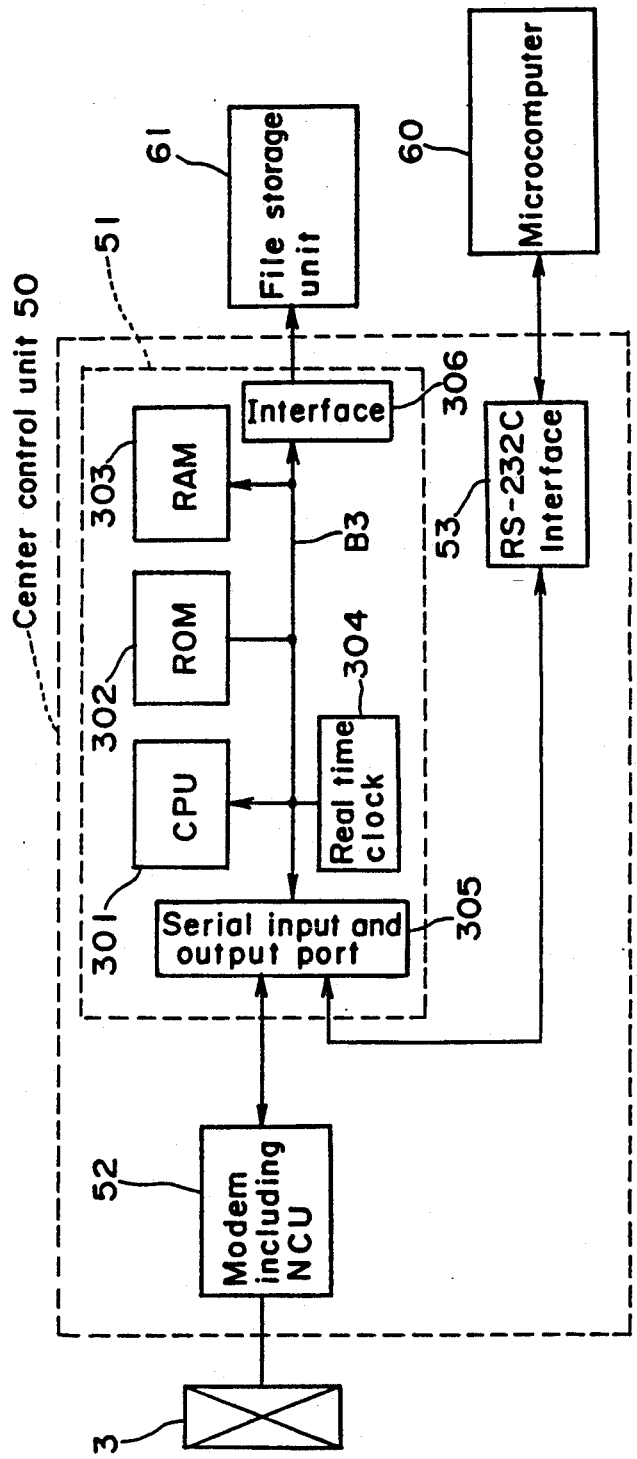
FIG. 7 is a block diagram showing a center control unit shown in FIG. 1.

FIG. 7 shows the center control unit 50 show in FIG. 1.

Referring to FIG. 7, the center control unit 50 comprises a microcomputer 51 for controlling the operation of the central control unit 50. The microcomputer 51 comprises a CPU 301 for controlling the operation of the microcomputer 51, a ROM 302 for storing a control program for the CPU 301 and data required for executing the control program, a RAM 303 for storing flags for controlling the CPU 301 and data and being used as a working memory of the CPU 201, a real time clock 304 for counting the present time, a serial input and output port circuit 305 for executing the parallel to serial conversion and the serial to parallel conversion etc. in order to communicate with external units, and an interface circuit 306 for connecting the center control unit 50 to a file storage unit 61 of a bubble memory for storing the copy data which are received from the copy data controller 20, which are connected to each other through an internal bus B3.

The serial input and output port circuit 305 is connected to a modem 52 including an NCU in order to communicate with the on-line controller 30. Upon an outgoing call from the on-line controller 30, the modem 52 modulates data inputted from the microcomputer 51 of the center control unit 50 using the predetermined modulation method as well as the modem 33, and transmits modulated data signal to the on-line controller 30 through the telephone line and the exchange unit 3.

Further, the modem 52 demodulates data signal received from the on-line controller 30, and outputs the demodulated data to the microcomputer 51. Upon the completion of the communication, the modem 52 cancels the line connection with the telephone line.

Furthermore, the serial input and output port circuit 305 is connected to a microcomputer 60 through an RS-232C interface circuit 53 in order to communicate the microcomputer 60.

(2) Protocol in First Protocol ode and Second Protocol Mode

In the present copy data management system, the copy data controller 20 connected to each copying machine 10 has three operation modes of the setting mode (SETM), the communication mode (COMM) and the processing mode (PRCM), as described above. The copying operation is executed in the processing mode, and the copy data such as the number of copies are updated depending on the copying operation.

On the other hand, the copy data are transmitted to the center control unit 50 in the communication mode. While the copying machine operates in the communication mode, the copying operation is not executed. Therefore, the copy data can be prevented from being indefinite in the communication mode.

In the case that the on-line controller 30 transmits the copy data to the center control unit 50, it is necessary to set the copy data controller 20 in the communication mode and to connect the on-line controller 30 to the center control unit 50 through the telephone line. In the present preferred embodiment, either one of the first protocol mode and the second protocol mode can be selected using the switch 208 by the operator.

Figure 13B:
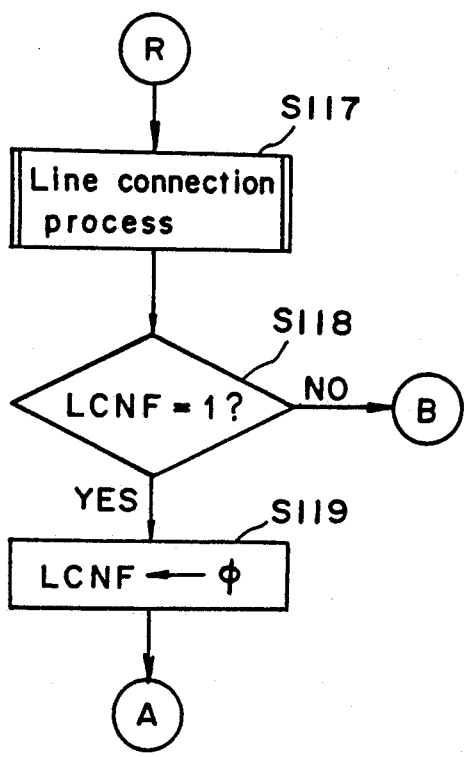

In the first protocol mode, after the on-line controller 30 sets all the copy data controllers 20 connected thereto in the communication mode, the on-line controller 30 is connected to the center control unit 50 through the telephone line, as shown in FIG. 13b. Therefore, the communication time for transmitting the copy data can be decreased.

On the other hand, in the second protocol mode, after the on-line controller 30 is connected to the center control unit 50 through the telephone line, each copy data controller 20 connected thereto is set in the communication mode every copy data controller 20, and the on-line controller 30 makes one copy data controller 20 communicate with the center control unit 50. Therefore, the communication time increases because of the process for setting each of the copy data controllers 20 in the communication mode. However, it is prevented that all the copying machine cannot be used. The effect of the difference between the first and second protocols increases as the number of the copy data controllers 20 connected to the on-line controller 30 increases.

One example of the protocol upon the normal processing in the first protocol mode of the copy data management system constructed as described above will be described below with reference to communication sequence charts shown in FIGS. 8a to 8c. In this case, ten copy data controllers 20 are connected to the on-line controller 30.

Figure 8A:
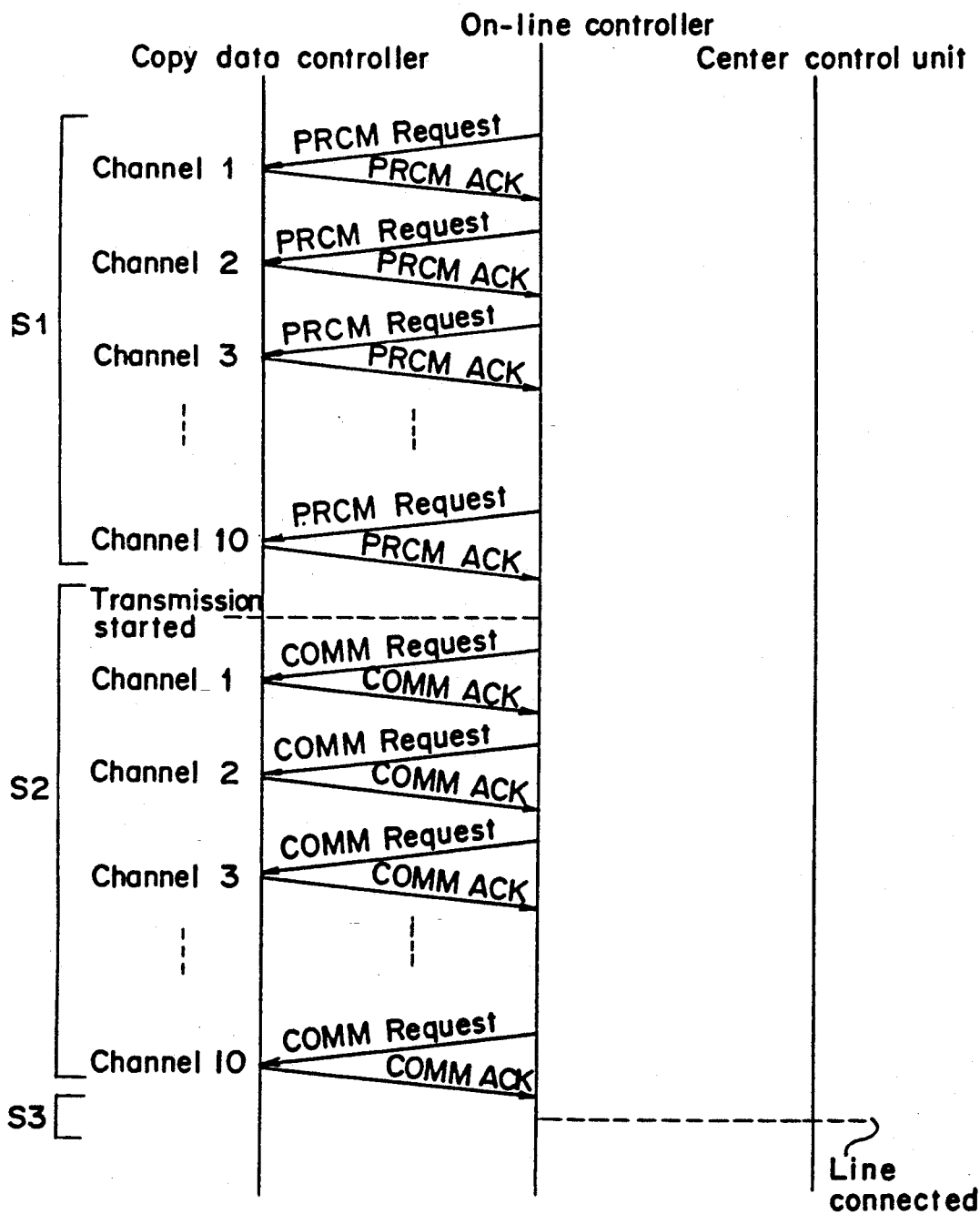
FIGS. 8a to 8c are communication sequence charts showing a first protocol mode provided in the copy data management system shown in FIG. 1.

Referring to FIG. 8a, the on-line controller 30 sequentially executes a process for confirming the line connection with respective copy data controllers 20 connected thereto at step S1. Namely, first of all, the on-line controller 30 transmits a processing mode request (PRCM request) signal to the copy data controller 20 of the channel 1. Responsive to this processing mode request signal, the copy data controller 20 of the channel 1 transmits to the on-line controller 30 a processing mode data controller 20 has received the processing mode request signal. Thereafter, similarly, the on-line controller 30 transmits the processing mode request signal to the copy data controller 20 of the channel 2, and receives the processing mode acknowledge signal threrefrom. Similarly, the on-line controller 30 executes the process for confirming the line connection with the copy data controllers 20 of channels 3 to 10.

Thereafter, at step S2, at a predetermined transmission start time, the on-line controller 30 executes a process for sequentially setting the respective copy data controllers 20 connected thereto in the communication mode. Namely, first of all, the on-line controller 30 transmits a communication mode request (COMM request) signal to the copy data controller 20 of the channel 1. Responsive to this communication mode request signal, the copy data controller 20 of the channel 1 transmits a communication mode acknowledge (COMM ACK) signal representing that the copy data controller 20 has received the communication mode request signal. Thereafter, similarly, the on-line controller 30 transmits the communication mode request signal to the copy data controller 20 of the channel 2, and receives the communication mode acknowledge signal therefrom. Similarly, the on-line controller 30 executes the process for setting the respective copy data controllers 20 of the channels 3 to 10 in the communication mode. After setting all the copy data controllers 20 connected to the on-line controller 30 in the communication mode, the on-line controller 30 instructs the modem 33 to execute the line connection process with the center control unit 50 at step S3.

Figure 8B:
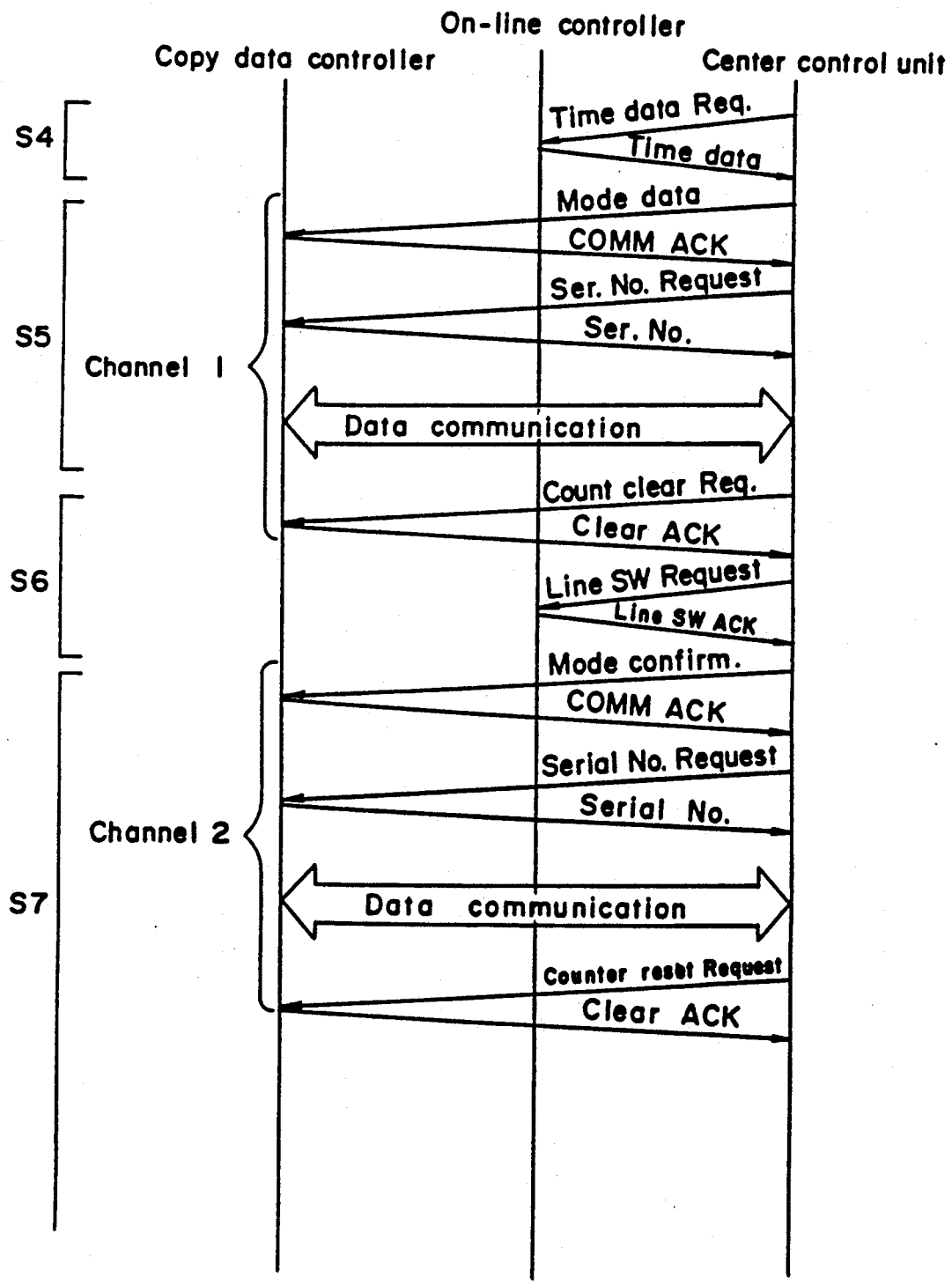
Figure 8C:
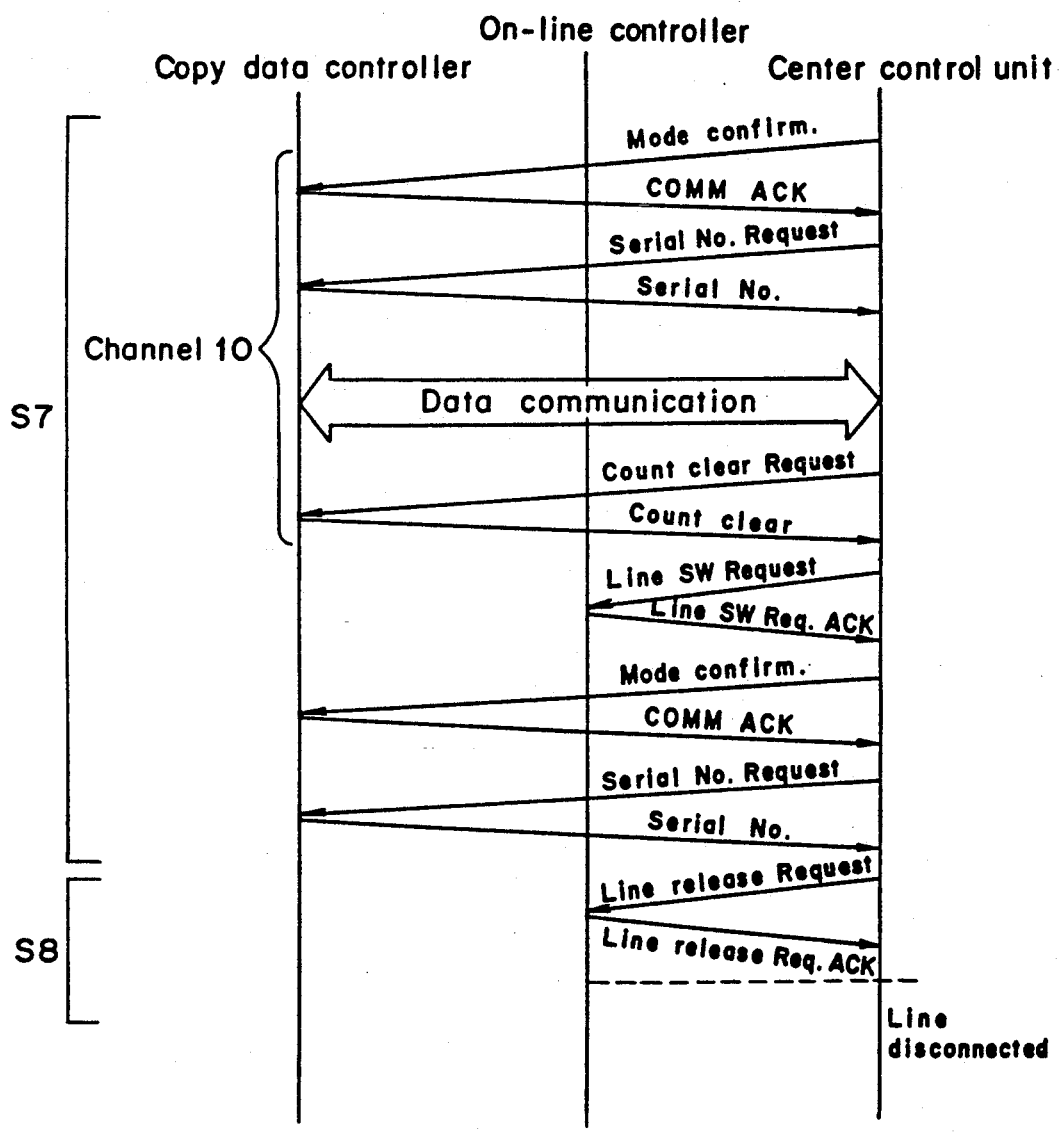

Referring to FIG. 8b, thereafter, at step S4, the center control unit 50 transmits a time request signal to the on-line controller 30. Responsive to this time request signal, the on-line controller 30 transmits time data to the center control unit 50.

Thereafter, at step S5, the center control unit 50 communicates with the copy data controller 20 of the channel 1 through the on-line controller 30 so as to receive the copy data therefrom. Namely, the center control unit 50 transmits a mode confirmation signal to the copy data controller 20 of the channel 1. Responsive to this mode confirmation signal, the copy data controller 20 thereof transmits the communication mode acknowledge (COMM ACK) signal to the center control unit 50. Thereafter, the center control unit 50 transmits to the copy data controller 20 a serial number request signal for requesting to inform the center control unit 50 of the serial number of the copy data controller 20. Responsive to this serial number request signal, the copy data controller 20 transmits the serial number data to the center control unit 50. Thereafter, the center control unit 50 communicates with the copy data controller 20 so as to receive the copy data therefrom, as follows. The center control unit 50 transmits a predetermined data request signal described in detail later to the copy data controller 20. Responsive to this data request signal, the copy data controller 20 transmits the copy data corresponding to the received data request signal to the center control unit 50.

After all the copy data are transmitted by the copy data controller 20 and are received by the center control unit 50, at step S6, the center control unit 50 transmits a count clear request signal to the copy data controller 20 in order to clear data stored in the counters for counting the copy data in the copy data controller 20. Responsive to this count clear request signal, the copy data controller 20 clears the data stored in the counters thereof, and then, the copy data controller 20 transmits a clear acknowledge (clear ACK) signal to the center control unit 50. Thereafter, the center control unit 50 transmits a line switching request (line SW request) signal to the on-line controller 30 in order to switch over to the copy data controller 20 of the next channel or the channel 2. Responsive to this line switching request signal, the on-line controller 30 transmits a line switching acknowledge (line SW ACK) signal to the center control unit 50. Then, the on-line controller 30 controls the multiplexer 35 so as to be connected to the the copy data controller 20 of the channel 2.

Thereafter, at step S7, in a manner similar to that described above, there is executed a process for transmitting and receiving the copy data with the copy data controllers 20 of the channels 2 to 10 except for the copy data controller 20 to which the center control unit 50 cannot confirm the line connection. Namely, the center control unit 50 transmits the mode confirmation signal to the copy data controller 20, and then, in a manner similar to that described above, the center control unit 50 receives the communication mode acknowledge signal, transmits the serial number request signal, receives the serial number data, sequentially. Then, when the center control unit 50 receives the serial number of the copy data controllers 20 with which the center control unit 50 completes the data communication of the copy data, the center control unit 50 judges that the data communication of the cop data is completed with all the copy data controllers 20, and transmits a line release request signal to the on-line controller 30 at step S8. Responsive to this line release request signal, the on-line controller 30 transmits a line release request acknowledge signal to the center control unit 50. Then, a series of processes of the data communication of the copy data are completed, and the center control unit 50 instructs the modem 52 to cancel the line connection. Thereafter, the communication flow goes to step S1.

Next, one example of the protocol of a normal processing in the second protocol mode in the copy data management system will be described below with reference to communication sequence charts shown in FIGS. 9a to 9c. In this case, ten copy data controllers 20 can be connected to the on-line controller 30, and no copy data controller 20 of the channel 3 is connected to the on-line controller 30.

Figure 9A:
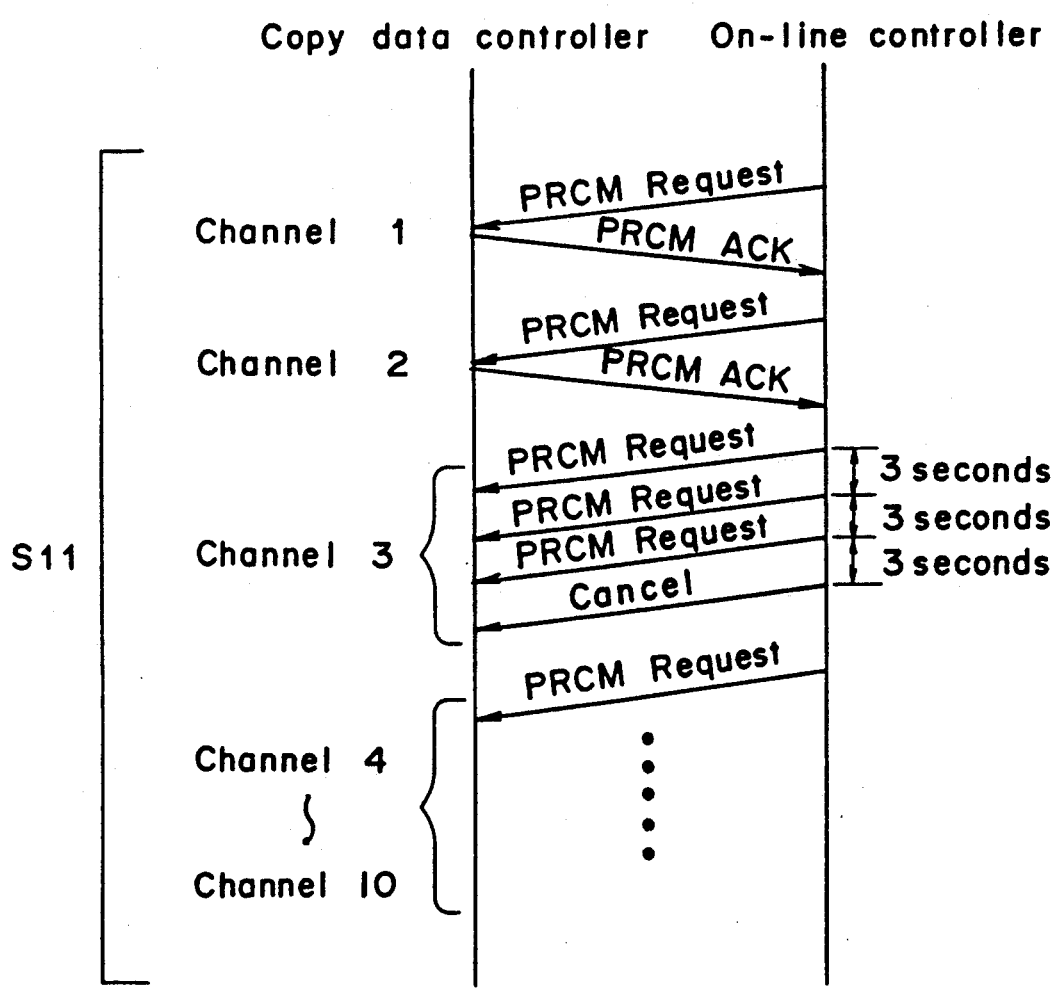
FIGS. 9a to 9c are communication sequence charts showing a second protocol mode provided in the copy data management system shown in FIG. 1.

Referring to FIG. 9a, at step S11, the on-line controller 30 periodically executes a process for confirming the line connection with the connected copy data controllers 20. Namely, first of all, the on-line controller 30 transmits the processing mode request signal to the copy data controller 20 of the channel 1. Responsive to this processing mode request signal, the copy data controller 20 of the channel 1 transmits the processing mode acknowledge signal representing that the above processing mode request signal has been received to the on-line controller 30. Thereafter, similarly, the on-line controller 30 transmits the processing mode request signal to the copy data controller 20 of the channel 2, and receives the processing mode acknowledge signal from the copy data controller 20 thereof. Further, the on-line controller 30 transmits the processing mode request signal to the copy data controller 20 of the channel 3. Then, when the on-line controller 30 does not receive the processing mode acknowledge signal within three seconds after transmitting the processing mode request signal, the on-line controller 30 retransmits the processing mode request signal thereto, and waits for the processing mode acknowledge signal. When the on-line controller 30 does not receive the processing mode acknowledge signal within three seconds after similarly transmitting the processing mode request signal three times in all to the same the copy data controller 20 of the channel 3, the on-line controller 30 judges that it is impossible to connect with the copy data controller 20 of the channel 3. Then, the on-line controller 30 transmits a cancel signal to the copy data controller 20 of the channel 3. In a manner similar to that described above, the on-line controller 30 executes the process for confirming the line connection with the copy data controllers 20 of the channels 4 to 10.

Figure 9B:
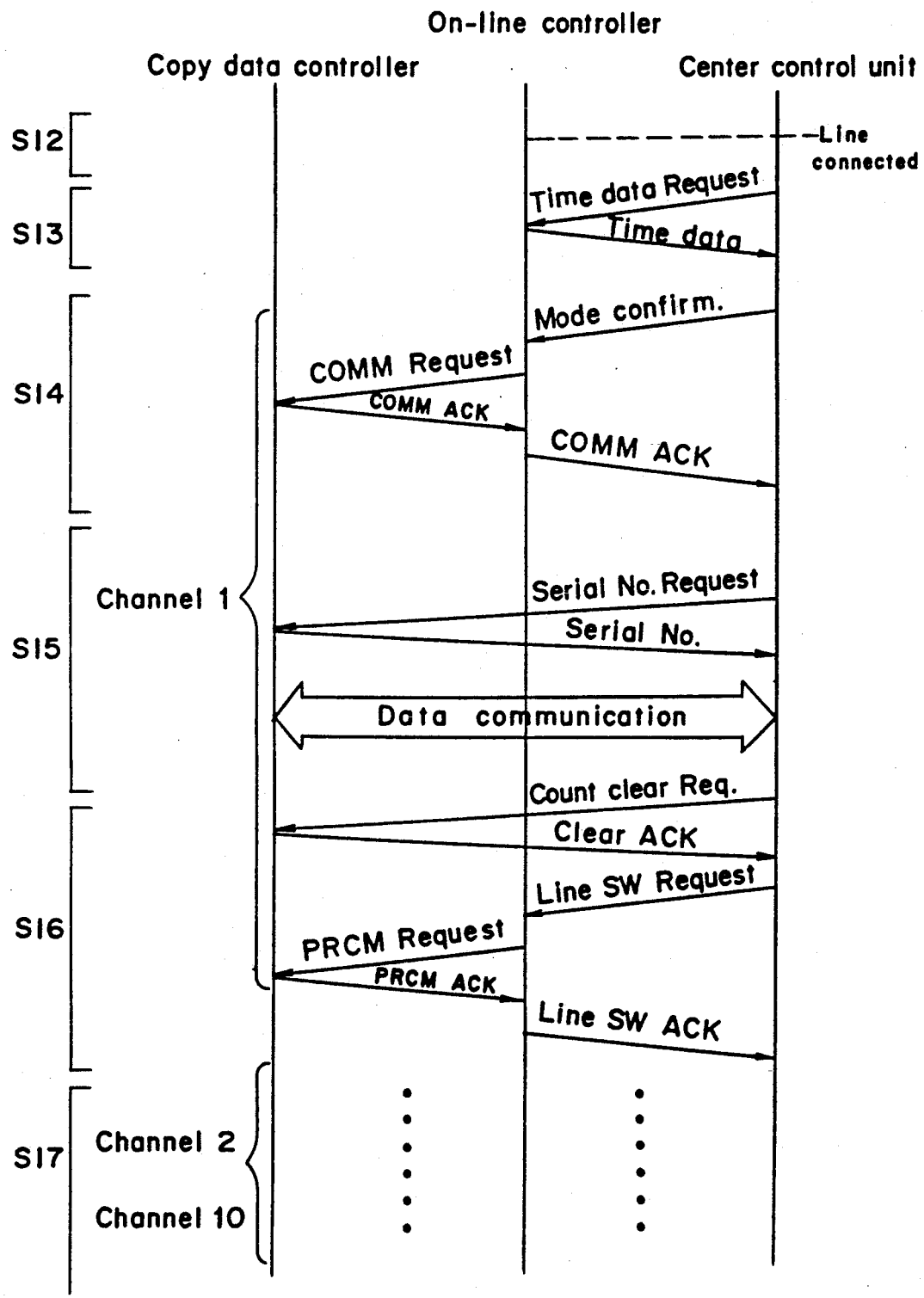
Figure 9C:
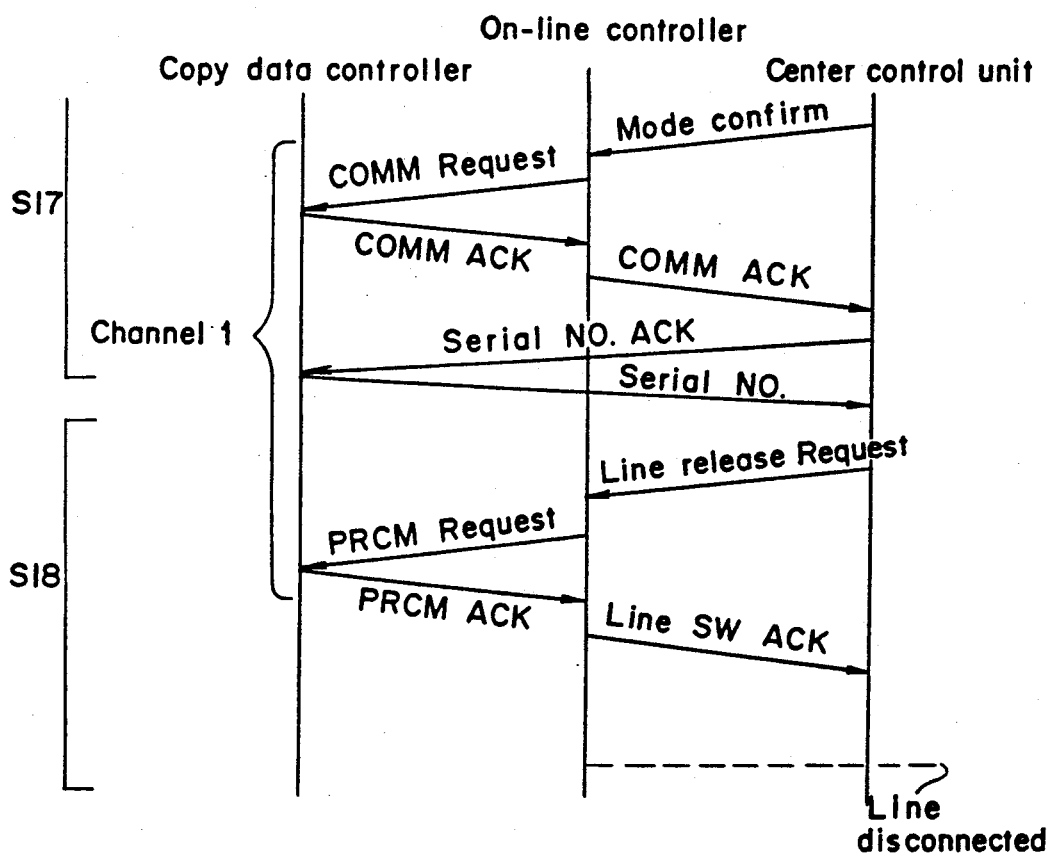

Referring to FIG. 9b, at step S12, at a predetermined transmission start time, the on-line controller 30 instructs the modem 33 to execute the line connection with the center control unit 50. Thereafter at step S13, the center control unit 50 transmits the time request signal to the on-line controller 30. Responsive to this time request signal, the on-line controller 30 transmits the time data to the center control unit 50.

Thereafter, at step S14, the center control unit 50 transmits the mode confirmation signal to the on-line controller 30 in order to switch the operation mode of the copy data controller 20 of the channel 1 into the communication mode. Responsive to this mode confirmation signal, the on-line controller 30 transmits the communication mode request signal to the copy data controller 20. Responsive to this communication mode request signal, the copy data controller 20 sets the operation mode itself in the communication mode, and then, transmits the communication mode acknowledge signal to the center control unit 50 through the on-line controller 30.

Thereafter, at step S15, the center control unit 50 transmits through the on-line controller 30 to the copy data controller 20 the serial number request signal for requesting the copy data controller 20 to inform the center control unit 50 of the serial number thereof. Responsive to this serial number request signal, the copy data controller 20 transmits the serial number data to the center control unit 50 through the on-line controller 30. Thereafter, the data communication of the copy data is executed between the center control unit 50 and the copy data controller 20. In this case, the center control unit 50 transmits a predetermined data request signal described later in detail to the copy data controller 20. Responsive to this data request signal, the copy data controller 20 transmits the copy data corresponding to the received data request signal to the center control unit 50.

After transmitting and receiving all the copy data, the center control unit 50 transmits the count clear request signal to the copy data controller 20 through the on-line controller 30 at step S16 in order to clear all the data stored in the counters for counting the copy data of the copy data controller 20. Responsive to this count clear request signal, the copy data controller 20 clears all the copy data stored in the counters, and then, the copy data controller 20 transmits the clear acknowledge (clear ACK) signal to the center control unit 50 through the on-line controller 30. Thereafter, the center control unit 50 transmits a line switching request signal to the on-line controller 30 in order to switch over to the copy data controller 20 of the next channel or the channel 2. Responsive to this line switching request signal, the on-line controller 30 transmits the processing mode request (PRCM request) signal to the copy data controller 20 of the channel 1. Responsive to this processing mode request signal, the copy data controller 20 of the channel 1 transmits the processing mode acknowledge (PRCM ACK) signal to the on-line controller 30. Responsive to this processing mode acknowledge signal, the on-line controller 30 transmits a line switching acknowledge (line SW ACK) signal to the center control unit 50. Then, the on-line controller 30 controls the multiplexer 35 to switch over to the copy data controller 20 of the channel 2.

Thereafter, at step S17, the center control unit 50 executes a process for transmitting and receiving the copy data with the copy data controller 20 of channels 2 to 10 except for those for which the line confirmation have not been confirmed, in a manner similar to that described above. Thereafter, the center control unit 50 transmits the mode confirmation signal to the on-line controller 30, and executes the reception of the communication mode acknowledge signal, the transmission of the serial number request signal, and the reception of the serial number data, sequentially, in a manner similar to that described above.

If the center control unit 50 receives the serial number of the copy data controller 20 with which the transmission and the reception of the above-mentioned copy data have been completed, the center control unit 50 judges that the transmission and the reception of all the copy data have been completed, and then, the center control unit 50 transmits the line release request signal to the on-line controller 30 in order to switch the operation mode of the copy data controller 20 (of the channel 1, in this case) to the processing mode. Responsive to this line release request signal, the on-line controller 30 transmits the processing mode request (PRCM request) signal to the copy data controller 20 of the channel 1. Responsive to this processing mode request signal, the copy data controller 20 transmits the processing mode acknowledge (PRCM ACK) signal to the on-line controller 30. Responsive to this processing mode acknowledge signal, the on-line controller 30 transmits the line switching acknowledge signal to the center control unit 50. Then, a series of processes for transmitting and receiving the copy data have been completed, and the center control unit 50 instructs the modem 52 to release the line connection. Thereafter, the communication flow goes back to step S11.

Figure 10:
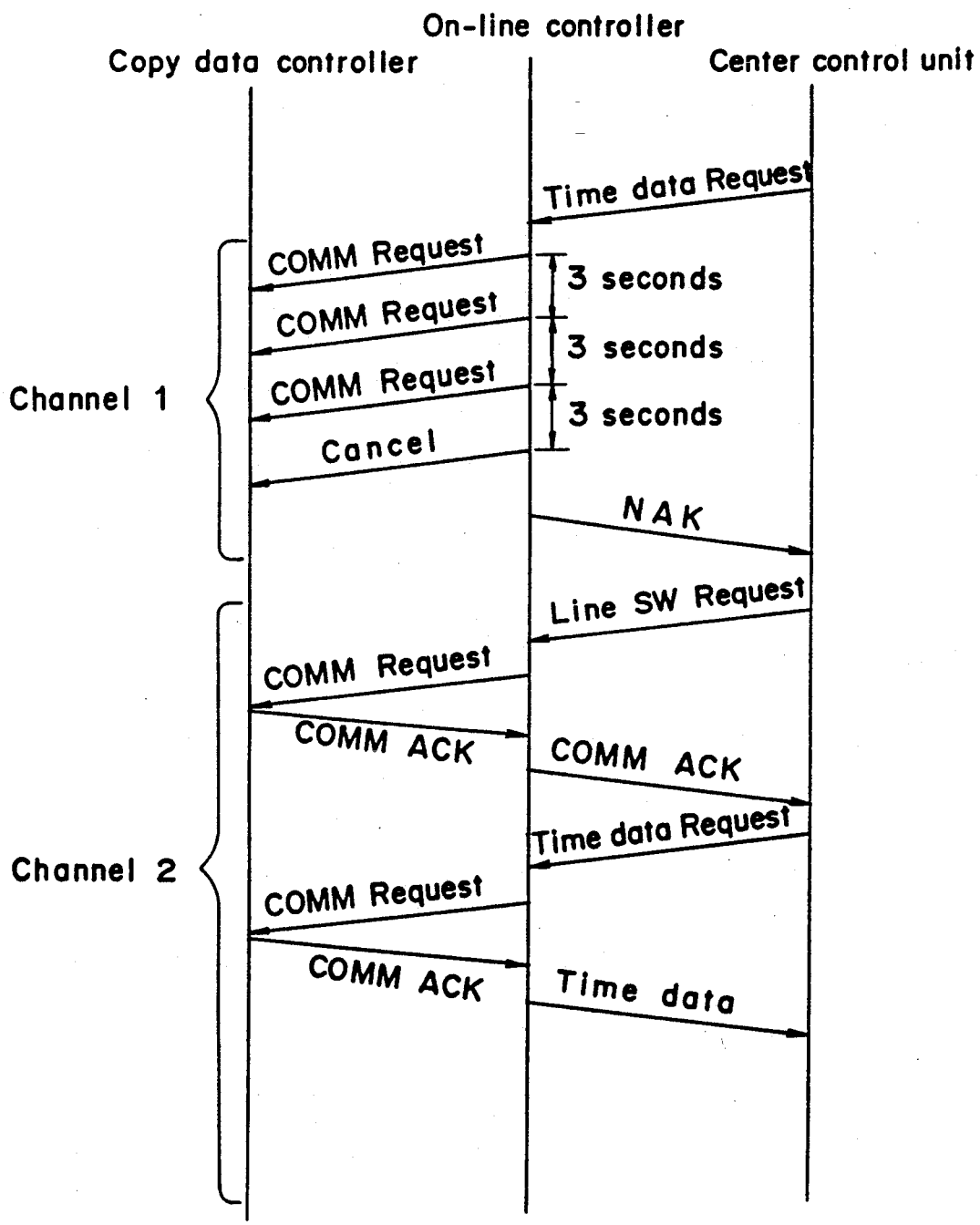
FIG. 10 is a communication sequence chart showing a protocol in an abnormal state in the copy data management system shown in FIG. 1.
Figure 11:
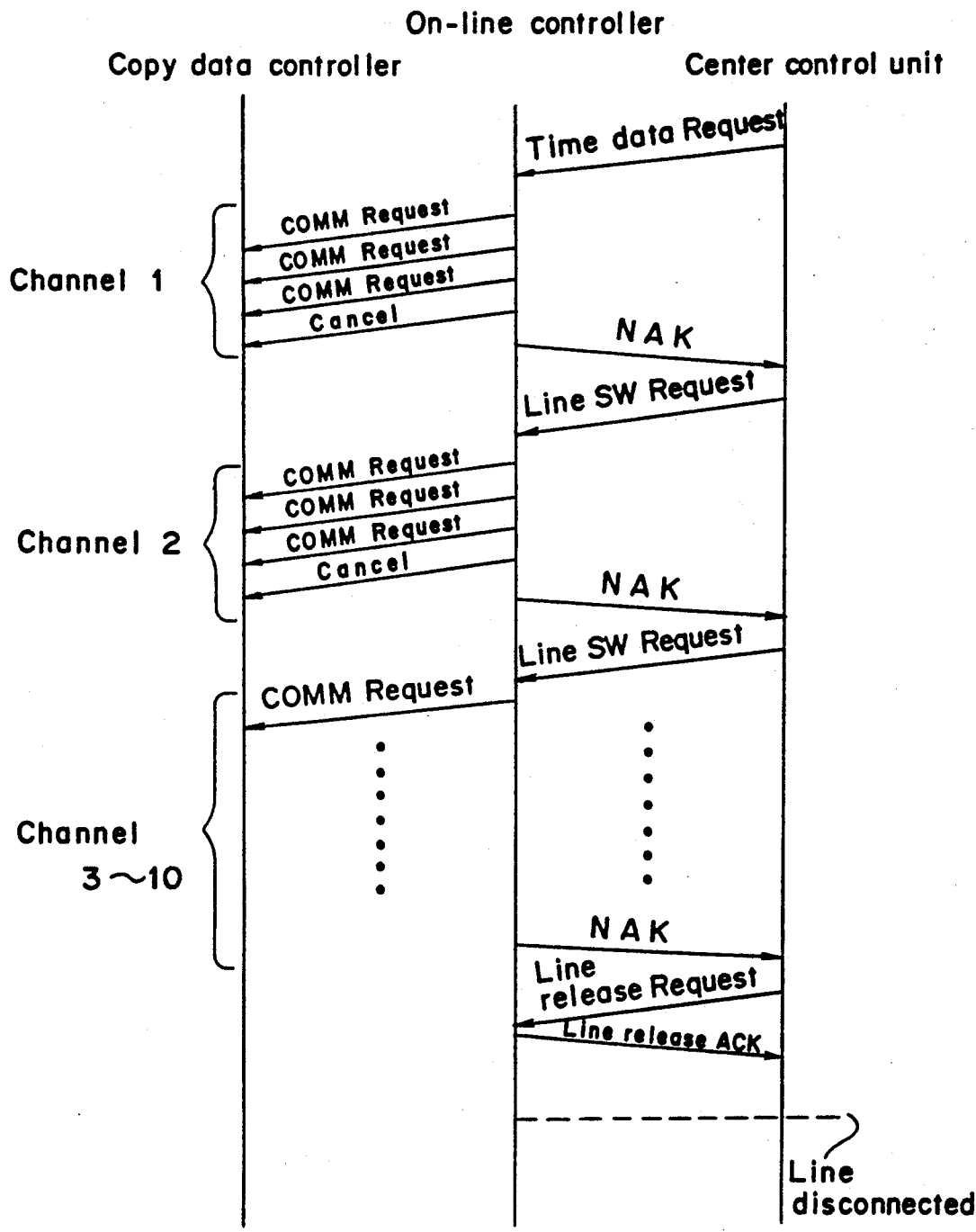
FIG. 11 is a communication sequence chart showing a protocol in another abnormal state in the copy data management system shown in FIG. 1.

FIGS. 10 and 11 are communication sequence charts showing one example of the protocol in an abnormal process of the second protocol mode in the copy data management system shown in FIG. 1.

As shown in FIG. 10, in the case that the on-line controller 30 transmits the communication mode request (COMM request) signal to the copy data controller 20 of the channel 1, if the on-line controller 30 does not receive the communication mode acknowledge (COMM ACK) signal within three seconds after transmitting the communication mode request signal, the on-line controller 30 retransmits the communication mode request (COMM request) signal to the copy data controller 20 of the channel 1, and waits for the communication mode acknowledge (COMM ACK). When the on-line controller 30 does not receive the communication mode acknowledge (COMM ACK) signal after transmitting the communication mode request (COMM request) signal three times in all in a manner similar to that described above, the on-line controller 30 judges that the copy data controller 20 of the channel 1 can not be connected thereto, the on-line controller 30 transmits the cancel signal to the copy data controller 20 of the channel 1, and also transmits a negative acknowledge (NAK) signal to the center control unit 50. Thereafter, the center control unit 50 transmits the line switching request signal to the on-line controller 30 in order to switch over to the copy data controller 20 of the next channel.

Thereafter, as shown in FIG. 11, if the copy data controller 20 of all the channels or the channels 1 to 10 can not connected to the on-line controller 30, the center control unit 50 transmits the line release request signal to the on-line controller 30. Responsive to this line release request signal, the on-line controller 30 transmits the line release acknowledge (line release ACK) signal to the center control unit 50. Responsive to this line release acknowledge signal, the center control unit 50 instructs the modem 52 to disconnect the telephone line.

(3) Format of Communication Data

FIGS. 12a to 12e show formats of the communication data used in the copy data management system shown in FI. 1, wherein FIGS. 12a to 12d show data to be transmitted from the copy data controller 20 through the on-line controller 30 to the center control unit 50, and FIG. 12e shows data to be transmitted from the on-line controller 30 to the center control unit 50. It is to be noted that, a receipt command for representing a content of each data is arranged in the head of each communication data.

FIG. 12a shows a format of data of the number of all copies, and these data are composed of the receipt command, the serial number of the copy data controller 20, and data of the number of all copies.

FIG. 12b shows a format of data of the number of times of occurrence of paper jam in respective positions which are predetermined plural ranges arranged in a copy machine 10, and these data are composed of the receipt command, and plural blocks, each block being composed of a position code and the number of times of occurrence of paper jam.

FIG. 12c shows a format of data of the number of times of occurrence of trouble in respective positions which are predetermined plural ranges arranged in a copy machine 10, and these data are composed of the receipt command, and plural blocks, each bock being composed of a position code and the number of times of occurrence of trouble.

FIG. 12d shows a format of data of the number of copies of respective sizes in respective sections, and these data are composed of the receipt command, and plural blocks, each block being composed of a section code, and the numbers of copies of five kinds of sizes. It is to be noted that, if it is necessary to transmit much data since there are many sections, these data of plural blocks may be transmitted in such a state that these plural blocks are divided every predetermined number of sections.

FIG. 12e shows a format of time data, and these data are composed of two digit data of "Year", two digit data of "Month", two digit data of "Day", two digit data of "Hour", two digit data of "Minute", and two digit data o "Second".

(4) Process of On-Line Controller

FIGS. 13a to 13e are flowcharts showing a main routine of the on-line controller 30.

Referring to FIG. 13a, when the on-line controller 30 is turned on, the program is started. First of all, an initial setting process is executed by the on-line controller 30 at step S100, and then, it is judged at step S101 whether or not the setting mode is selected.

The setting mode is provided, as described above, for setting the present time of the real time clock 204, the origination time at which the on-line controller 30 originates to the center control unit 50, a telephone number in the origination mode at a predetermined time upon originating to the center control unit 50, and a telephone number in the emergency origination mode upon originating to the center control unit 50. In the initial setting process, when either the adjustment switch ADJ or the setting switch SET of the maintenance switch 206 is pressed, the above setting mode is selected, and then, the program flow goes to step S102.

Figure 13C:
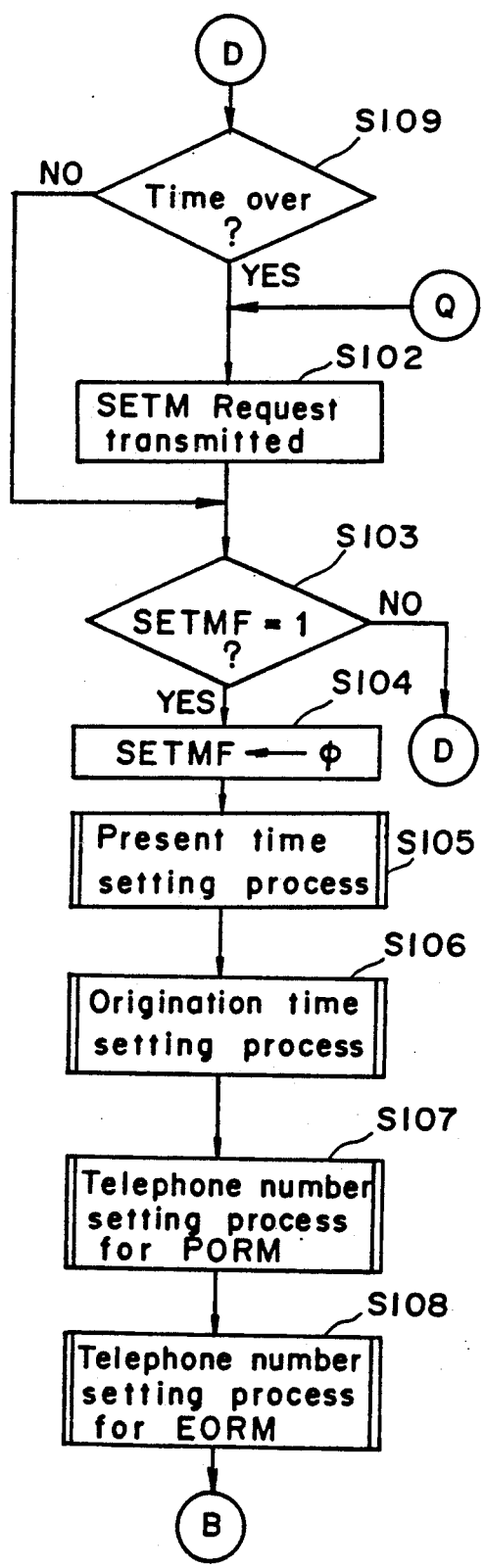

Referring to FIG. 13c, at step S102, the on-line controller 30 transmits the setting mode request signal to the copy data controller 20, and it is judged at step S103 whether or not the setting mode flag SETMF is set at one. This setting mode flag is set at one when the setting mode acknowledge signal is received from the copy data controller 20 in a communication interruption process described later in detail.

If the setting mode flag is set at zero (No at step S103), it is judged at step S109 whether or not a time counter has counted up to a predetermined time (three seconds in the present preferred embodiment) or the time counter becomes a time over state. As described above, if the on-line controller 30 does not receive the setting mode acknowledge signal from the copy data controller 20 within three seconds after transmitting the processing mode request signal to the copy data controller 20, the time counter becomes the time over state, and then, the on-line controller 30 transmits the processing mode request signal to the copy data controller 20 again at step S102. The program flow goes back from step S103 through step S109 to to step S103 in the loop from step S103 to S109 until the time counter becomes the time over state. Then, the on-line controller 30 waits for the processing mode acknowledge signal from the copy data controller 20.

If the setting flag becomes one (Yes at step S103), the setting mode flag SETMF is reset to zero at step S104, and then, there are executed from step S105 to step S108, a present time setting process, an origination time setting process, a telephone number setting process for the origination mode at predetermined time (PORM), and a telephone number setting process for the emergency origination mode (EORM). Thereafter, the program flow goes to step S110. Respective subroutines from step S105 to step S108 are described in detail later.

After the process of the processing mode is completed or the setting mode is not selected (No at step S101), there are executed a copy data controller connection confirmation process, a modem connection confirmation process, and a time confirmation process at steps S110 to S112, and then, the program flow goes to step S113.

At steps S113 and S115, it is judged whether or not a predetermined time origination flag PORMF is set at one and an emergency origination flag EORMF is set at one, respectively. The predetermined time origination flag PORMF is set at one when the present time coincides with the predetermined origination time in the time confirmation process of step S112. On the other hand, the emergency origination flag EORMF is set at one when the on-line controller 30 receives the emergency origination request signal from the copy data controller 20 in the communication interruption process described in detail later.

If both of the predetermined time origination flag PORMF and the emergency origination flag EORMF are set at zero (Yes at steps S113 and S115), the program flow goes back to step S110. On the other hand, if the predetermined time origination flag PORMF is set at one (Yes at step S113), the program flow goes to step S114, and then, the predetermined time origination flag PORMF is reset to zero. Thereafter, the program flow goes to step S117. Further, if the emergency origination flag EORMF is set at one (Yes at step S115), the program flow goes to step S116, and then, the emergency origination flag EORMF is reset to zero. Thereafter, the program flow goes to step S117.

Referring to FIG. 13b, at step S117, the on-line controller 30 executes a line connection process for line-connecting with the center control unit 50 corresponding to the communication mode flag COMMF, and then, the program flow goes to step S118.

At step S118, it is judged whether or not the line connection flag LCNF is set at one. The line connection flag LCNF represents whether or not the on-line controller 30 is connected to the center control unit 50 through the telephone line in the line connection process. If the line connection flag LCNF is set at zero (No at step S118), the program flow goes back to S110 since the on-line controller 30 has not been connected to the center control unit 50. On the other hand, if the line connection flag LCNF is set at one (Yes at step S118), the line connection flag LCNF is reset to zero at step S119 since the on-line controller 30 has been connected to the center control unit 50 through the telephone line, and then, the program flow goes to step S120 of FIG. 13d.

At step S120, a count value n of a channel counter is set at one, and then, the program flow goes to step S121. The channel counter is provided for data-communicating with the center control unit 50 by sequentially switching plural copy data controllers 20 one by one, and the count value n thereof represents the channel number of the copy data controller 20.

At step S121, it is judged whether or not a protocol mode flag PRTF is set at one. The protocol flag can be set when the operator operates the switch 208 of the operation panel. When the protocol mode flag PRTF is set at one, it represents that the first protocol mode is selected. On the other hand, the protocol mode flag PRTF is set at zero, it represents that the second protocol mode is selected.

Figure 17:
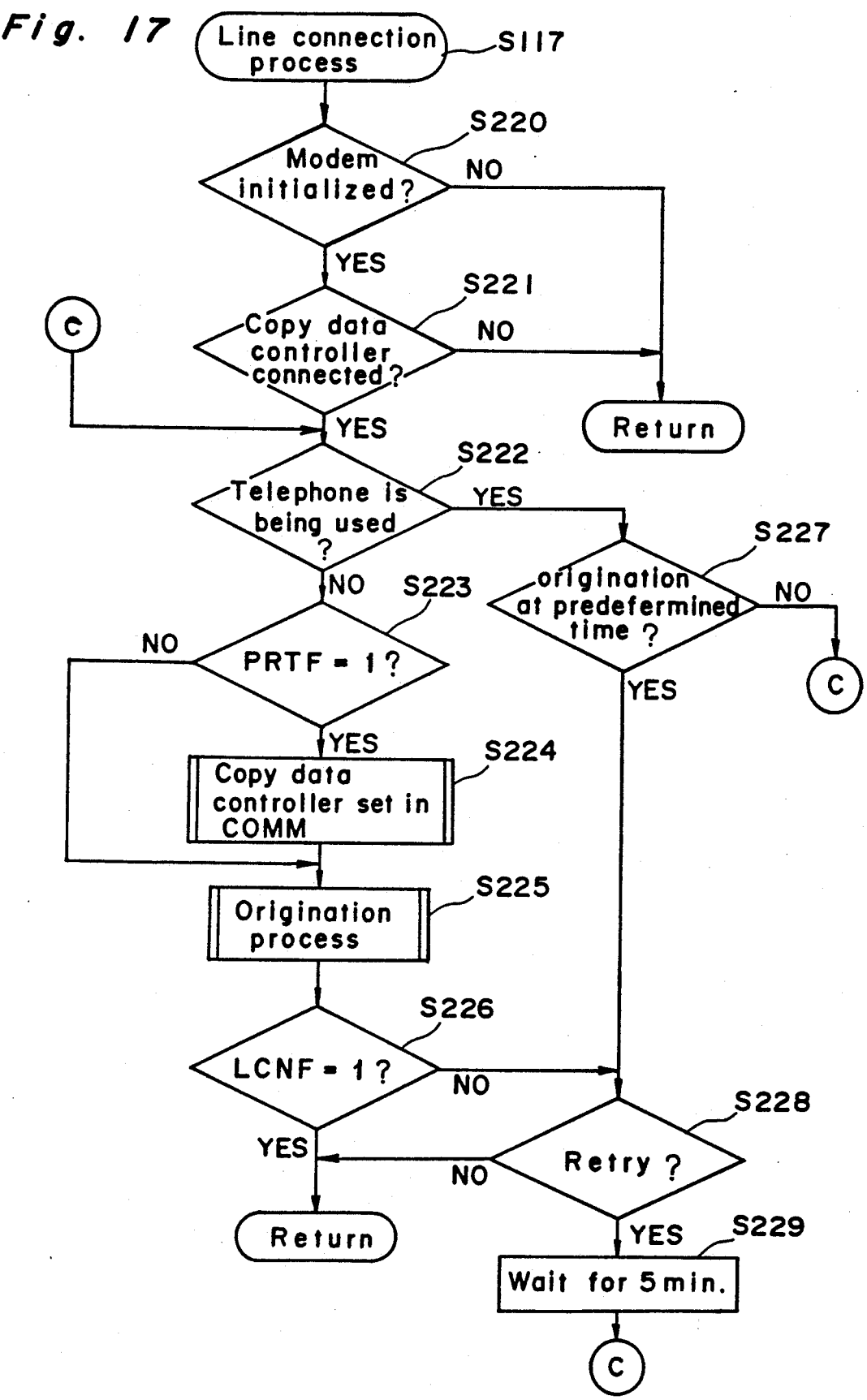
FIG. 17 is a flowchart showing a line connection process of a subroutine of the on-line controller shown in FIG. 1.

If the protocol mode flag PRTF is set at one (Yes at step S121) or first protocol mode is selected, all the connected copy data controllers 20 have been set in the communication mode at step S117 (See steps S223 and S224 of FIG. 17). Then, there is executed a copy data controller switching process at step S122. Thereafter, it is judged at step S123 whether or not a switching request flag SWRF is set at one, and then, it is judged at step S125 whether or not a release request flag RELF is set at one at step S125. The switching request flag SWRF is set at one when the on-line controller 30 receives the line switching request signal from the center control unit 50 in the communication interruption process shown in FIG. 28. On the other hand, the release request flag RELF is set at one when the on-line controller 30 receives the line release request signal from the center control unit 50 in the communication interruption process shown in FIG. 28.

If the switching request flag SWRF is set at one (Yes at step S123), the switching request flag SWRF is reset to zero at step S124, and then, the program flow goes back to step S122. On the other hand, if the switching request flag SWRF is set at zero (No at step S123) and the release request flag RELF is set at one (Yes at step S125), the release request flag RELF is reset to zero at step S126, and then, the on-line controller 30 transmits the line release acknowledge signal to the center control unit 50 at step S127. Thereafter, the connected telephone line is disconnected at step S128, and then, the program flow goes back to step S110.

It is to be noted that, if the switching request flag SWRF is set at zero (No at step S123) and the release request flag RELF is set at zero (No at step S125), the program flow goes back to step S123.

Figure 13D:
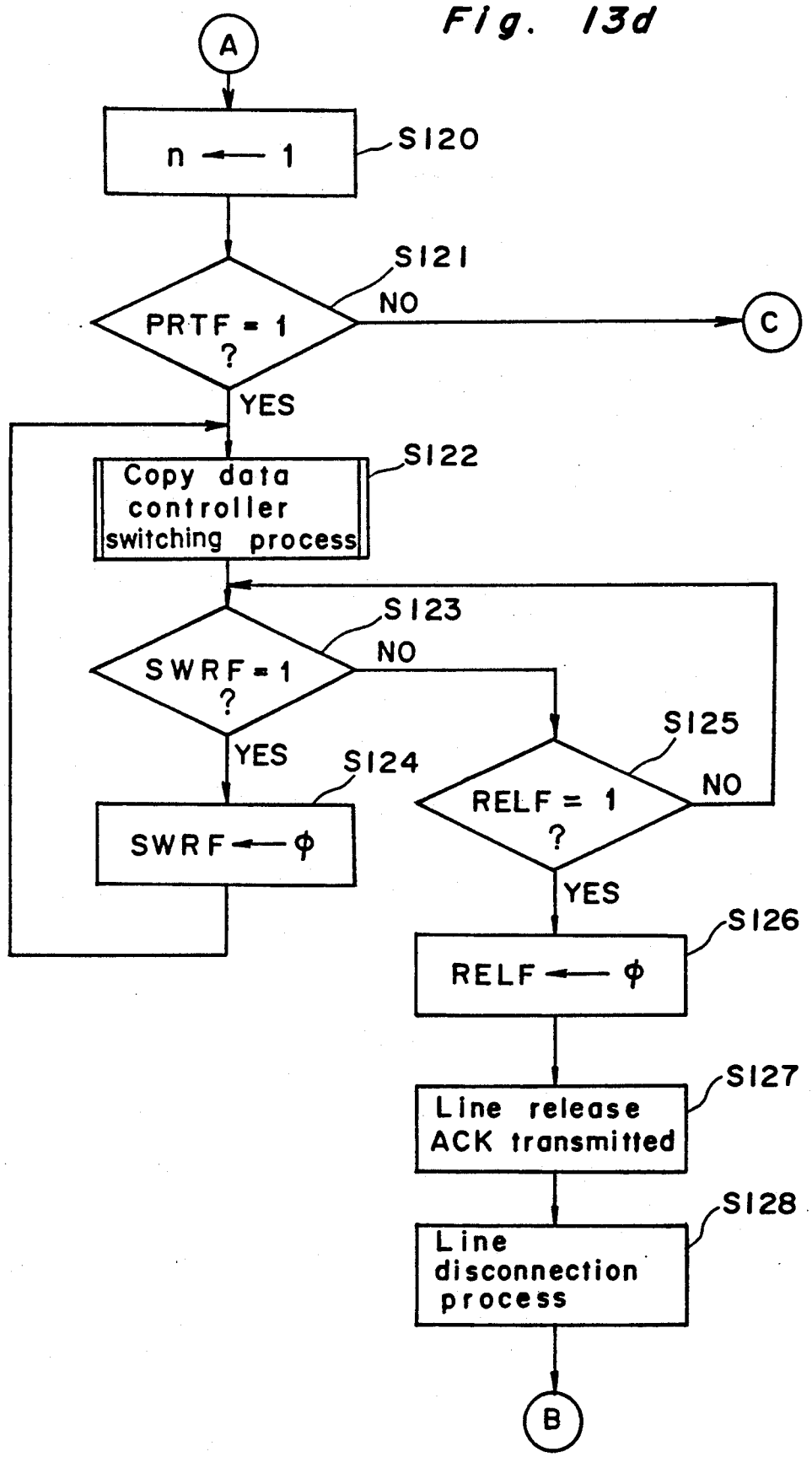
Figure 13E:
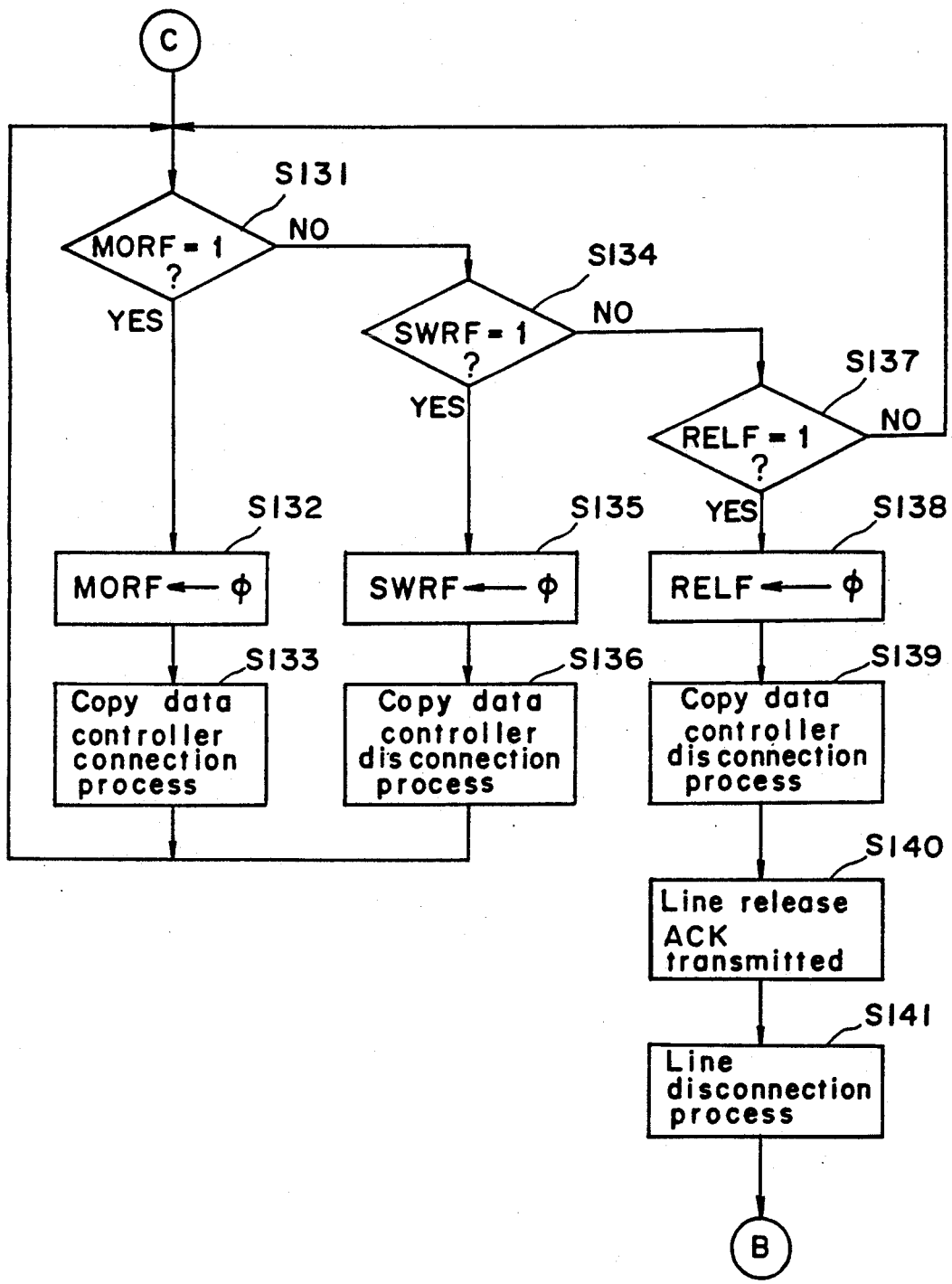

If the protocol flag PRTF is set at zero (No at step S121) or the second protocol mode is selected, the program flow goes to step S131 of FIG. 13e. In the second protocol mode, after connecting to the center control unit 50 through the telephone line, each of the copy data controllers 20 is sequentially set in the communication mode and the copy data are received from each of the copy data controllers 20.

It is judged at step S131 whether or not the mode request flag MORF is set at one, it is judged at step S134 whether or not the switching request flag SWRF is set at one, and then, it is judged at step S137 whether or not the release request flag RELF is set at one. In the communication interruption process, the mode request flag MORF becomes one when the on-line controller 30 receives the mode confirmation signal, the switching request flag SWRF becomes one when the on-line controller 30 receives the line switching request signal, and the release request flag RELF becomes one when the on-line controller 30 receives the line release request signal.

If the mode request flag MORF is set at one (Yes at step S131), the mode request flag MORF is reset to zero at step S132, and then, there is executed a copy data controller connection process at step S133. The program flow goes back to step S131. On the other hand, if the switching request flag SWRF is set at one (Yes at step S134), the switching request flag SWRF is reset to zero at step S135, and then, there is executed a copy data controller disconnection process at step S136. Thereafter, the program flow goes back to step S131.

Further, if the release request flag RELF is set at one (Yes at step S137), the release request flag RELF is reset to zero, there is executed the copy data controller disconnection process at step S139, and then, the on-line controller 30 transmits the line release acknowledge signal to the center control unit 50. Thereafter, the telephone line connected to the center control unit 50 is disconnected at step S141, and then, the program flow goes back to step S110.

If the mode request flag MORF is set at zero (No at step S131), the switching request flag SWRF is set at zero (No at step S134) and the release request flag RELF is set at one (No at step S137), the program flow goes back to step S131.

The above-mentioned processes are the main routine of the on-line controller 30. The subroutines thereof will be described below.

Figure 14A:
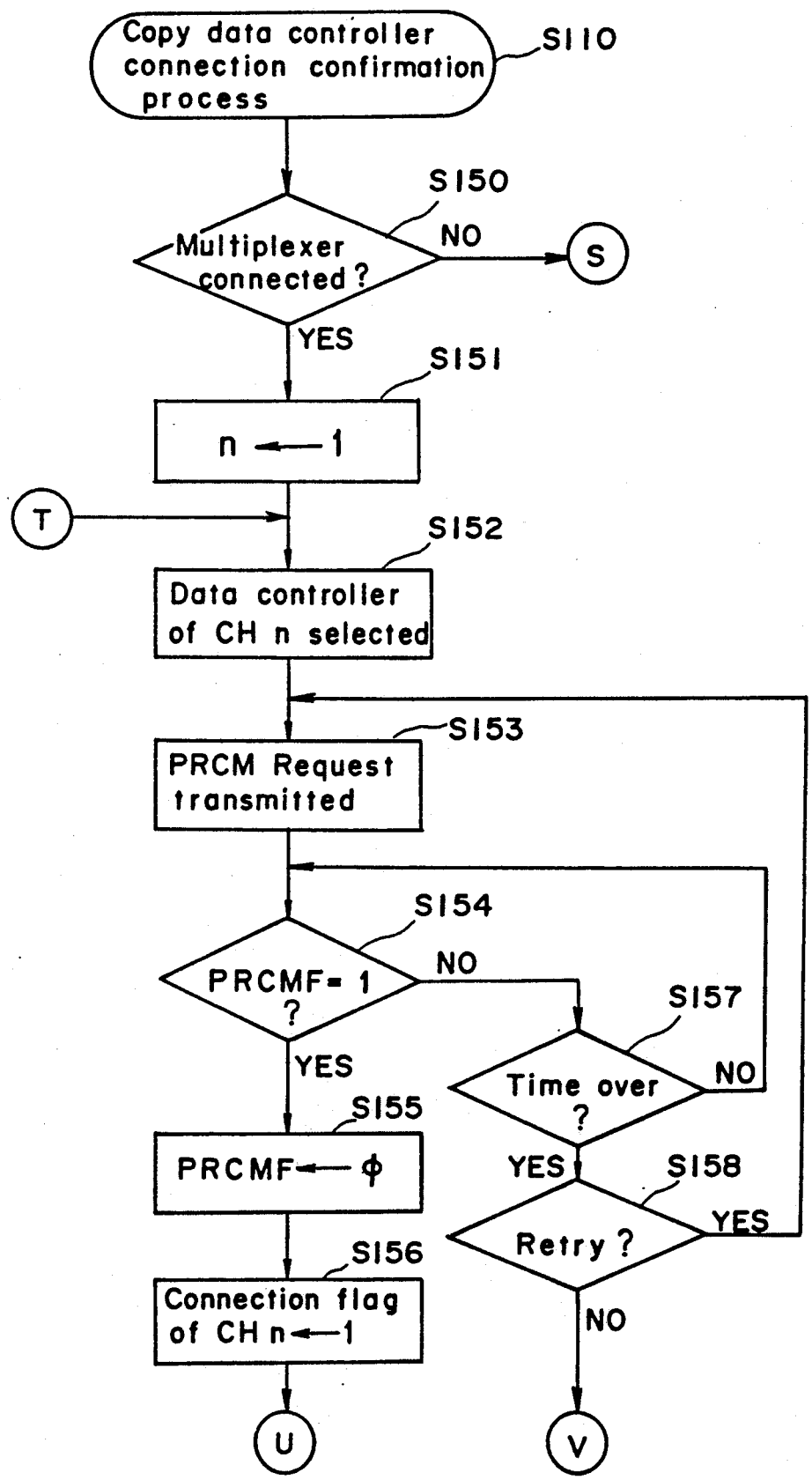
FIGS. 14a to 14c are flowcharts showing a copy data controller connection confirmation process of a subroutine of the on-line controller shown in FIG. 1.
Figure 14B:
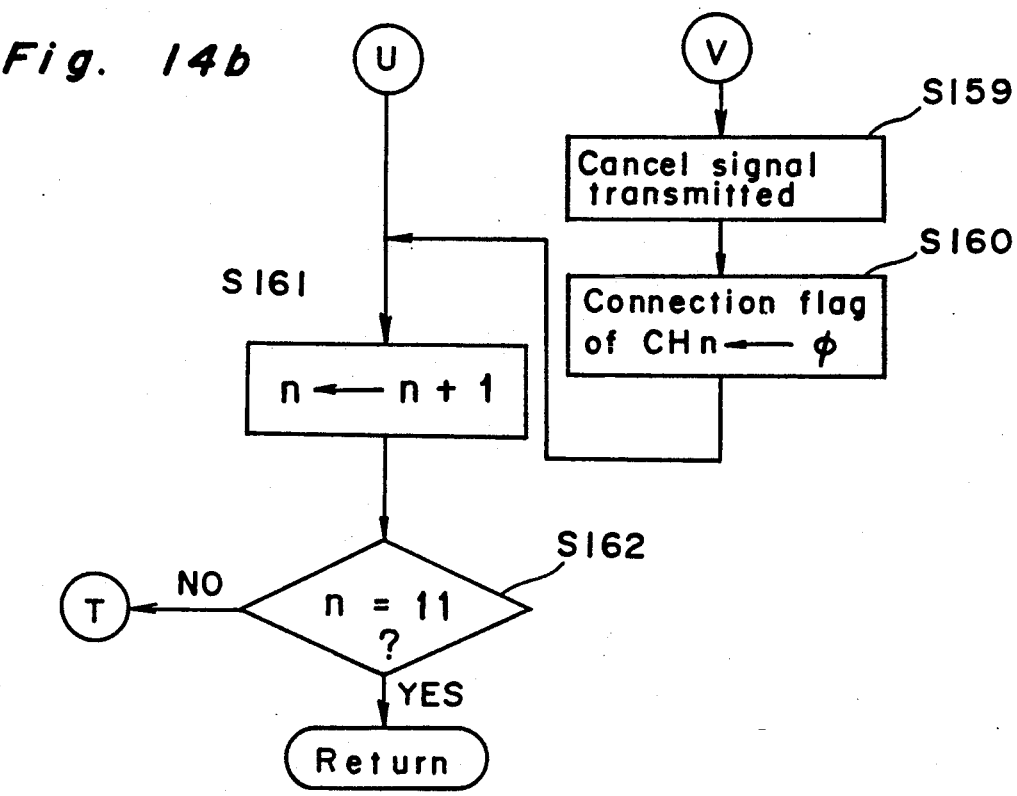
Figure 14C:
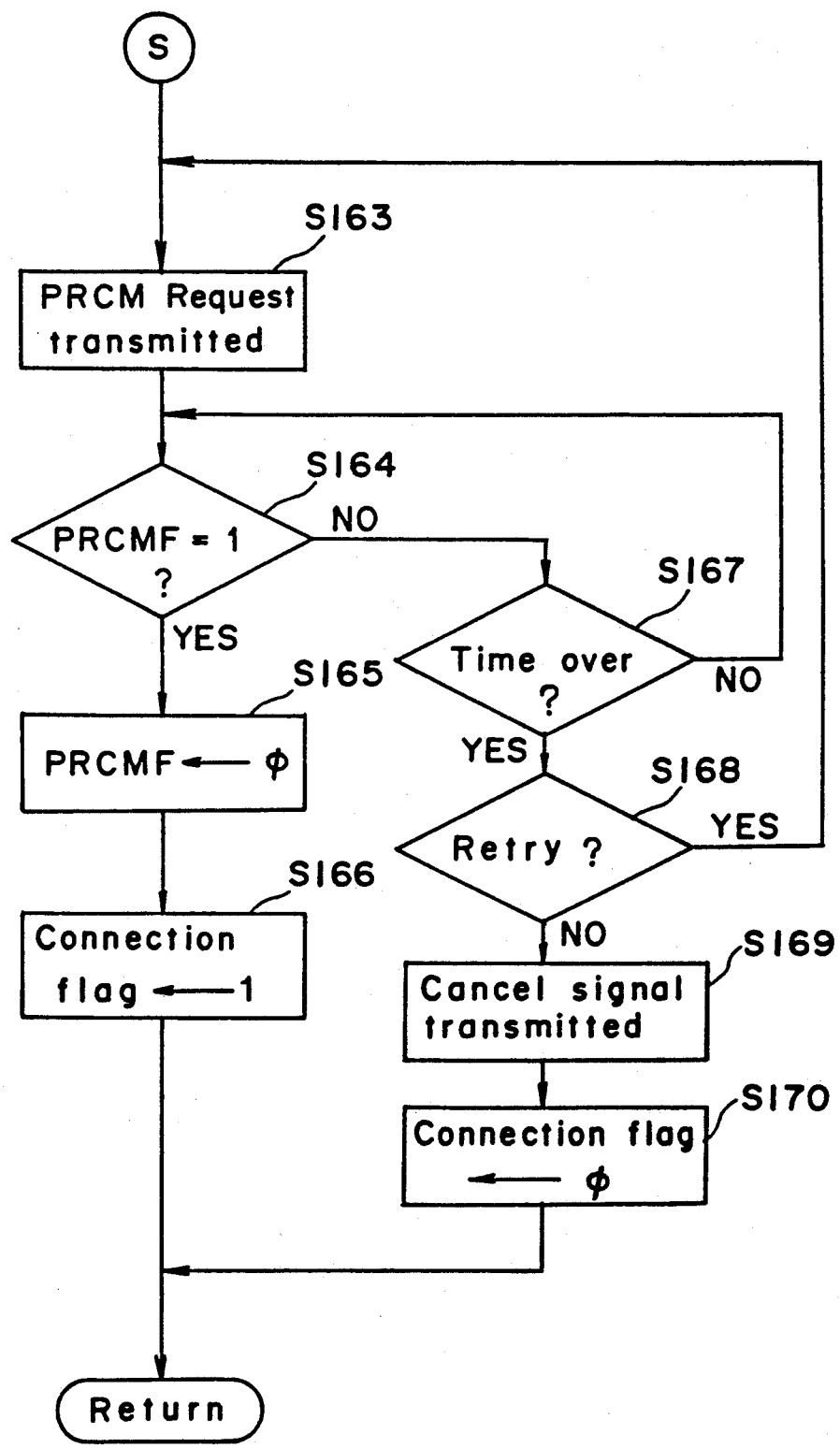

FIGS. 14a to 14c are flowcharts showing a subroutine of the copy data controller connection confirmation process (step S110 of FIG. 13a).

Referring to FIG. 14a, first of all, it is judged at step S150 whether or not there is a multiplexer 35 in the on-line controller 30. If there is a multiplexer 35 in the on-line controller 30 (Yes at step S150), the count value n of the channel counter is set at one at step S151, and then, the program flow goes to step S152. Thereafter, the multiplexer 35 is controlled so as to be connected to the copy data controller 20 of the channel n, and then, the on-line controller 30 transmits the processing mode request signal to the selected copy data controller 20.

Thereafter, it is judged at step S154 whether or not the processing mode acknowledge signal has been received from the copy data controller 20 or the processing mode flag PRCMF is set at one. If the processing mode flag PRCMF is set at zero (No at step S154), the program flow goes from S157 to S154. Then, when the time of three seconds has been passed after transmitting the processing mode request signal and the time counter has counted up to three seconds or the time counter becomes the time over state (Yes at step S157), it is judged at step S158 whether or not the on-line controller 30 has retried to transmit the processing mode request signal twice. This process of step S158 is executed since there is a possibility of not normally receiving the transmitted processing mode request signal due to any trouble, and thereby, not transmitting the processing mode acknowledge signal. On the other hand, if the number of times of the above-mentioned retry does not become two, the program flow goes back to step S153, and the processing mode request signal is transmitted again.

If the processing mode acknowledge signal can not be received from the copy data controller 20 even though the processing mode request signal is transmitted three times in all (No at step S158), it is judged that the copy data controller 20 is not connected thereto, and then, the cancel signal is transmitted to the copy data controller 20 at step S159 of FIG. 14b. Thereafter, a connection flag of the channel n representing whether or not the copy data controller 20 of the channel n is connected thereto is reset to zero at step S160, and then, the program flow goes to step S161.

On the other hand, if the processing mode flag PRCMF is set at one (Yes at step S154 of FIG. 14a), the processing mode flag PRCMF is reset to zero at step S155, and ten, the connection flag of the channel n is set at one at step S156. Thereafter, the program flow goes to step S161 of FIG. 14b.

Referring to FIG. 14b, one is added to the count value n of the channel counter at step S161, and then, it is judged at step S162 whether or not the count value n of the channel counter is set at eleven. If the the count value n of the channel counter is set at eleven (Yes at step S162), it is judged that the line connection confirmation process is completed for the copy data controllers 20 of all the channels, and then, the program flow returns to the main routine. On the other hand, if the count value n is equal to or smaller than ten (No at step S162), there is executed the above process for the next channel from step S152.

If there is not any multiplexer 35 in the on-line controller 30 (No at step S150), there is executed at step S163 to S170 the above connection confirmation process similar to that from step S153 to step S160 for one copy data controller 20, and then, the program flow returns to the main routine.

Figure 15:
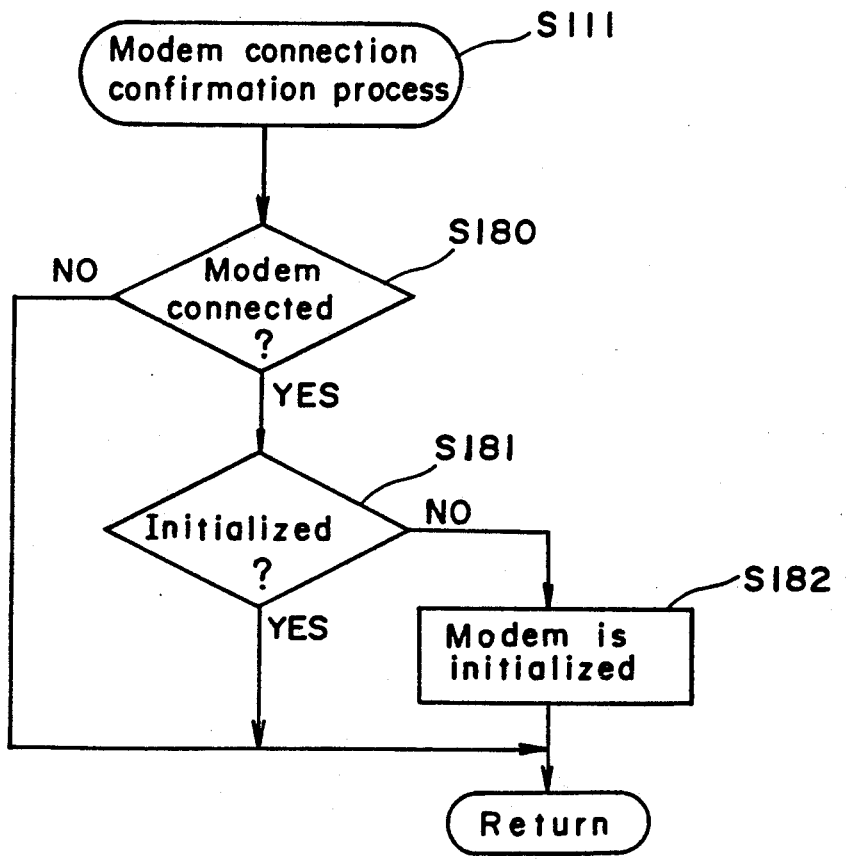
FIG. 15 is a flowchart showing a modem connection confirmation process of a subroutine of the on-line controller shown in FIG. 1.

FIG. 15 is a flowchart showing the modem connection confirmation process (step S111 of FIG. 13a).

Referring to FIG. 15, first of all, it is judged at step S180 whether or not there is the modem 33 in the on-line controller 30. If there is not any modem 33 in the on-line controller 30 (No at step S180), the program flow returns to the main routine. On the other hand, if there is the modem 33 in the on-line controller 30 (Yes at step S180), it is judged at step S181 whether or not the modem 33 has been initialized. If the modem 33 has been initialized (Yes at step S181), the program flow returns to the main routine. On the other hand, if the modem 33 has not been initialized (No at step S181), the modem 33 is initialized at step S182, and then, the program flow returns to the main routine.

Figure 16A:
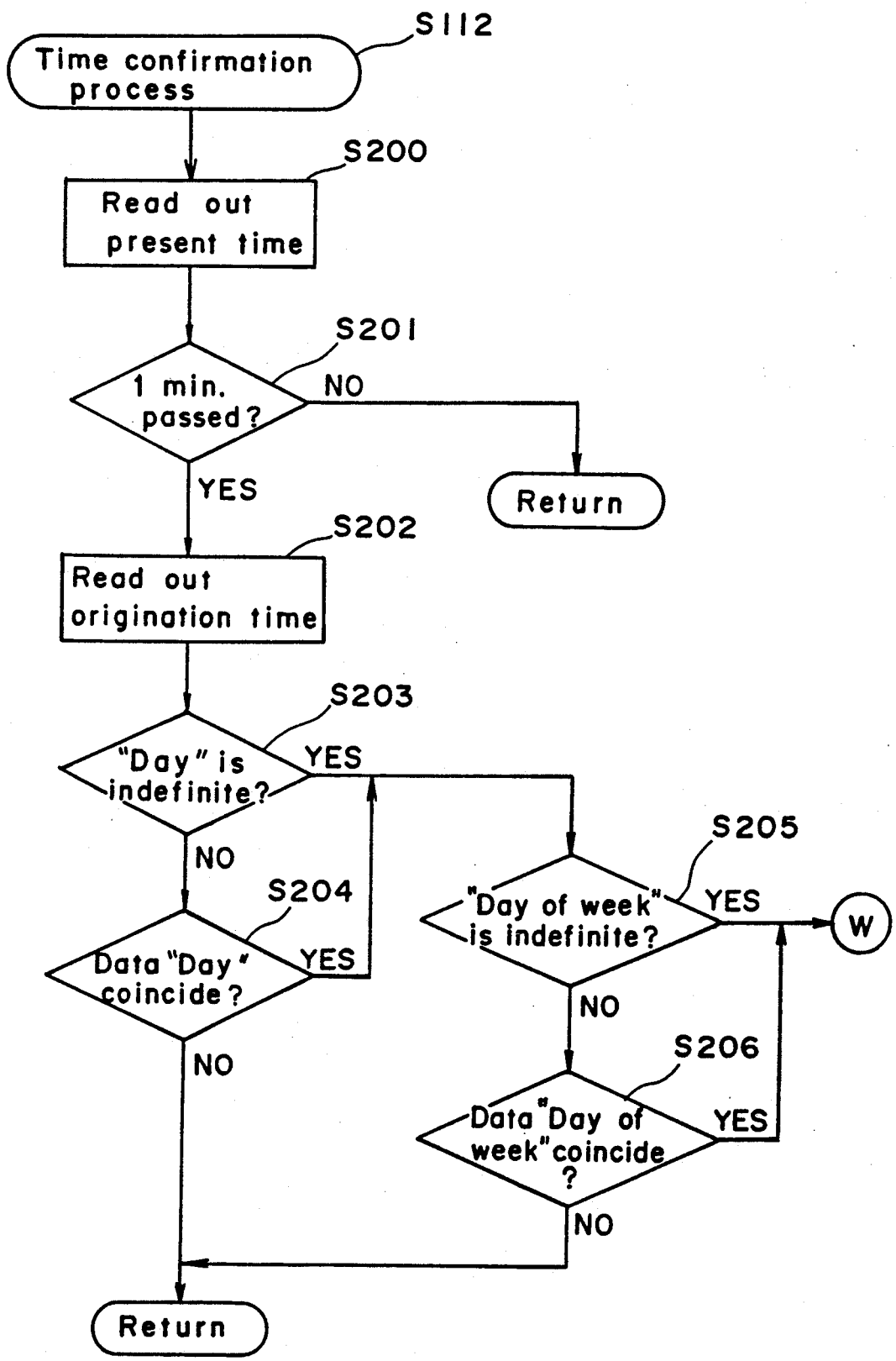
FIGS. 16a and 16b, are flowcharts showing a time confirmation process of a subroutine of the on-line controller shown in FIG. 1.
Figure 16B:
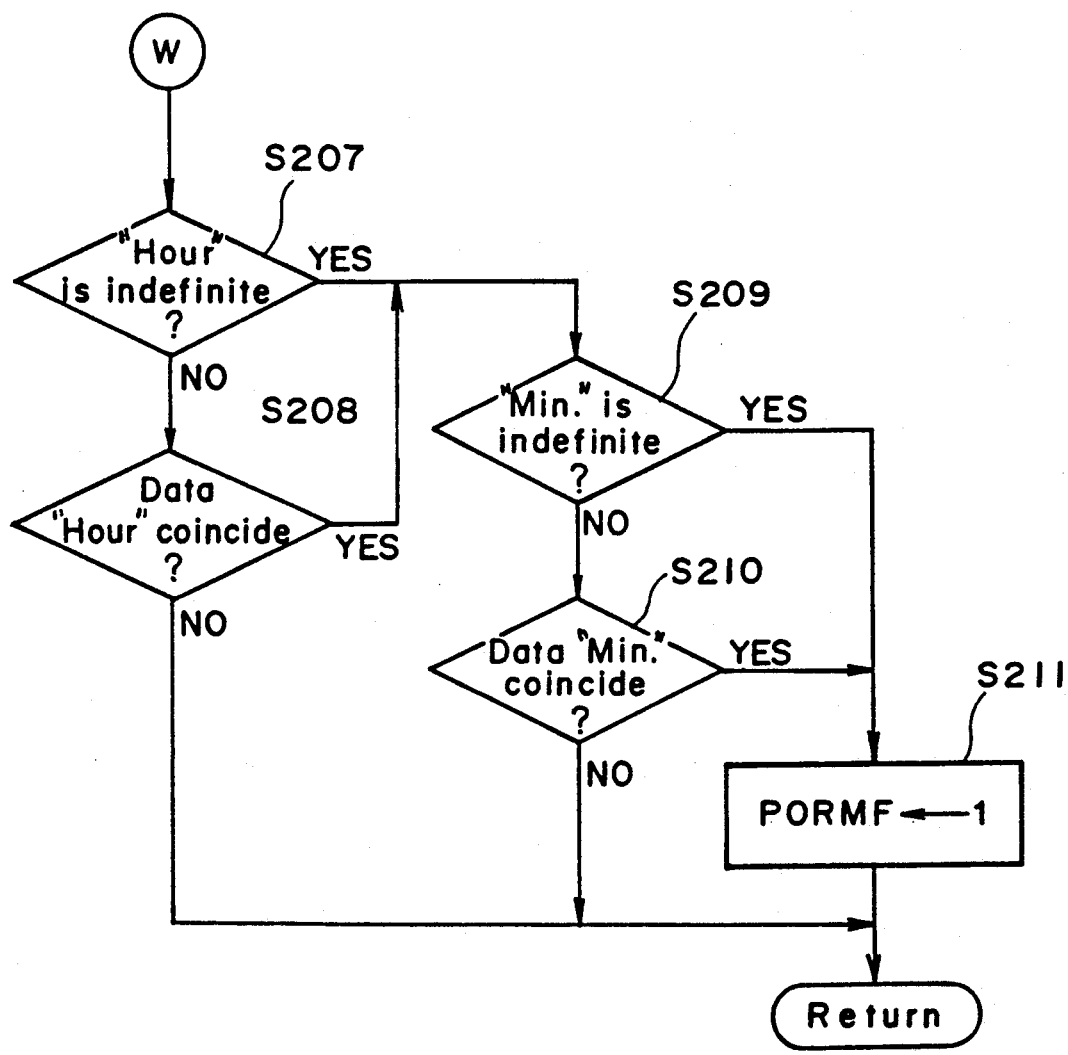

FIGS. 16a and 16b are flowcharts showing the time confirmation process (step S112 of FIG. 13a).

Referring to FIG. 16a, first of all, data of the present time is read out from the real time clock 204 at step S200, and then, it is judged at step S201 whether or not one minute has been passed from a time when the present time has been read out or data of "minute" has been changed. This process of step S201 is executed in order to confirm the origination time once a minute. If one minute has not been passed yet from the previous reading out time (No at step S201), the program flow returns to the main routine, directly. On the other hand, if one minute has been passed from the previous reading out time (Yes at step S201), there is executed a process for confirming the origination time at step S202 and more.

First of all, data of the origination time which has been preset using the maintenance switch 206 are read out at step S202, and then, the read out origination time is compared with the present time which have been read out at step S200. It is judged at steps S203, S205, S207 and S209 whether or not each of preset data of "Day", "Day of week", "Hour", and "Minute" of the origination time are indefinite. If each of preset data are indefinite, it is judged that the origination condition is effected even though data of the present time corresponding to the indefinite preset time are any data. For example, when data of "Day" of the origination time is set at a predetermined value and data of "Day of week" thereof is indefinite, the origination condition is effected once a month. When data of "Day" of the origination time is indefinite and data of "Day of week" thereof is set in a predetermined value, the origination condition is effected once a week.

If each of the preset data of the origination time are not indefinite (No at steps S203, S205, S207 and S209), it is judged at steps S204, S206, S208 and S210 whether or not each data of the preset origination time coincide with each of corresponding data of the present time, respectively. If each data of the preset origination time do not coincide with each of corresponding data of the present time, the program flow goes from either one of steps S204, S206, S208 and S210 to the main routine.

On the other hand, if data of "Day" of the preset origination time coincide with corresponding data of the present time (Yes at step S204), the program flow goes to step S205. If data of "Day of week" of the preset origination time coincide with corresponding data of the present time (Yes at step S206), the program flow goes to step S207. If data of "Hour" of the preset origination time coincide with corresponding data of the present time (Yes at step S208), the program flow goes to step S209. If data of "Minute" of the preset origination time coincide with corresponding data of the present time (Yes at step S210), the program flow goes to step S211.

Then, if the preset origination time coincide with the present time, the predetermined time origination flag PORMF is set at one at step S211 in order to set the predetermined time origination mode, and then, the program flow returns to the main routine.

FIG. 17 is a flowchart showing the line connection process (step S117 of FIG. 13b) for connecting to the center control unit 50 through the telephone line.

Referring to FIG. 17, first of all, it is judged at step S220 whether or not the modem 33 has been initialized. If the modem 33 has not initialized (No at step S220), the program flow returns to the main routine. On the other hand, if the modem 33 has been initialized (Yes at step S220), it is judged at step S221 whether or not the copy data controller 20 is connected to the on-line controller 30, or the connection flags of the copy data controller 20 are set at one.

In the case that there is not any multiplexer 35 in the on-line controller 30, when the connection flag of one copy data controller 20 is set at zero, or in the case that there is a multiplexer 35 in the on-line controller 30, when the connection flags of the copy data controllers 20 of all the channels are set at zero, it is judged that any copy data controller 20 is not connected thereto, and then, the program flow returns to main routine. On the other hand, if at least one copy data controller 20 is connected thereto, it is judged at step S222 based on a predetermined signal transmitted from the modem 33 whether or not the telephone 40 which is connected to the modem 33 is being used.

If the telephone 40 is being used (Yes at step S222), it is judged at step S227 whether or not the emergency origination flag EORMF is set at one, or the emergency origination mode is set. If the emergency origination mode is set (No at step S227), the program flow goes back to step S222, and the on-line controller 30 waits until the telephone 40 becomes an unused state in order to transmit predetermined data as soon as the telephone 40 becomes the unused state. On the other hand, if the predetermined time origination mode is set (Yes at step S227), it is judged at step S228 whether or not the recheck process for checking whether or not the telephone 40 is being used is executed repeatedly ten times in all.

If the above recheck process is executed repeatedly ten times in all (Yes at step S228), the program flow returns to the main routine. On the other hand, if the recheck process is not executed ten times or more, the on-line controller 30 waits for five minutes, and then, the program flow goes back to step S222.

In this program flow shown in FIG. 17, in the emergency origination mode (No at step S227), when it is necessary to transmit the copy data urgently, the program flow goes to step S223 as soon as the telephone 40 becomes the unused state or the telephone line is not used. On the other hand, in the predetermined time origination mode (Yes at step S227), if the telephone 40 becomes the unused state after waiting for five minutes, the program flow goes to step S223.

It is judged at step S223 whether or not the protocol flag PRTF is set at one or either the first protocol mode or the second protocol mode is set. If the first protocol mode is set (Yes at step S223), the communication mode request signal is transmitted to the copy data controller 20 at step S224 in order to set the copy data controller 20 in the communication mode, and then, the program flow goes to step S225. On the other hand, if the second protocol mode is set (No at step S223), the program flow goes to step S225, directly.

At the step S225, there is executed an origination process for originating to the center control unit 50, it is judged at step S226 whether or not the line connection flag LCNF for representing whether or not the center control unit 50 is connected through the telephone line thereto is set at one. If the line connection flag LCNF is set at one (Yes at step S226), the program flow returns to the main routine. On the other hand, if the line connection flag LCNF is set at zero (No at step S226), the program flow goes to the above step S228. It is to be noted that the line connection flag LCNF becomes one when the on-line controller 30 is connected to the the center control unit 50 in a normal state in the origination process described in detail later.

Figure 18:
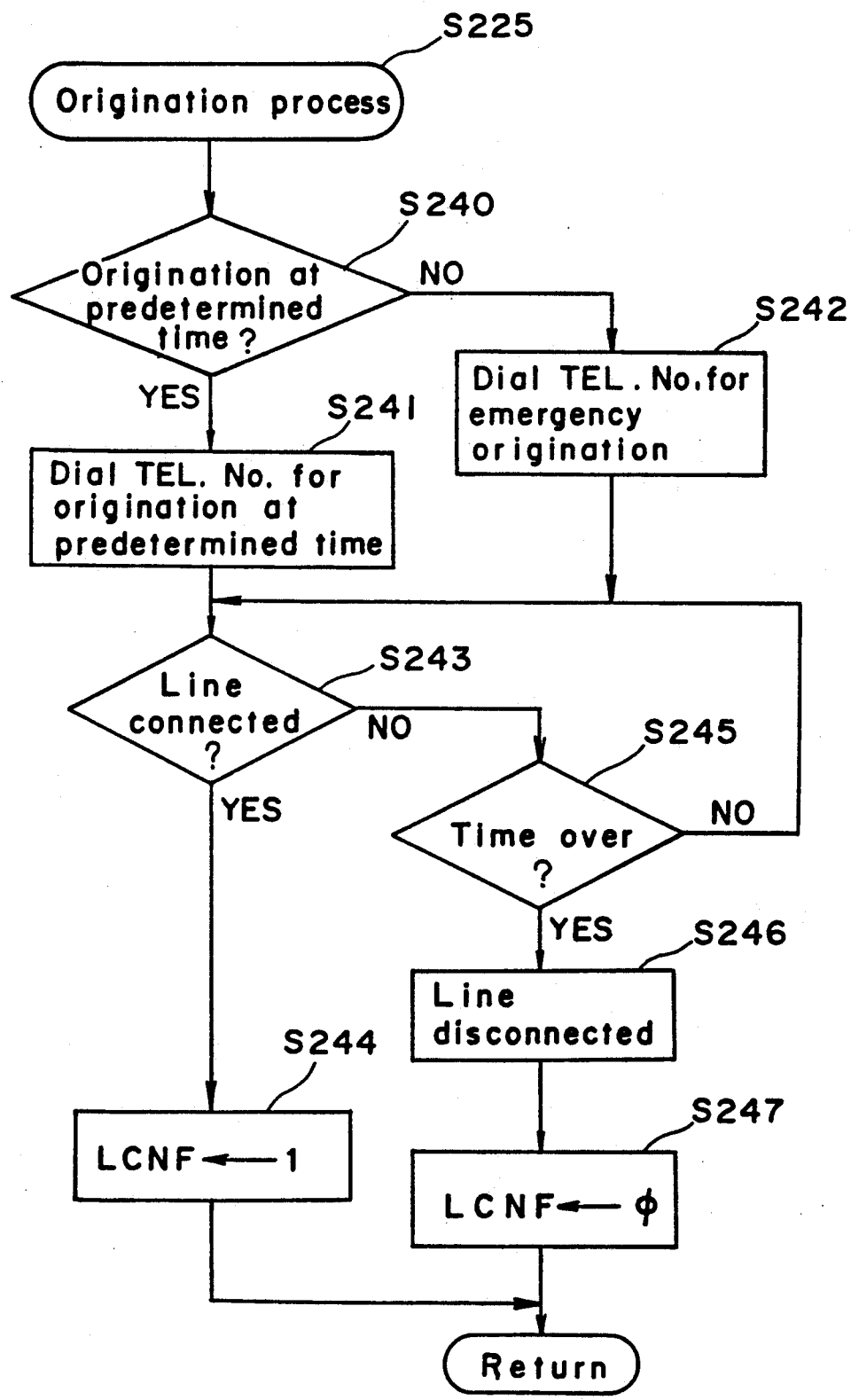
FIG. 18 is a flowchart showing an origination process of a subroutine of the on-line controller shown in FIG. 1.

FIG. 18 is a flowchart showing the origination process (step S225 of FIG. 17).

Referring to FIG. 18, first of all, it is judged at step S240 whether or not the emergency flag EORMF is set at one or either the emergency origination mode or the predetermined time origination mode is set. If the predetermined time origination mode is set (Yes at step S240), the telephone number for the predetermined time origination mode is dialed by the dialer of the modem 33 thereof at step S241, and then, the program flow goes to step S243. On the other hand, if the emergency origination mode is set (No at step S240), the telephone number for the emergency origination mode is dialed by the dialer of the modem 33 thereof at step S242, and then, the program flow goes to step S243.

At step S243, the on-line controller 30 instructs the modem 33 to judge whether or not a predetermined response signal is received from the center control unit 50 after dialing thereto and the center control unit 50 is connected through the telephone line to the on-line controller 30 in a normal state. The program flow goes from step S243 through step S245 to step S243 repeatedly in the loop until the center control unit 50 is connected thereto in the normal state, and then, when a predetermined time has been passed from dialing or a time counter has counted up to the predetermined time (Yes at step S245), there is executed the line disconnection process for the telephone line at step S246, and then, the line connection flag LCNF is reset to zero at step S247. Thereafter, the program returns to the main routine.

On the other hand, if the center control unit 50 is connected through the telephone line thereto in the normal state (Yes at step S243), the line connection flag LCNF is set at one, and then, the program flow returns to the main routine.

Figure 19:
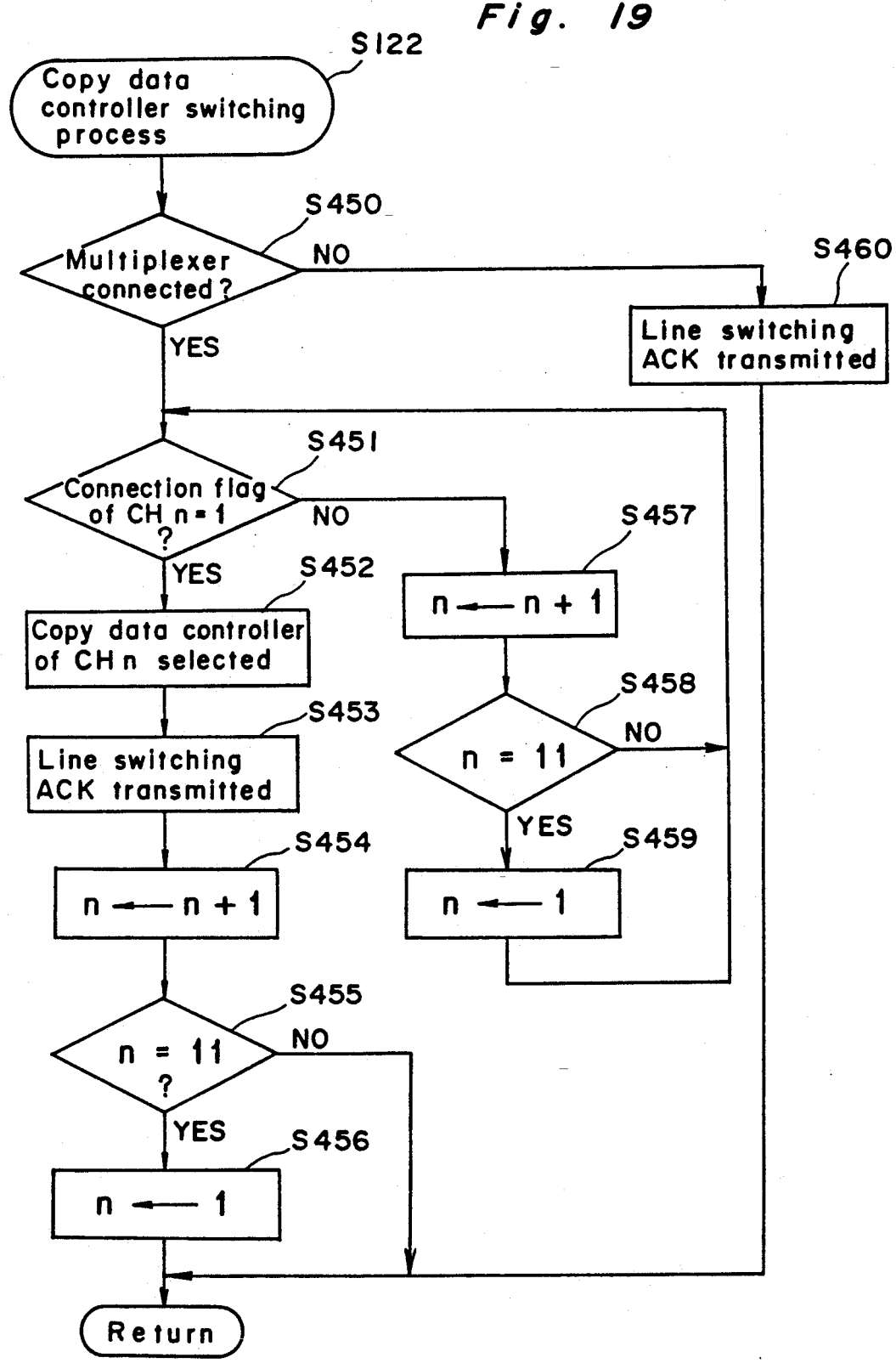
FIG. 19 is a flowchart showing a copy data controller switching process of a subroutine of the on-line controller shown in FIG. 1.

FIG. 19 is a flowchart showing the copy data controller switching process (step S122 of FIG. 13d).

Referring to FIG. 19, first of all, it is judged at step S450 whether or not there is any multiplexer 35 in the on-line controller 30. If there is not any multiplexer 35 therein (No at step S450), the on-line controller 30 transmits the line switching acknowledge signal to the center control unit 50, and then, the program flow returns to the original routine. On the other hand, there is a multiplexer 35 therein (Yes at step S450), it is judged at step S451 whether or not the connection flag of the channel n is set at one.

If the connection flag of the channel n is set at one (Yes at step S451), the on-line controller 30 instructs the multiplexer 35 to connect to the copy data controller 20 of the channel n at step S452, and then, the on-line controller 30 transmits the line switching acknowledge signal to the center control unit 50 at step S263. Thereafter, one is added to the count value n of the channel counter at step S454, and then, it is judged at step S455 whether or not the count value n thereof is eleven. If the count value n thereof is eleven (Yes at step S455), the count value n thereof is reset to one at step S456, and then, the program flow returns to the original routine. On the other hand, if the count value n thereof is not eleven (No at step S455), the program flow returns to the original routine, directly.

On the other hand, if the connection flag of the channel n is set at zero (No at step S451), the program flow goes to step S457, and then, one is added to the count value n of the channel counter. Thereafter, it is judged at step S458 whether or not the count value n thereof is eleven. If the count value n thereof is equal to or smaller than ten (No at step S458), the program flow goes back to step S451. On the other hand, if the count value n thereof is eleven (Yes at step S458), the count value n thereof is reset to one at step S459 since the connection process is executed for all the copy data controllers 20, and the, the program flow goes back to step S451.

Figure 20A:
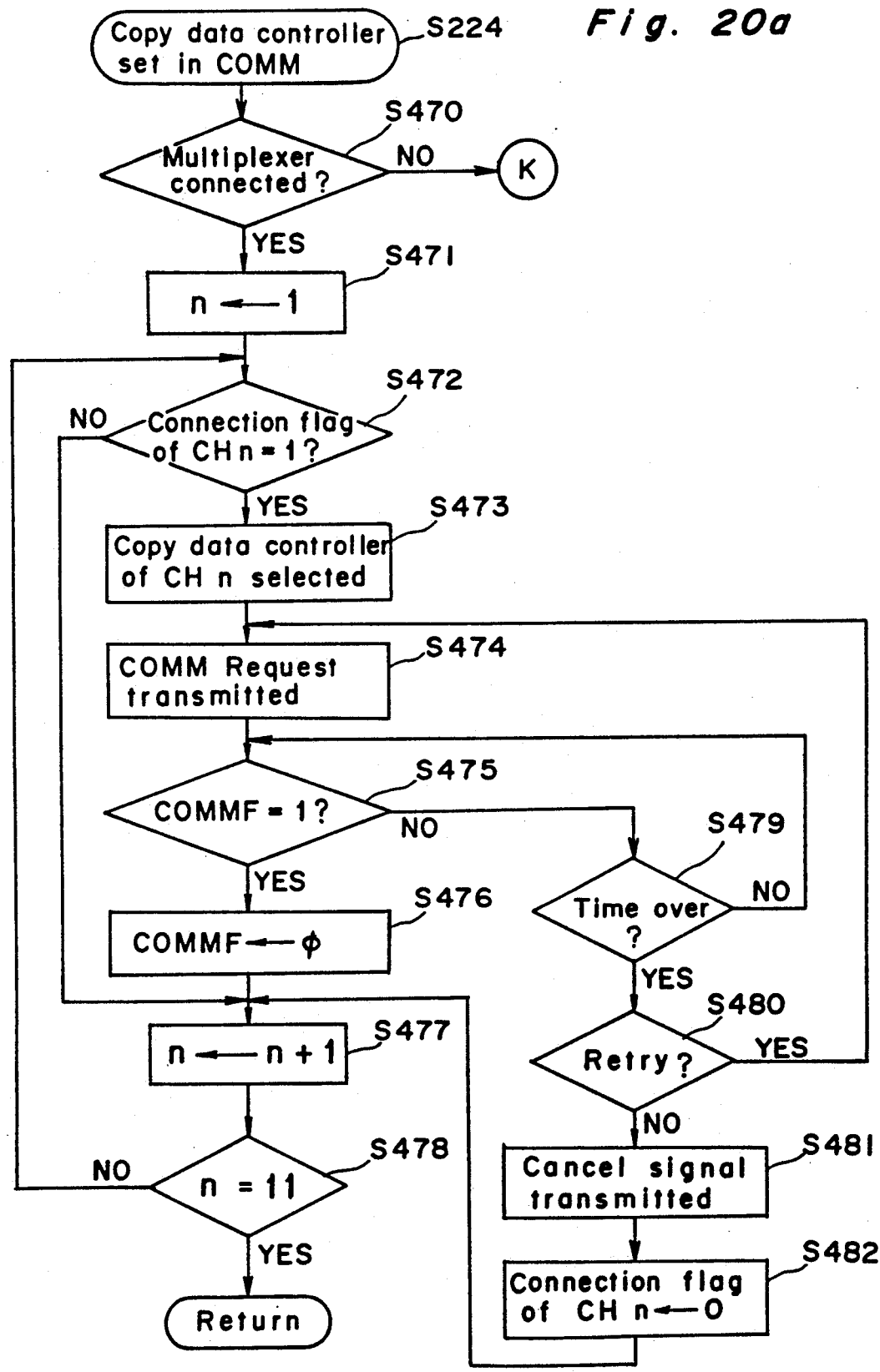
FIGS. 20a and 20b are flowcharts showing a copy data controller setting in a communication mode process of a subroutine of the on-line controller shown in FIG. 1.
Figure 20B:
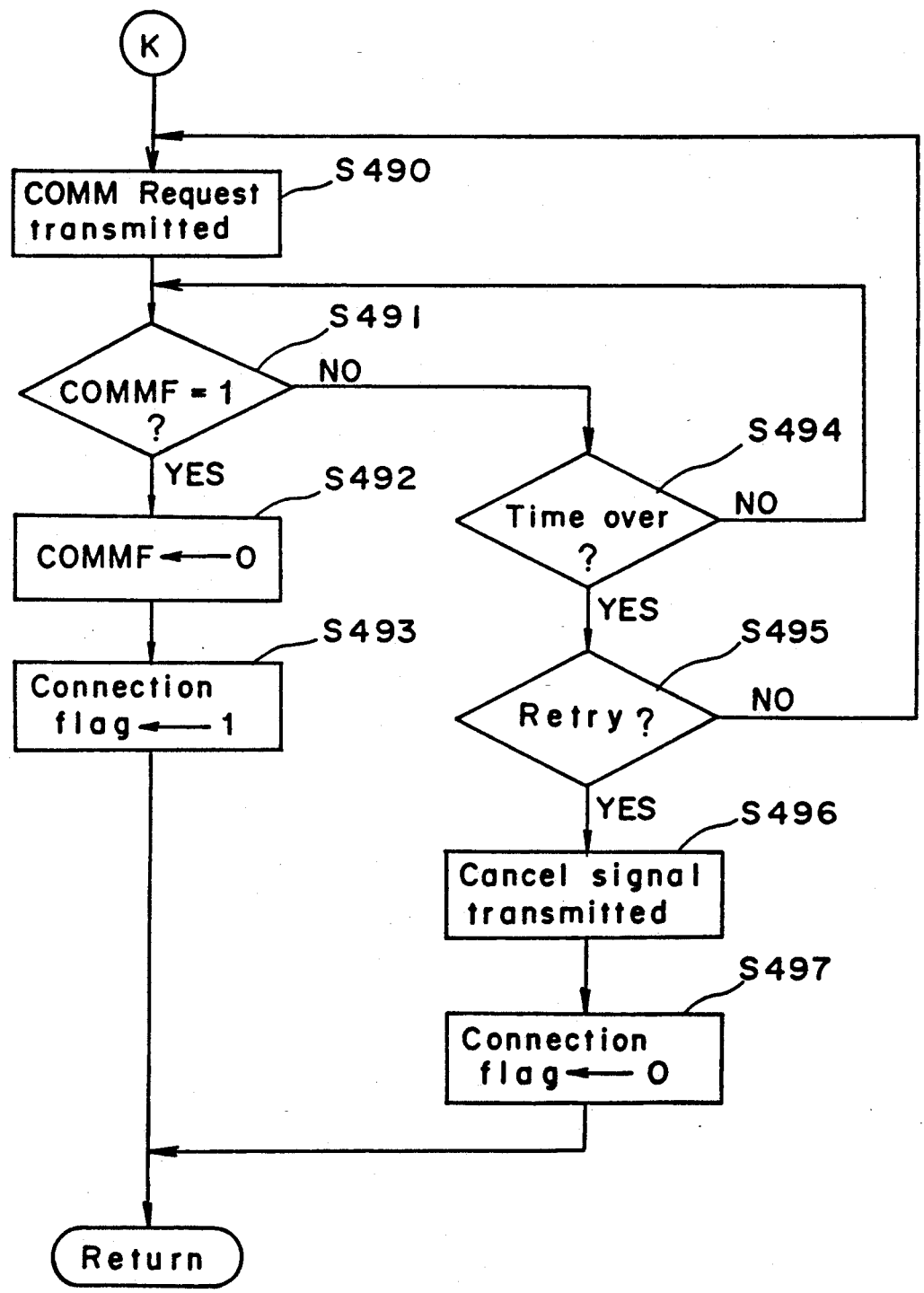

FIGS. 20a and 20b are flowcharts showing the copy data controller setting in the communication mode process (step S224 of FIG. 17).

Referring to FIG. 20a, first of all, it is judged at step S470 whether or not there is a multiplexer 35 in the on-line controller 30. If there is the multiplexer 35 therein (Yes at step S470), the program flow goes to step S471, and then, the count value n of the channel counter is set at one.

Thereafter, it is judged at step S472 whether or not the connection flag of the the copy data controller 20 of the channel n is set at one. If the connection flag of the copy data controller 20 of the channel n is set at zero (No at step S472), the program flow goes to step S477, directly. On the other hand, if the connection flag thereof is set at one (Yes at step S472), the on-line controller 30 instructs the multiplexer 35 to connect the on-line controller 30 to the copy data controller 20 of the channel n at step S473, and then, the communication mode request signal is transmitted to the copy data controller 20 at step S474. Thereafter, the program flow goes to step S475.

It is judged at step S475 whether or not the communication mode flag COMMF for representing whether or not the communication mode acknowledge signal is received from the copy data controller 20. If the communication mode flag COMMF is set at one (Yes at step S475), the communication mode flag COMMF is reset to zero at step S476 since the communication mode acknowledge signal has been received therefrom, and then, the program flow goes to step S477.

On the other hand, if the communication mode flag COMMF is set at zero (No at step S475), the program flow goes to step S479 since the communication mode flag has not received yet, and then, it is judged whether or not three seconds has been passed after transmitting the communication mode request signal or the time counter has counted up to three seconds. If the time counter has not counted up (No at step S479), the program flow goes back to step S475, and then, the program flow goes from step S475 through step S479 to step S475 repeatedly in the loop until the communication mode flag COMMF becomes one or the time counter has counted up to three seconds.

If the time counter has counted up to three seconds (Yes at step S479), it is judged at step S480 whether or not the number of times of retransmission of the communication mode request signal is equal to or larger than two. If the number of times of the retransmission is not equal to or larger than two (No at step S480), the program flow goes to step S474, and then, the communication mode request signal is retransmitted to the copy data controller 20 at step S474. On the other hand, if the number of times of the retransmission is equal to or larger than two (Yes at step S480), the program flow goes to step S481, and then, the cancel signal is transmitted to the copy data controller 20. Thereafter, the program flow goes to step S482, and then, the connection flag of the channel n is set at zero. Thereafter, the program flow goes to step S477.

At step S477, one is added to the count value n of the channel counter, and then, it is judged at step S478 whether or not the count value n thereof is equal to eleven. If the count value n of the channel counter is equal to or smaller than ten (No at step S478), the program flow goes back to step S472. On the other hand, if the count value n of the channel counter is equal to eleven (Yes at step S478), the program flow returns to the original routine since there has been executed the copy data controller setting in the communication mode process for all the the copy data controllers 20.

On the other hand, if there is no multiplexer 35 therein (No at step S470), there is executed a process from step S490 to step S497 shown in FIG. 20b for one copy data controller 20 in a manner similar to the above process from step S474 to step S482, and then, the program flow returns to the original routine. The difference therebetween is to set the connection flag at one at step S493 after step S492.

Figure 21A:
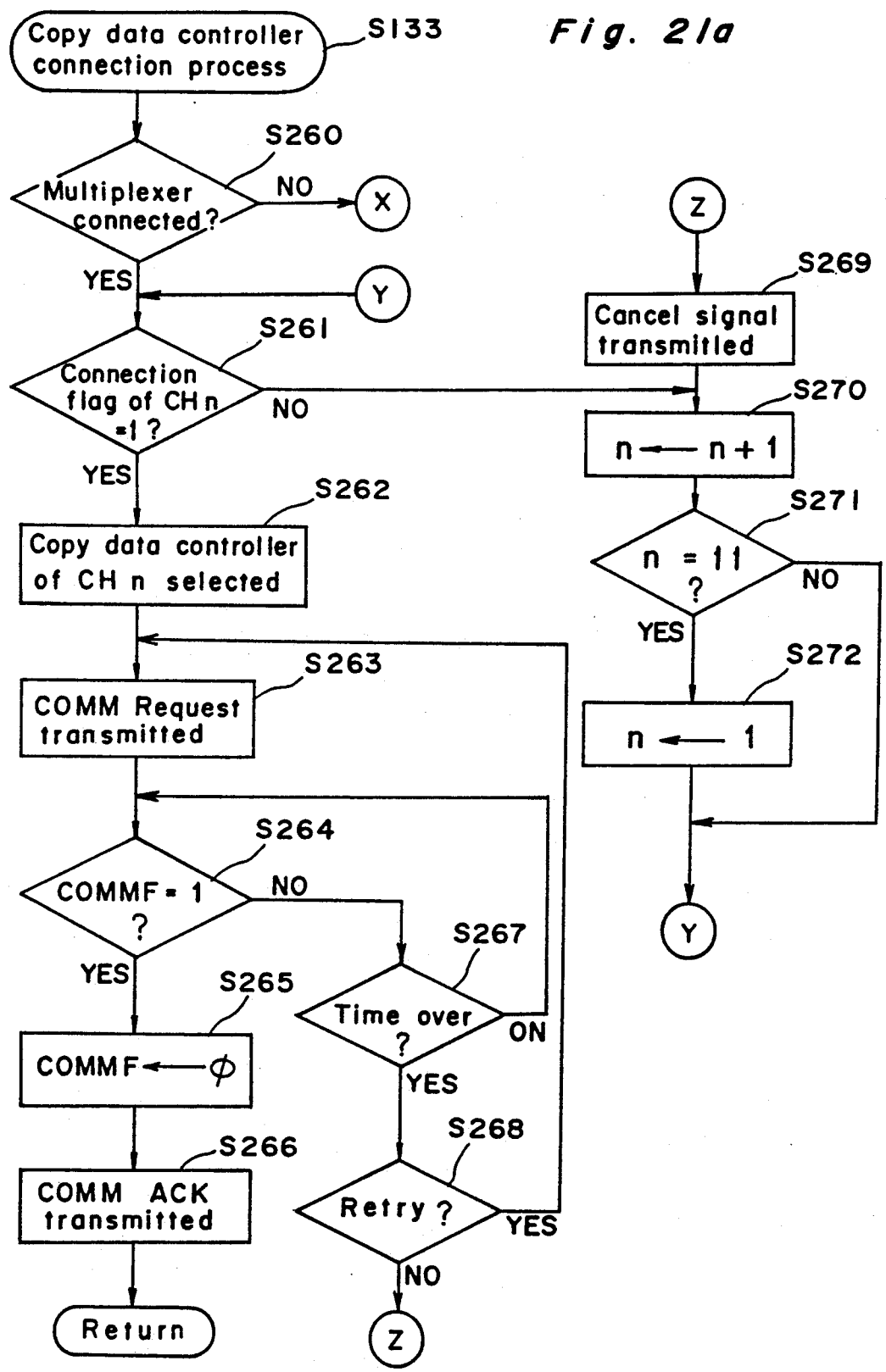
FIGS. 21a and 21b are flowcharts showing a copy data controller connection process of a subroutine of the on-line controller shown in FIG. 1.
Figure 21B:
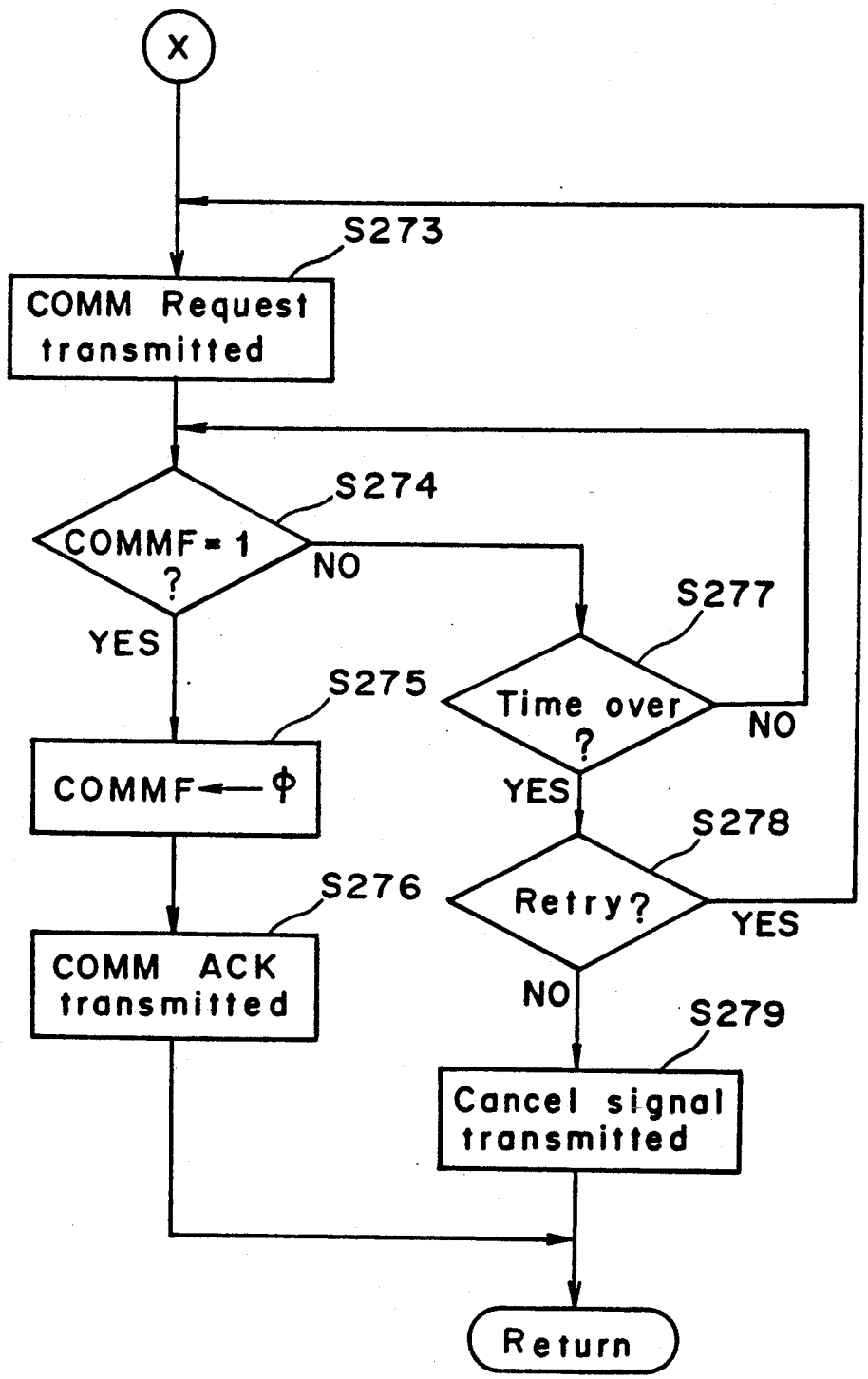

FIGS. 21a and 21b are flowcharts showing the copy data controller connection process (step S133 of FIG. 13e).

Referring to FIG. 21a, first of all, it is judged whether or not there is a multiplexer 35 in the on-line controller 30. If there is the multiplexer 35 therein (Yes at step S260), the program flow goes to step S261. It is judged at step S261 whether or not the connection flag of the copy data controller 20 of the channel n is set at one. If the connection flag thereof is set at zero (No at step S261), the program flow goes to step S270. On the other hand, the connection flag thereof is set at one (Yes at step S261), the on-line controller 30 instructs the multiplexer 35 to connect the on-line controller 30 to the copy data controller 20 of the channel n, and then, the communication mode request signal is transmitted to the selected copy data controller 20. Thereafter, the program flow goes to step S264.

It is judged at step S264 whether or not the communication mode acknowledge signal is received from the copy data controller 20 or the communication mode flag COMMF for representing whether or not the communication mode acknowledge signal has been received from the selected copy data controller 20 is set at one. If the communication mode flag COMMF is set at one (Yes at step S264), the communication mode flag is reset to zero at step S265 since the communication mode acknowledge signal has been received therefrom, and then, the communication mode acknowledge signal for representing that the copy data controller 20 has been connected thereto is transmitted to the center control unit 50 at step S266. Thereafter, the program flow returns to the main routine.

If the communication mode flag COMMF is set at zero (No at step S264), the program flow goes to step S267, and then, it is judged whether or not three seconds has been passed after transmitting the communication mode request signal or the time counter has been counted up. If the time counter has not been counted up to three seconds (No at step S267), the program flow goes to step S264, and then, the program flow goes from step S264 through step S267 to step S264 repeatedly in the loop until the communication mode flag COMMF becomes one (Yes at step S264) or the time counter has been counted up to three seconds (Yes at step S267).

If the time counter has counted up to three seconds (Yes at step S267), it is judged at step S268 whether or not the number of times of retransmission of the communication mode request signal is equal to or larger than two. If the number of times of retransmission thereof is smaller than two (Yes at step S268), the communication mode request signal is transmitted again at step S263. On the other hand, if the number of times of retransmission thereof is equal to or larger than two (No at step S268), the program flow goes to step S269, and then, the cancel signal is transmitted to the copy data controller 20. Thereafter, the program flow goes to step S270.

At step S270, one is added to the count value n of the channel counter, and then, it is judged at step S271 whether or not the count value n thereof is equal to eleven. If the count value n thereof is equal to or smaller than ten (No at step S271), the program flow goes back to step S261. On the other hand, if the count value n thereof is eleven (Yes at step S271), the count value n is reset to one at step S272 since the line connection process is executed for all the copy data controllers 20, and then, the program flow goes back to step S261.

On the other hand, if there is no multiplexer 35 (No at step S260), there is executed a process from step S273 to step S279 shown in FIG. 21b for one copy data controller 20 in a manner similar to that from step S263 to step S269, and then, the program returns to the main routine.

Figure 22A:
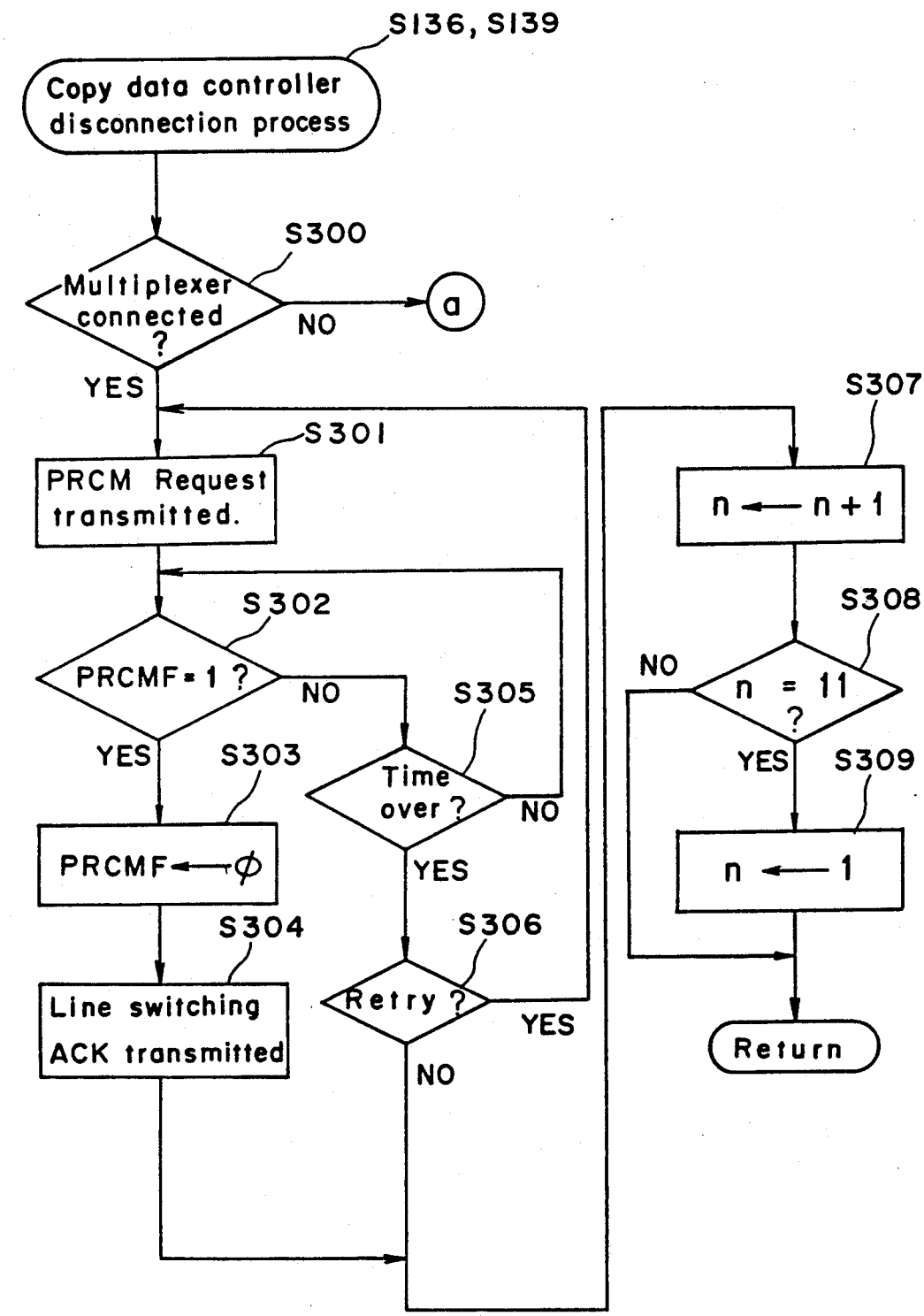
FIGS. 22a and 22b are flowcharts showing a copy data controller disconnection process of a subroutine of the on-line controller shown in FIG. 1.
Figure 22B:
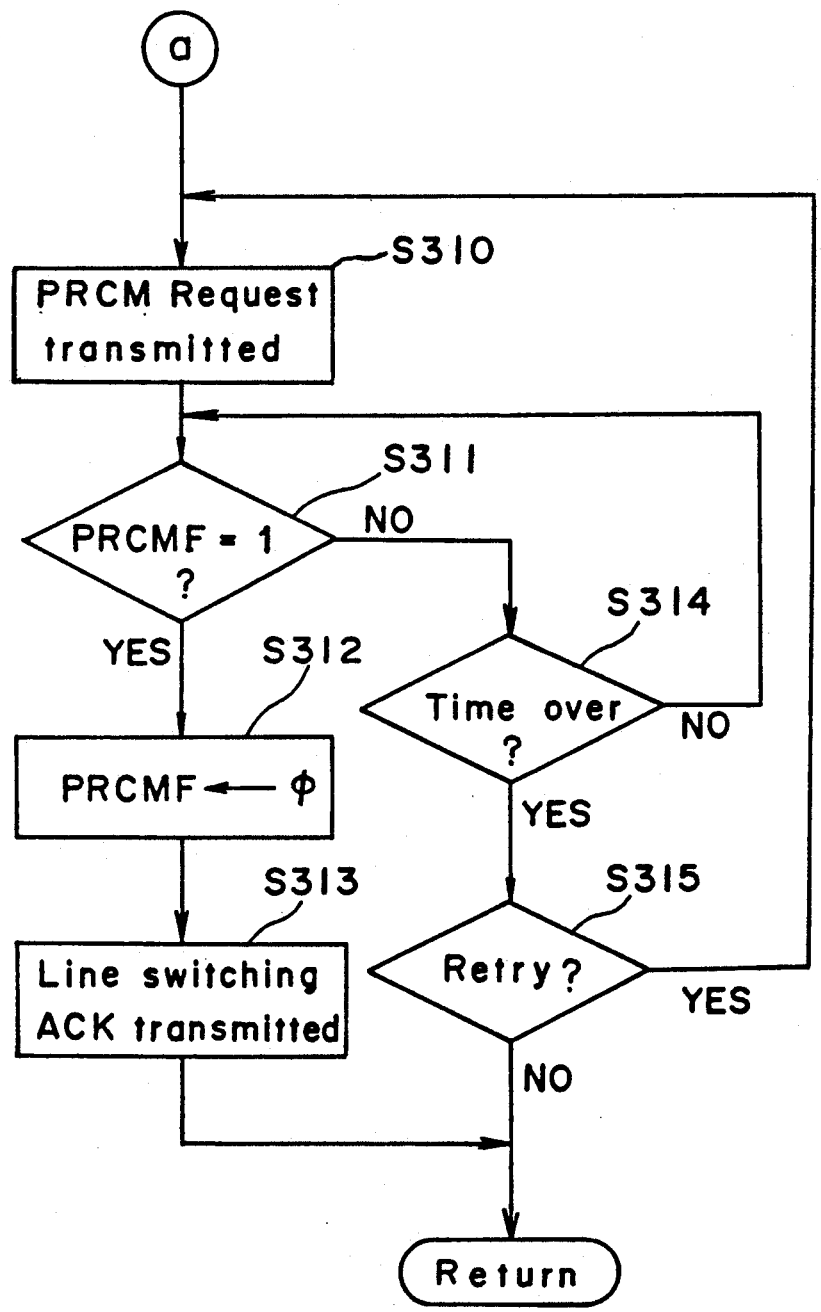

FIGS. 22a and 22b are flowcharts showing the copy data controller disconnection process (steps S136 and S139 of FIG. 13e).

Referring to FIG. 22a, first of all, it is judged at step S300 whether or not there is a multiplexer 35 in the on-line controller 30. If there is a multiplexer 35 therein (Yes at step S300), the program flow goes to step S301.

At step S301, the processing mode request signal is transmitted to the copy data controller 20 of the channel n, and then, it is judged at step S302 whether or not the processing mode flag PRCMF for representing whether or not the processing mode acknowledge signal has been received therefrom is set at one. If the processing mode flag PRCMF is set at one (Yes at step S302), the program flow goes to step S303, and then, the processing mode flag PRCMF is reset to zero. Thereafter, the line switching acknowledge signal is transmitted to the center control unit 50 at step S304, and then, the program flow goes to step S307.

On the other hand, if the processing mode flag PRCMF is set at zero (No at step S302), it is judged at step S305 whether or not three seconds has been passed after transmitting the processing mode request signal or the time counter has counted up to three seconds. If the time counter has not counted up yet (No at step S305), the program flow goes from step S302 through step S305 to step S302 repeatedly in the loop until the processing mode flag PRCMF becomes one (Yes at step S302) or the time counter has counted up (Yes at step S305).

If the time counter has counted up (Yes at step S305), it is judged at step S306 whether or not the number of times of retransmission of the processing mode request signal is equal to or larger than two. If the number of times of retransmission thereof is smaller than two (Yes at step S306), the program flow goes to step S301 in order to retry to transmit the processing mode request signal. On the other hand, if the number of times of retransmission thereof is equal to or larger than two (No at step S306), one is added to the count value n of the channel counter at step S307, and then, it is judged at step S308 whether or not the count value n thereof is equal to eleven.

If the count value n thereof is not equal to eleven (No at step S308), the program flow returns to the main routine, directly. On the other hand, if the count value n thereof is equal to eleven (Yes at step S308), the count value n of the channel counter is set at one at step S309, and then, the program flow returns to the main routine.

On the other hand, if there is no multiplexer 35 in the on-line controller 30 (No at step S300), there is executed a process from step S310 to step S315 shown in FIG. 22b for one copy data controller 20 in a manner similar to that from step S301 to step S306, and then, the program flow returns to the main routine.

Figure 23:
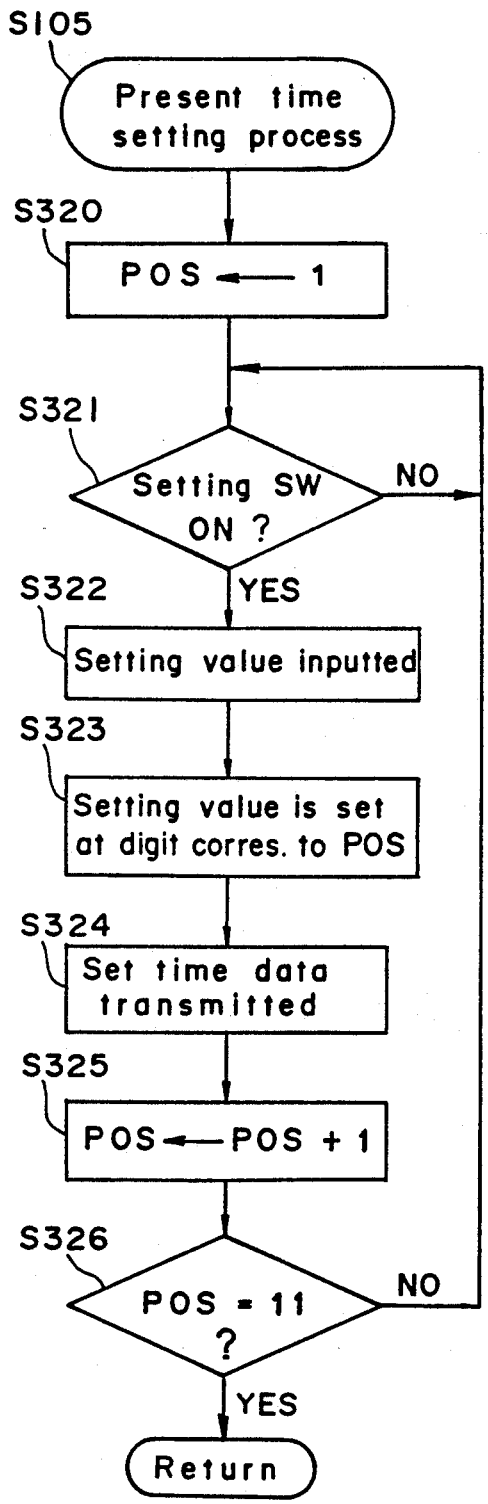
FIG. 23 is a flowchart showing a present time setting process of a subroutine of the on-line controller shown in FIG. 1.

FIG. 23 is a flow chart showing the present time setting process (step S105 of FIG. 13c).

Referring to FIG. 23, first of all, a count value POS of a position counter for representing a digit number thereof upon inputting the present time data one by one is set at one at step S320. Thereafter, it is judged whether at step S321 or not the setting switch ADJ is pressed. A loop process of step S321 is executed until the setting switch ADJ is pressed. If the setting switch ADJ is pressed (Yes at step S321), the setting value of the selection switch SEL is inputted as data of the first digit of the present time at step S322, and then, the inputted data are stored as the digit of the present time data corresponding to the count value POS of the position counter in the RAM 230 at step S323 so as to execute a process for rewriting data of the corresponding digit of the present time of the real time clock 204 based on the inputted data. Thereafter, the inputted data are transmitted to the copy data controller 20 so as to display the data of the present time set at step S324 on the LED display 25 of the copy data controller 20, and then, one is added to the count value POS of the position counter at step S325. Thereafter, it is judged at step S326 whether or not the count value POS thereof is equal to eleven. If the count value POS thereof is equal to eleven (Yes at step S326), the program flow returns to the original routine. On the other hand, if the count value POS thereof is not equal to or smaller than ten (No at step S326), the program flow goes back to step S321.

Figure 24:
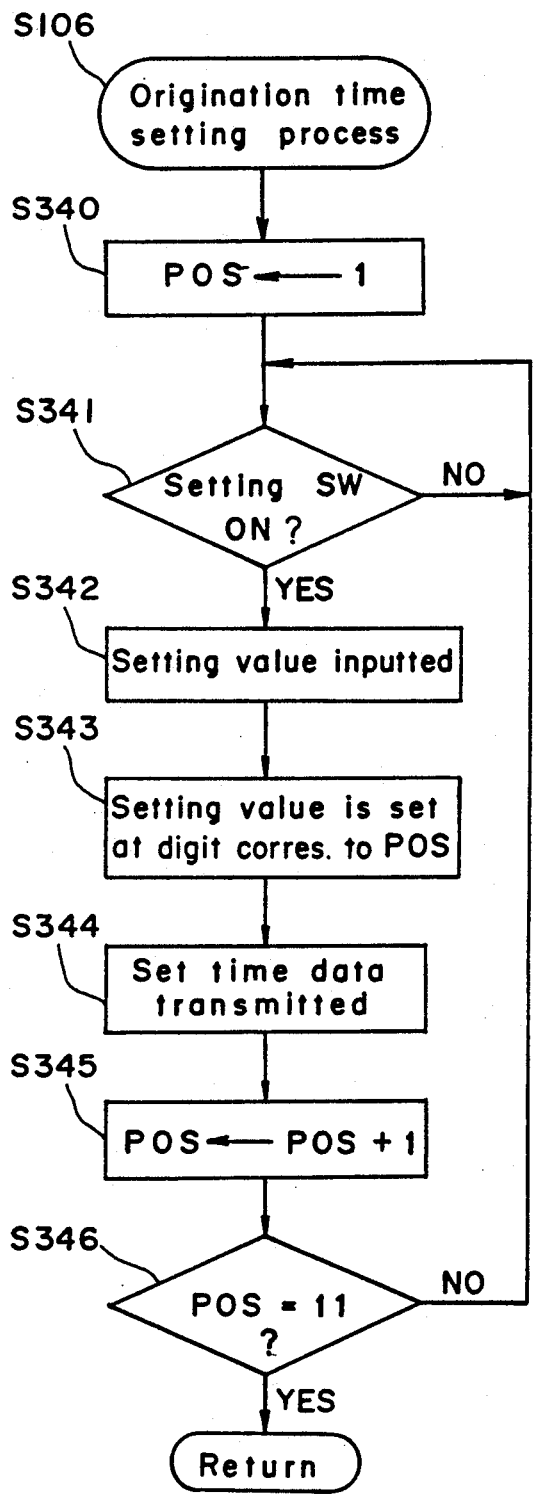
FIG. 24 is a flowchart showing an origination time setting process of a subroutine of the on-line controller shown in FIG. 1.
Figure 25:
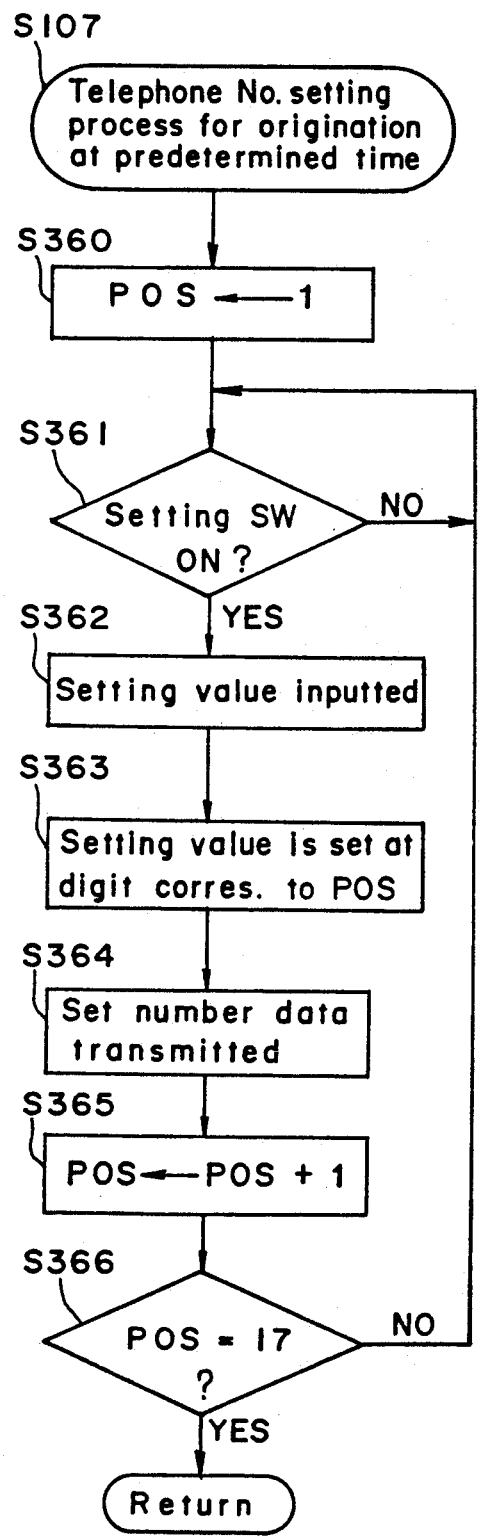
FIG. 25 is a flowchart showing a telephone number setting process for an origination at a predetermined time of a subroutine of the on-line controller shown in FIG. 1.
Figure 26:
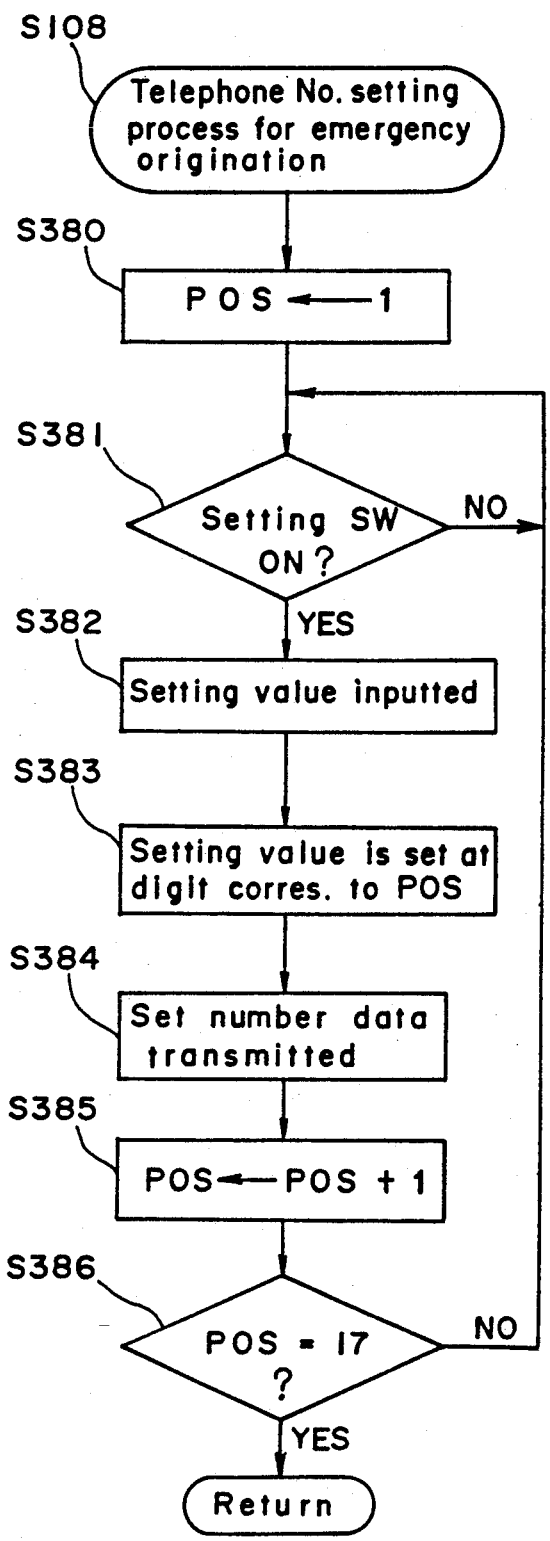
FIG. 26 is a flowchart showing a telephone number setting process for an emergency origination of a subroutine of the on-line controller shown in FIG. 1.

FIGS. 24 to 26 are flowcharts showing the origination time setting process (step S106 of FIG. 13c), the telephone number setting process for the predetermined origination mode (step S107 of FIG. 13c), the telephone number setting process for the emergency origination mode (step S108 of FIG. 13c). In these processes, the origination time, the telephone number for the predetermined origination mode, the telephone number for the emergency origination mode are set in a manner similar to that of the present time setting process shown in FIG. 23. It is to be noted that it is judged whether or not the count value POS of the position counter is equal to seventeen at step S366 of FIG. 25 and at step S386 of FIG. 26.

Figure 27:
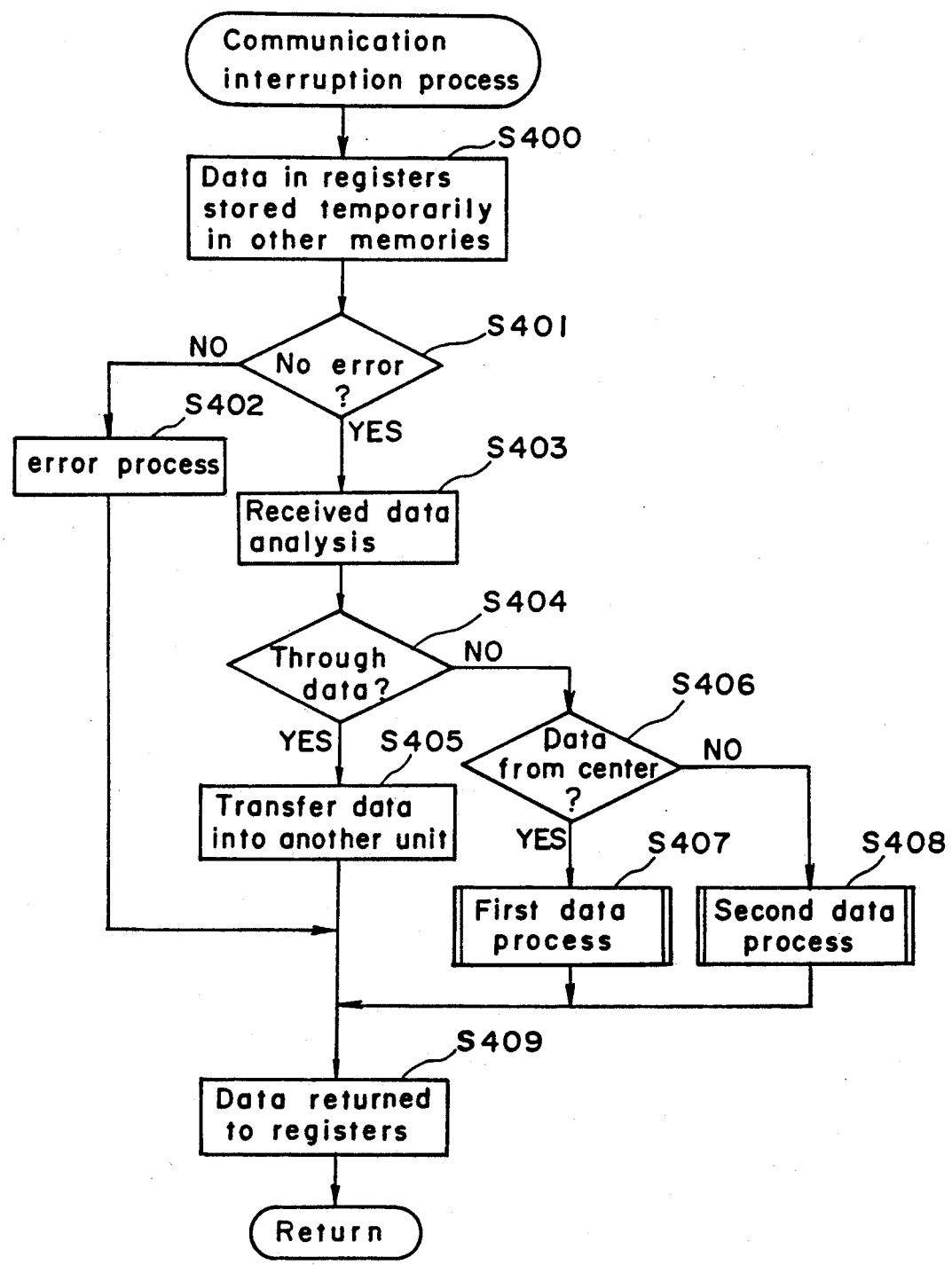
FIG. 27 is a flowchart showing a communication interruption process of a subroutine of the on-line controller shown in FIG. 1.

FIG. 27 is a flowchart showing the communication interruption process of the on-line controller 30. The communication interruption process is started when an interruption signal is inputted to the microcomputer 31 of the on-line controller 30 after the on-line controller 30 receives data from either the copy data controller 20 or the center control unit 50.

Referring to FIG. 27, first of all, at step S400, data stored in registers which are used in the communication interruption process are transferred into and stored in another memory, temporarily, and then, it is judged at step S401 whether or not there occurs a communication error such as a parity error, a reception of data which have not been set. If there occurs a communication error (No at step S401), there is executed a predetermined error process at step S402, and then, the program flow goes to step S409. On the other hand, if there does not occur any communication error (Yes at step S401), there is executed a process for analyzing the received data at step S403, and then, it is judged at step S404 whether or not the received data are through data to be transmitted and be received between the copy data controller 20 and the center control unit 50, which is not related to the on-line controller 30.

If the received data ar the through data (Yes at step S404), the received data are transmitted to either the copy data controller 20 or the center control unit 50 which is different from the unit which has transmitted the data, and then, the program flow goes to step S409. On the other hand, it is judged at step S406 whether or not the received data are data which have been transmitted from the center control unit 50. If the received data are data which have been transmitted from the center control unit 50 (Yes at step S406), there is executed a first data process for the received data at step S407, and then, the program flow goes to step S409. On the other hand, if the received data are not data which have been transmitted from the center control unit 50 (No at step S406), there is executed a second data process for the received data at step S408, and then, the program flow goes to step S409.

At step S409, the data stored temporarily in another memory at step S400 are transferred back and stored in the original registers, and the program flow returns to the previous step executed before the communication interruption routine.

Figure 28:
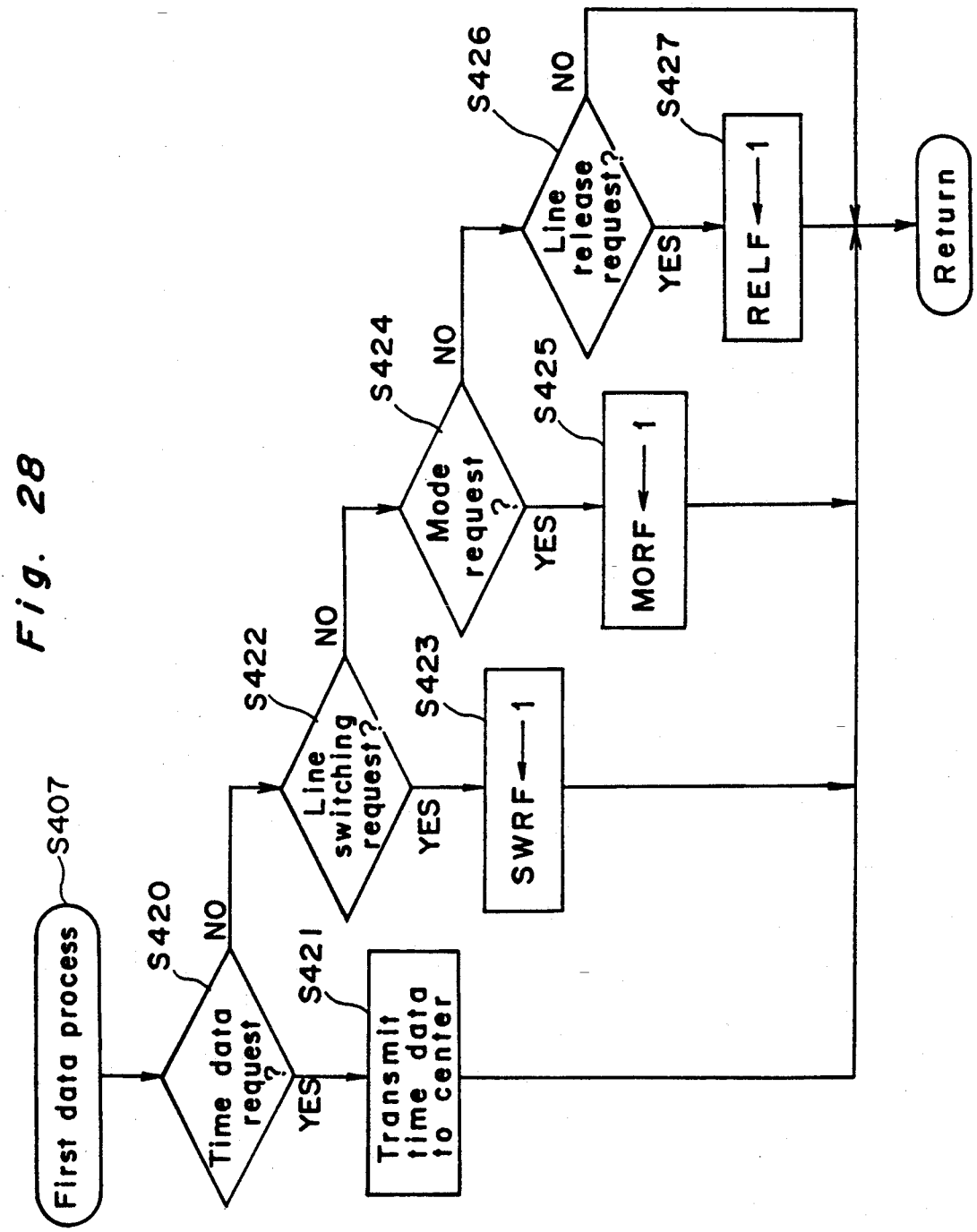
FIG. 28 is a flowchart showing a first data process of a subroutine of the on-line controller shown in FIG. 1.

FIG. 28 is a flowchart showing the first data process (step S407 of FIG. 27). The first data process is provided for processing data transmitted from the center control unit 50 such as the time data request signal, the line switching request signal, and the line release request signal.

Referring to FIG. 28, at steps S420, S422, S424 and S426, it is judged whether or not the received data are the time data request signal, the line switching request signal, the mode request signal, and the line release request signal, respectively.

If the received data are the time data request signal (Yes at step S420), data of the present time are read out from the real time clock 204 at step S421, and the data of the present time are transmitted to the center control unit 50. Thereafter, the program flow returns to the original routine.

If the received data are the line switching request signal (Yes at step S422), the switching request flag SWRF is set at one at step S423, and then, the program flow returns to the original routine.

If the received data are the mode request signal (Yes at step S424), the mode request flag MORF is set at one at step S425, and then, the program flow returns to the original routine.

If the received data are the line release request signal (Yes at step S426), the release request flag RELF is set at one at step S427, and then, the program flow returns to the original routine.

On the other hand, if the received data are not the time data request signal, the line switching request signal, the mode request signal and the line release request signal (No at steps S420, S422, S424 and S426), the program flow returns to the original routine, directly.

Figure 29:
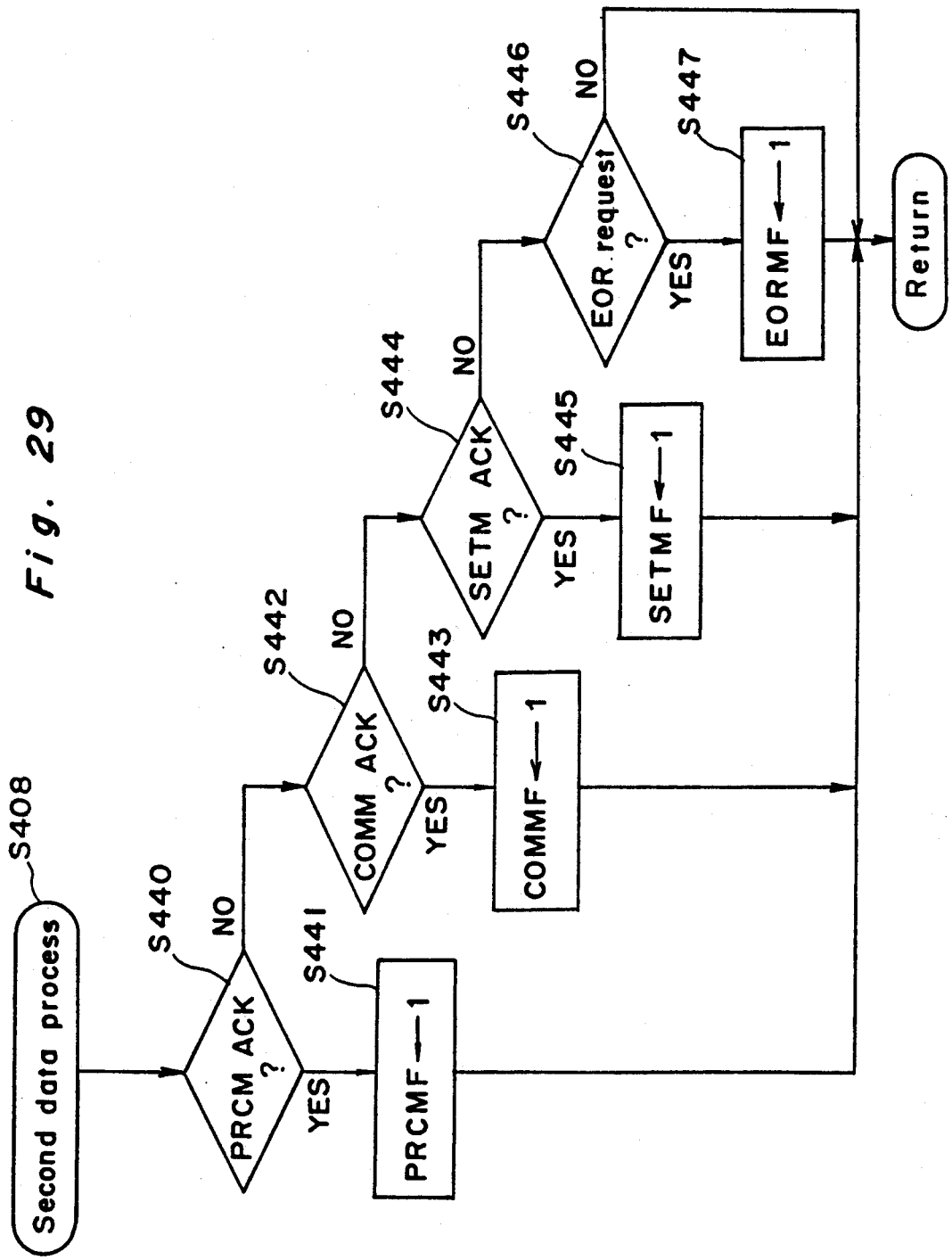
FIG. 29 is a flowchart showing a second data process of a subroutine of the on-line controller shown in FIG. 1.

FIG. 29 is a flowchart showing the second data process (step S408 of FIG. 27). The second data process is provided for processing data transmitted from the copy data controller 20 such as the processing mode acknowledge signal, the communication mode acknowledge signal, the setting mode acknowledge signal, and the emergency origination request signal.

Referring to FIG. 29, at steps S440, S442, S444 and S446, it is judged whether or not the received data are the processing mode acknowledge signal, the communication mode acknowledge signal, the setting mode acknowledge signal, and the emergency origination request signal.

If the received data are the processing mode acknowledge signal (Yes at step S440), the processing mode flag PRCMF is set at one at step S441, the program flow returns to the original routine.

If the received data are communication mode acknowledge signal (Yes at step S442), the communication mode flag COMMF is set at one, and then, the program flow returns to the original routine.

If the received data are the setting mode acknowledge signal (Yes at step S444), the setting mode flag SETMF is set at one, the program flow returns to the original routine.

If the received data are the emergency origination request signal (Yes at step S446), the emergency origination flag EORMF is set at one, and then, the program flow returns to the original routine.

On the other hand, if the received data are not the processing mode acknowledge signal, the communication mode acknowledge signal, the setting mode acknowledge signal and the emergency origination request signal (No at steps S440, S442, S444 and S446), the program flow returns to the original routine, directly.

(5) Process of Copy Data Controller

Figure 30:
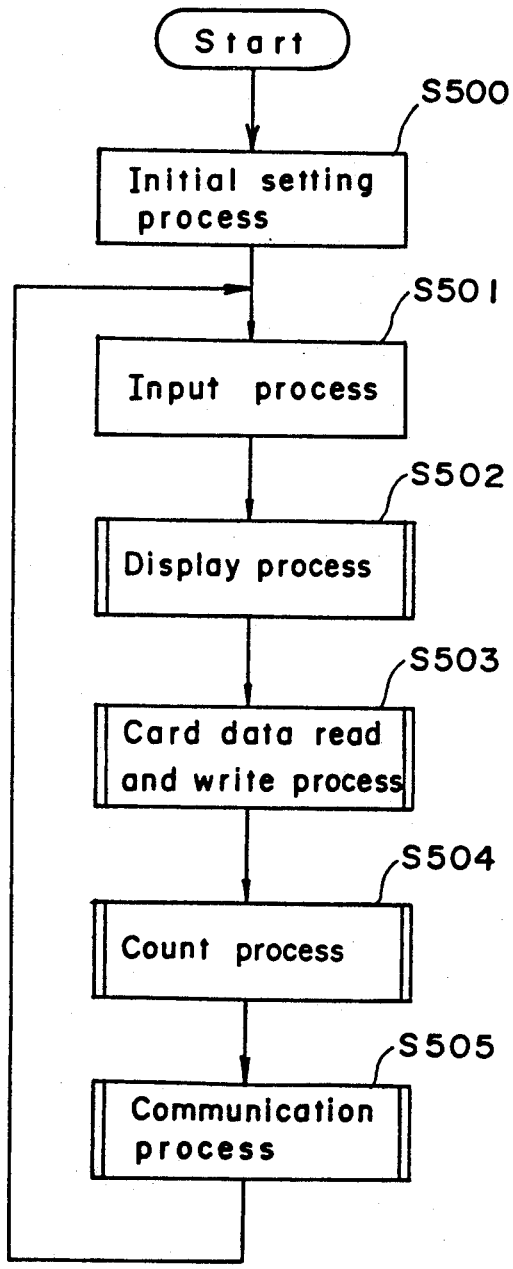
FIG. 30 is a flowchart showing a main routine of the copy data controller shown in FIG. 1.

FIG. 30 is a flowchart showing a main routine of the copy data controller 20 shown in FIG. 1.

Referring to FIG. 30, when the copy data controller 20 is turned on, the main routine thereof is started, and then, first of all, the initial setting process is executed for respective circuits of the copy data controller 20 at step S500. Thereafter, there are inputted from the copying machine 10 at step S501, signals for representing various kinds of states such as an on/off state of a power switch, occurrence of paper jam upon copying in the copying machine 10, occurrence of trouble of upon copying in the copying machine 10, such a state that a copying operation is completed after discharging a piece of copied paper, and then, the data of the above signals are stored in the RAM 103. Thereafter, there are executed a display process at step S502, a card data read and write process at step S503, a count process at step S504, and a communication process at step S505, and then, the program flow goes back to step S501.

Figure 31:
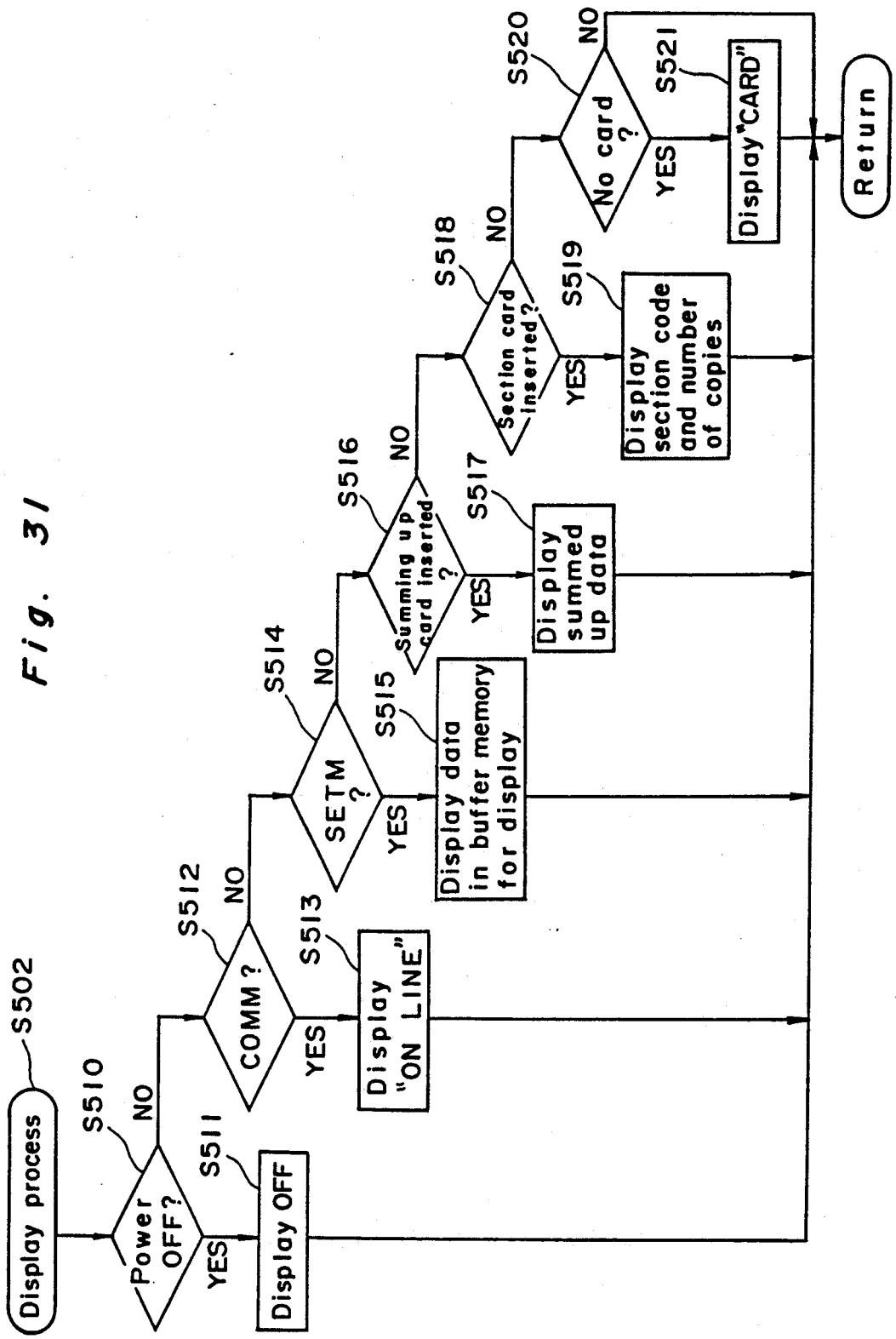
FIG. 31 is a flowchart showing a display process of a subroutine of the copy data controller shown in FIG. 1.

FIG. 31 is a flowchart showing the display process (step S502 of FIG. 30).

Referring to FIG. 31, it is judged at step S510 whether or not the copying machine 10 is turned off, it is judged at step S512 whether or not the communication mode (COMM) is set, it is judged at step S514 whether or not the setting mode (SETM) is set, it is judged at step S516 whether or not the summing up card has been inserted in the card data input and output unit 22, it is judged at step S518 whether or not the section card is inserted in the card data input and output unit 22, and it is judged at step S520 whether or not no magnetic card has been inserted in the card data input and output unit 22.

If the copy machine 10 is turned off (Yes at step S510), the LED display 25 is turned off at step S511, and then, the program flow returns to the main routine. If the communication mode (COMM) is set (Yes at step S512), data of "ON LINE" are outputted to the buffer memory 24 for display, and the data thereof are displayed on the LED display 25 at step S513. Thereafter, the program flow returns to the main routine. If the setting mode (SETM) is set (Yes at step S514), data stored in the buffer memory 24 for display are displayed on the LED display 25 at step S515, and then, the program flow returns to the main routine. If the summing up card has been inserted in the card data input and output unit 22 (Yes at step S516), the copy data stored in the RAM 103 of the copy data controller 20 are displayed at step S517 on the LED display 25, sequentially, and then, the program flow returns to the main routine. If the section card has been inserted in the card data input and output unit 22 (Yes at step S518), the section code and the number of copies of the section are displayed on the LED display 25 at step S519, and then, the program flow returns to the main routine. If no magnetic card has been inserted in the card data input and out unit 22 (Yes at step S520), the data of "CARD" are displayed on the LED display 25 at step S521, and then, the program flow returns to the main routine.

Figure 32:
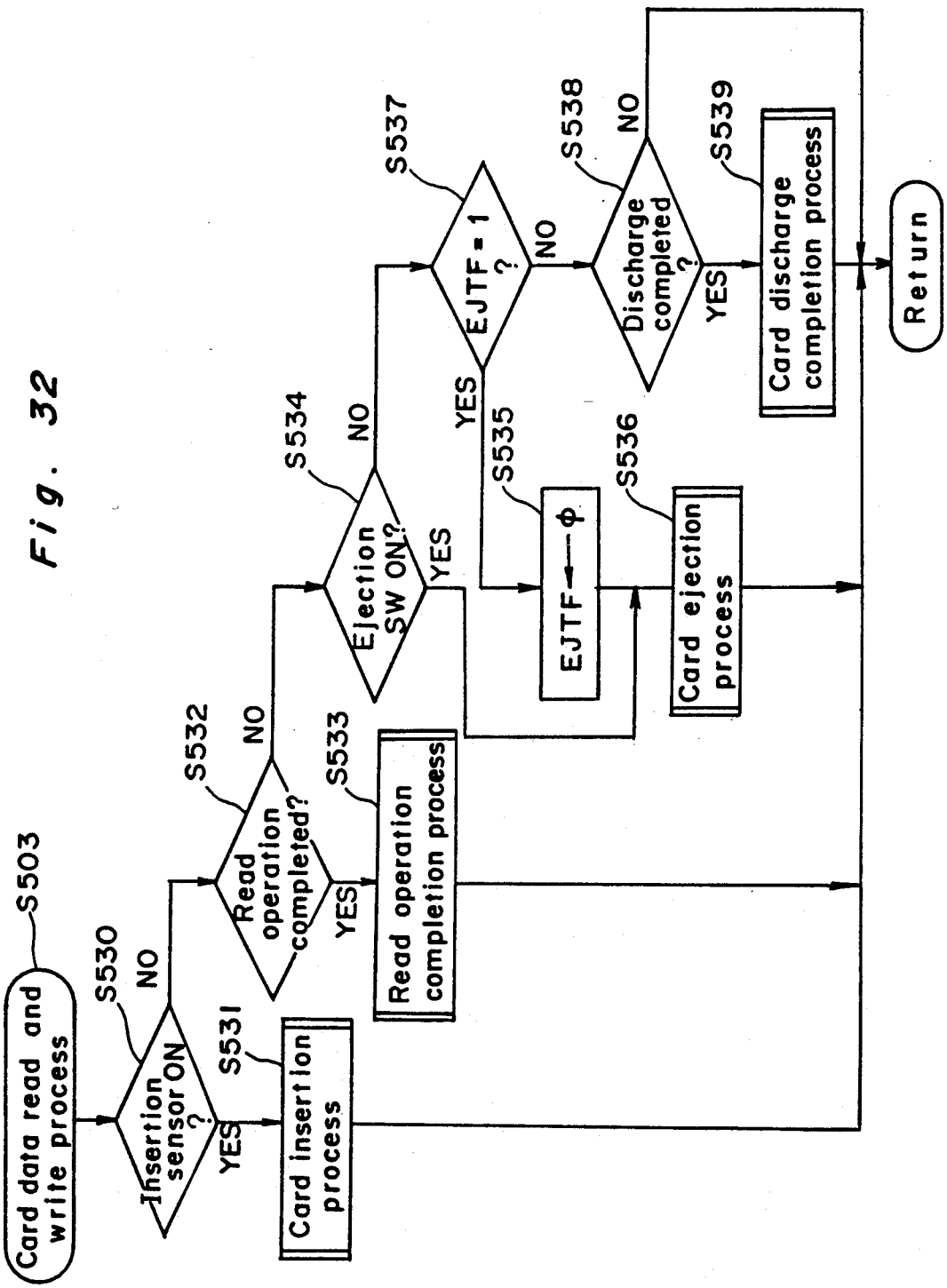
FIG. 32 is a flowchart showing a card data read and write process of a subroutine of the copy data controller shown in FIG. 1.

FIG. 32 is flowchart showing the card data read and write process (step S503 of FIG. 30).

Referring to FIG. 32, it is judged at step S530 whether or not an insertion sensor (not shown) for detecting whether or not a magnetic card has been inserted in the card data input and output unit 22 is turned on, it is judged at step S532 whether or not the operation for reading data stored in a magnetic card is completed, it is judged at step S534 whether or not an ejection switch (not shown) for instructing to discharging a magnetic card is turned on, and it is judged at step S537 whether or not an ejection flag EJTF is set at one.

If the insertion sensor is turned on (Yes at step S530), a card insertion process described in detail later is executed at step S531, and then, the program flow returns to the main routine. If the operation for reading the data stored in the magnetic card is completed (Yes at step S532), a read operation completion process described in detail later is executed at step S533, and then, the program flow returns to the main routine. If the ejection switch is turned on (Yes at step S534), a card ejection process described in detail later is executed at step S536, and then, the program flow returns to the main routine. If the ejection flag EJTF is set at one (Yes at step S537), the ejection flag EJTF is reset to zero at step S535, and then, the card ejection process is executed at step S536. Thereafter, the program flow returns to the main routine.

If the ejection flag EJTF is set at zero (No at step S537), it is judged at step S538 whether or not the operation for discharging the magnetic card is completed by checking whether or not the insertion sensor is turned off, or an ejection timer has counted up to a predetermined time. If the operation for discharging the magnetic card is not completed, the program flow returns to the main routine, directly. On the other hand, if the operation for discharging the magnetic card is completed (Yes at step S538), there is executed a card discharge completion process described in detail later at step S539, and then, the program flow returns to the main routine.

Figure 33:
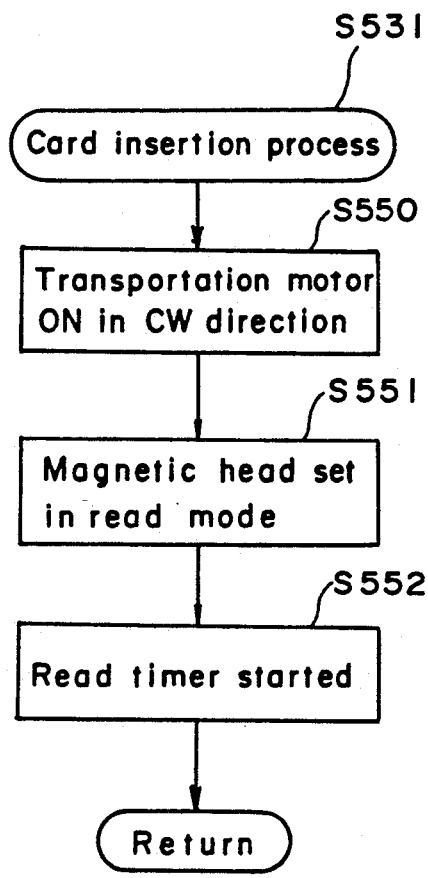
FIG. 33 is a flowchart showing a card insertion process of a subroutine of the copy data controller shown in FIG. 1.

FIG. 33 is a flowchart showing the card insertion process (step S531 of FIG. 32).

Referring to FIG. 33, first of all, a transportation motor 23 for transporting the magnetic card is rotated in the clockwise direction or an insertion direction of the magnetic card at step S550, and then, a magnetic head of the card data input and output unit 22 is set in a read mode at step S551 so as to read out data stored in the magnetic card and store the read data in the RAM 103. Thereafter, a read timer for counting a read time for which data stored in the magnetic card are read out is started at step S552, and then, the program flow returns to the original routine.

Figure 34:
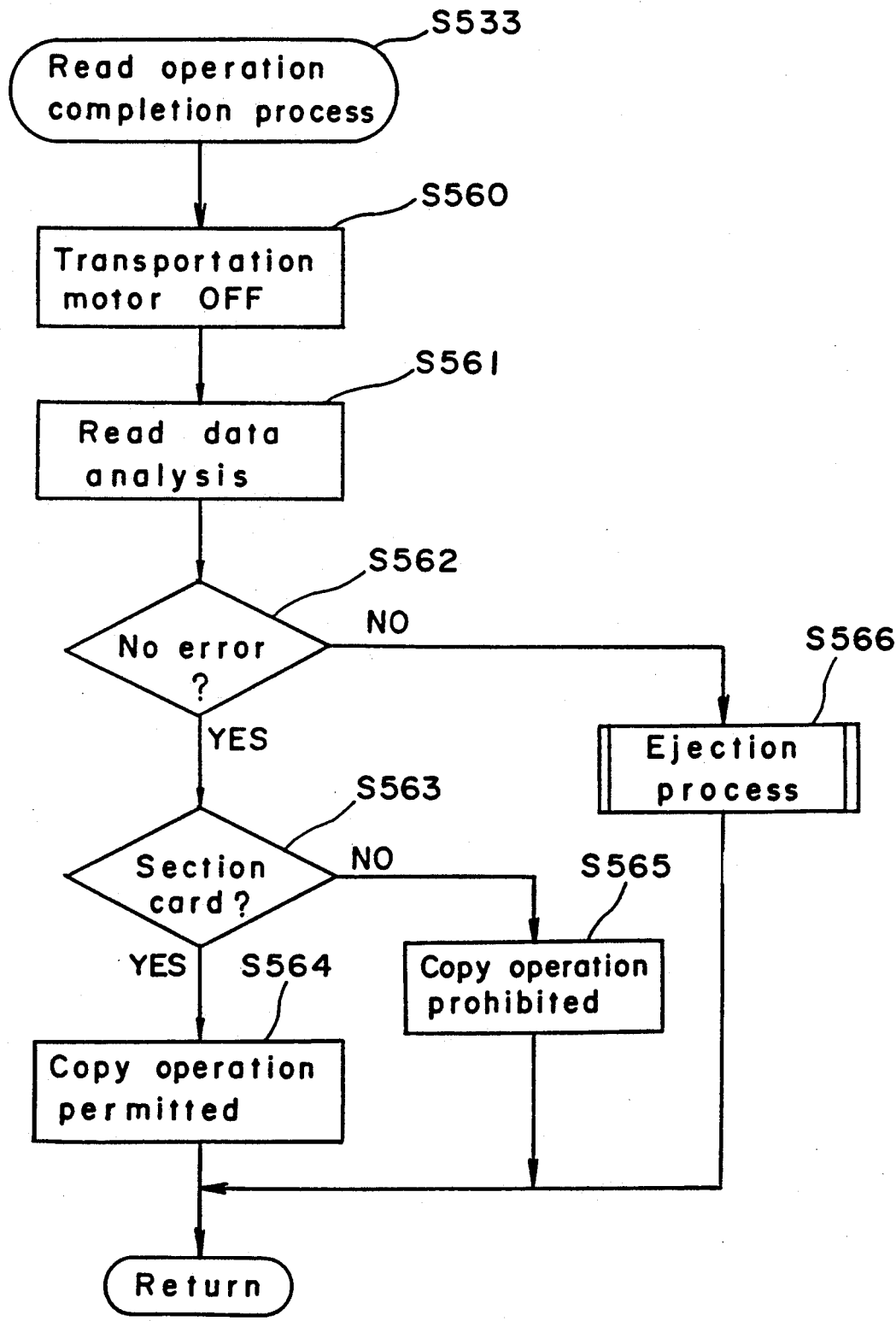
FIG. 34 is a flowchart showing a read operation completion process of a subroutine of the copy data controller shown in FIG. 1.

FIG. 34 is a flowchart showing the read operation completion process (step S533 of FIG. 32).

Referring to FIG. 34, the transportation motor 23 is turned off at step S560, and then, data read out from the magnetic card are analyzed at step S561. Thereafter, it is judged at step S562 whether or not there is an error in the read data. If there is an error in the read data (No at step S562), the ejection process is executed at step S566, and then, the program flow returns to the original routine.

On the other hand, if there is no error in the read data (Yes at step S562), it is judged at step S563 whether or not the magnetic card is the section card. If the magnetic card is the section card (Yes at step S563), the copying operation is permitted for the copying machine 10, and then, the program flow returns to the original routine. On the other hand, if the magnetic card is not the section card (No at step S563), the copying operation is prohibited for the copying machine 10 at step S565, and then, the program flow returns to the original routine.

Figure 35:
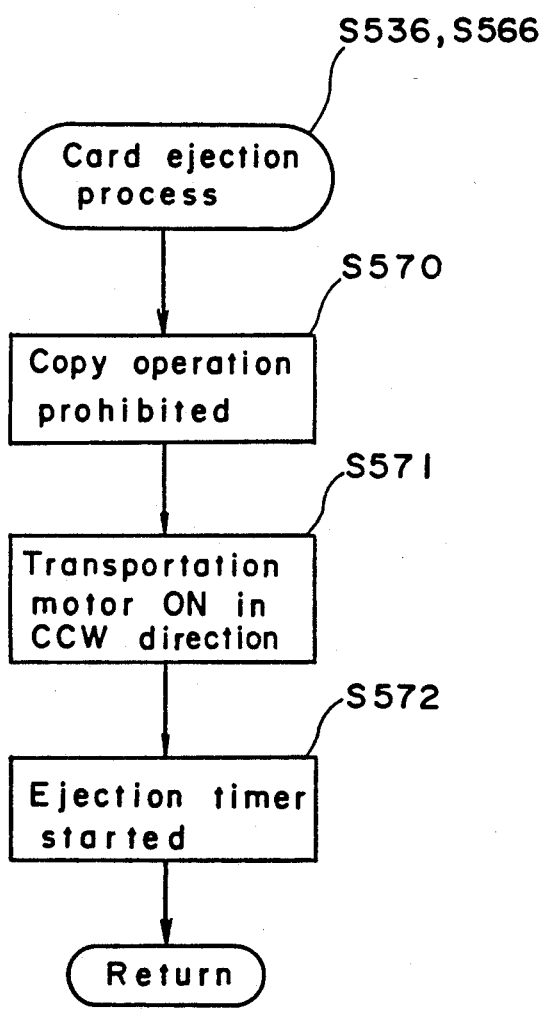
FIG. 35 is a flowchart showing a card ejection process of a subroutine of the copy data controller shown in FIG. 1.

FIG. 35 is a flowchart showing the card ejection process (step S536 of FIG. 32 and step S566 of FIG. 34).

Referring to FIG. 35, first of all, the copying operation is prohibited for the copying machine 10 at step S570, and then, the transportation motor 23 is rotated in the counterclockwise direction or a discharging direction of the magnetic card at step S571. Thereafter, an ejection timer for counting a discharging time of the magnetic card is started at step S572, and then, the program flow returns to the original routine.

Figure 36:
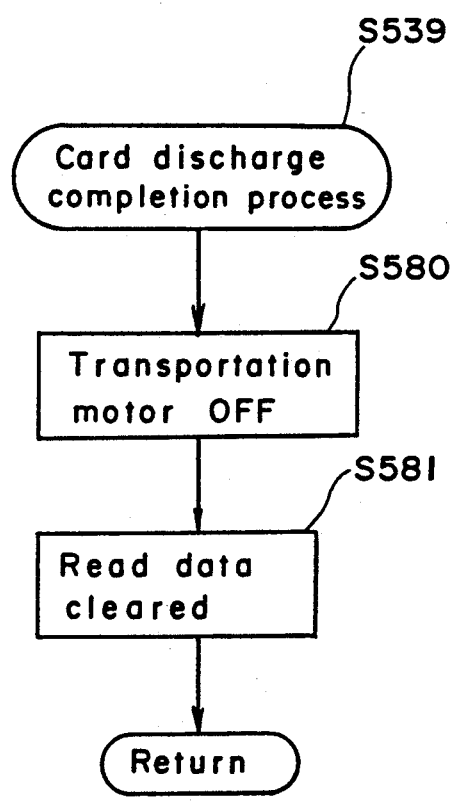
FIG. 36 is a flowchart showing a display discharge completion process of a subroutine of the copy data controller shown in FIG. 1.

FIG. 36 is a flowchart showing the card discharge completion process (step S539 of FIG. 32).

Referring to FIG. 36, first of all, the transportation motor 23 is turned off at step S580, and then, the data stored in the RAM 103 after reading out the data from the magnetic card are cleared at step S581. Thereafter, the program flow returns to the original routine.

Figure 37:
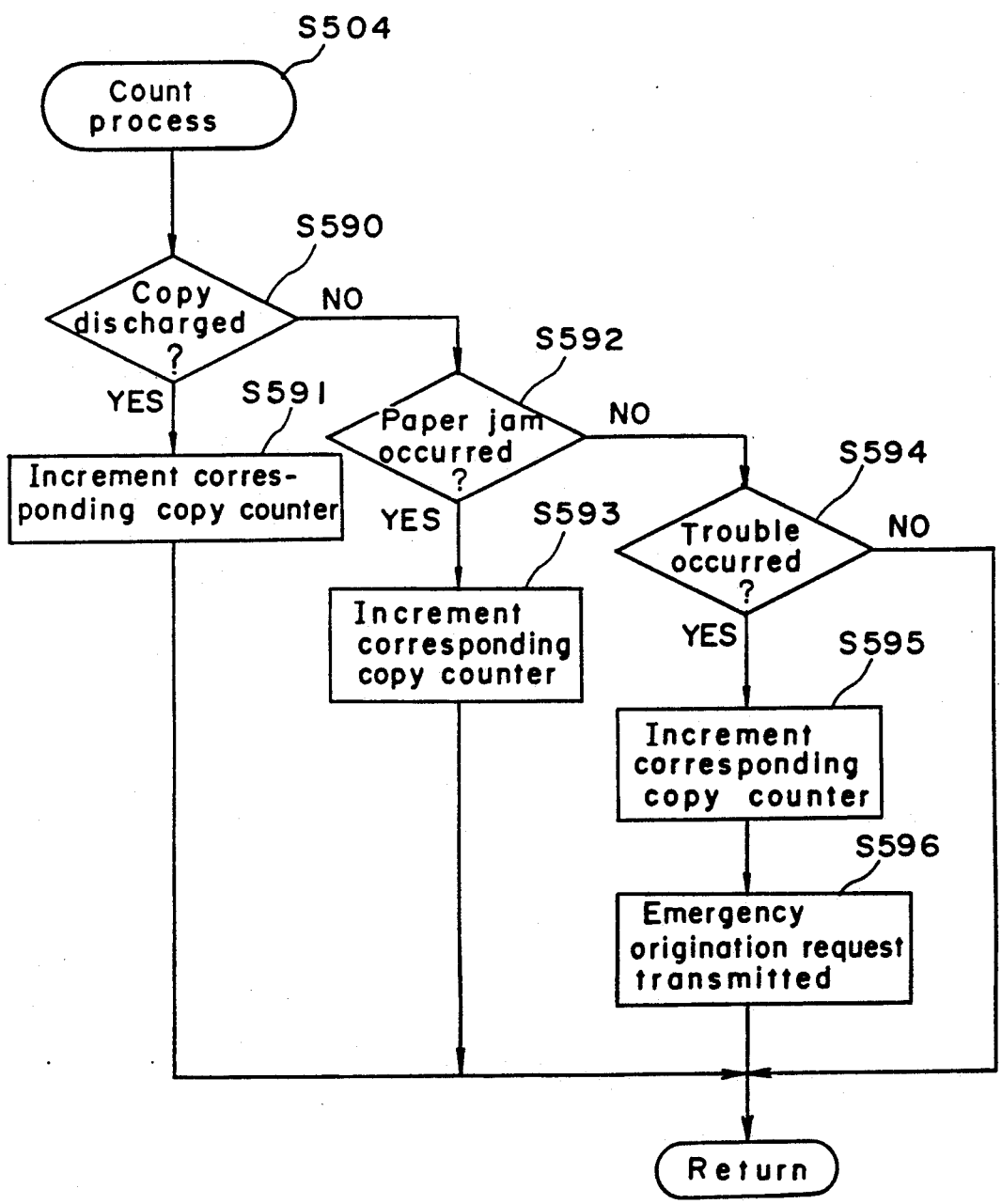
FIG. 37 is a flowchart showing a count process of a subroutine of the copy data controller shown in FIG. 1.

FIG. 37 is a flowchart showing the count process (step S504 of FIG. 30).

Referring to FIG. 37, it is judged at step S590 whether or not the copying operation for a copy is completed in the copying machine 10, it is judged at step S592 whether or not a paper jam occurs in the copying machine 10, and it is judged at step S594 whether or not a trouble occurs in the copying machine 10. If the copying operation for a copy is not completed in the copying machine 10 (No at step S590), any paper jam does not occur in the copying machine 10 (No at step S592), and any trouble does not occur in the copying machine 10, the program flow returns to the main routine, directly.

If the copying operation for a copy is completed in the copying machine 10 (Yes at step S590), there is incremented at step S591 a copy counter corresponding to the section of the section card which has been inserted therein and corresponding to the size of the copying paper with which the copying operation is executed, and then, the program flow returns to the main routine.

If a paper jam occurs in the copying machine 10 (Yes at step S592), there is incremented at step S593 a jam counter corresponding to a position where the paper jam occurs, and then, the program flow returns to the main routine.

If a trouble occurs in the copying machine 10 (Yes at step S594), there is incremented at step S595 a trouble counter corresponding to a position where the trouble occurs, and then, the emergency origination request signal is transmitted to the on-line controller 30 at step S596. Thereafter, the program flow returns to the main routine.

Figure 38:
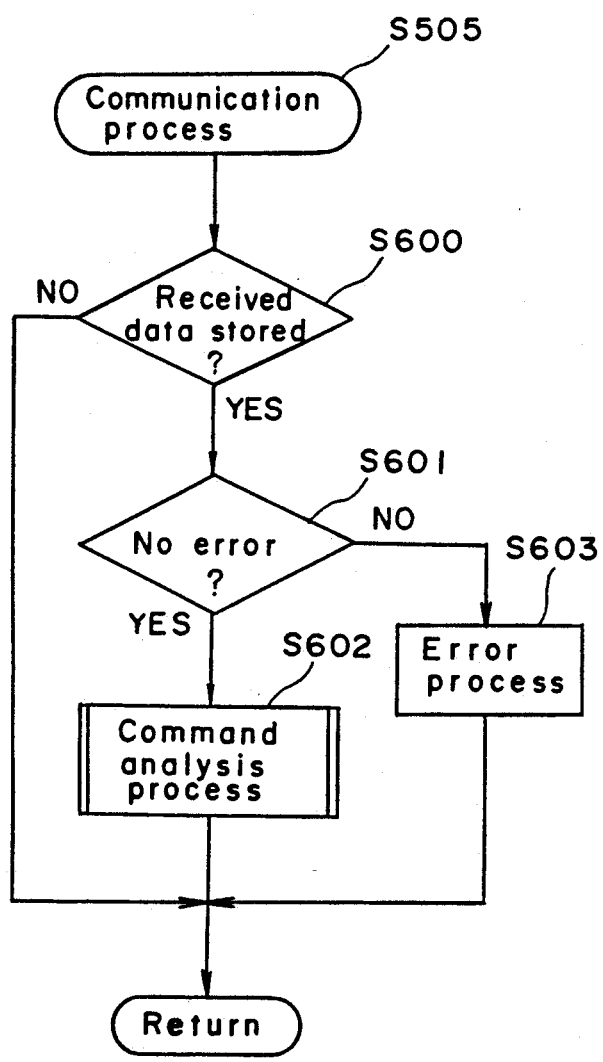
FIG. 38 is a flowchart showing a communication process of a subroutine of the copy data controller shown in FIG. 1.

FIG. 38 is a flowchart showing the communication process (step S505 of FIG. 30) of the copy data controller 20.

Referring to FIG. 38, first of all, it is judged at step S600 whether or not there are received data. If there are no received data (No at step S600), the program flow returns to the main routine. On the other hand, if there are received data (Yes at step S600), it is judged at step S601 whether or not there is an error in the received data. If there is an error in the received data (No at step S601), there is executed a predetermined error process required for the above error at step S603, and then, the program flow returns to the main routine. On the other hand, if there is no error in the received data (Yes at step S601), a command analysis process described in detail later is executed at step S602, and then, the program flow returns to the main routine.

FIGS. 39a to 39d are flowcharts showing the command analysis process (step S602 of FIG. 38).

Figure 39A:
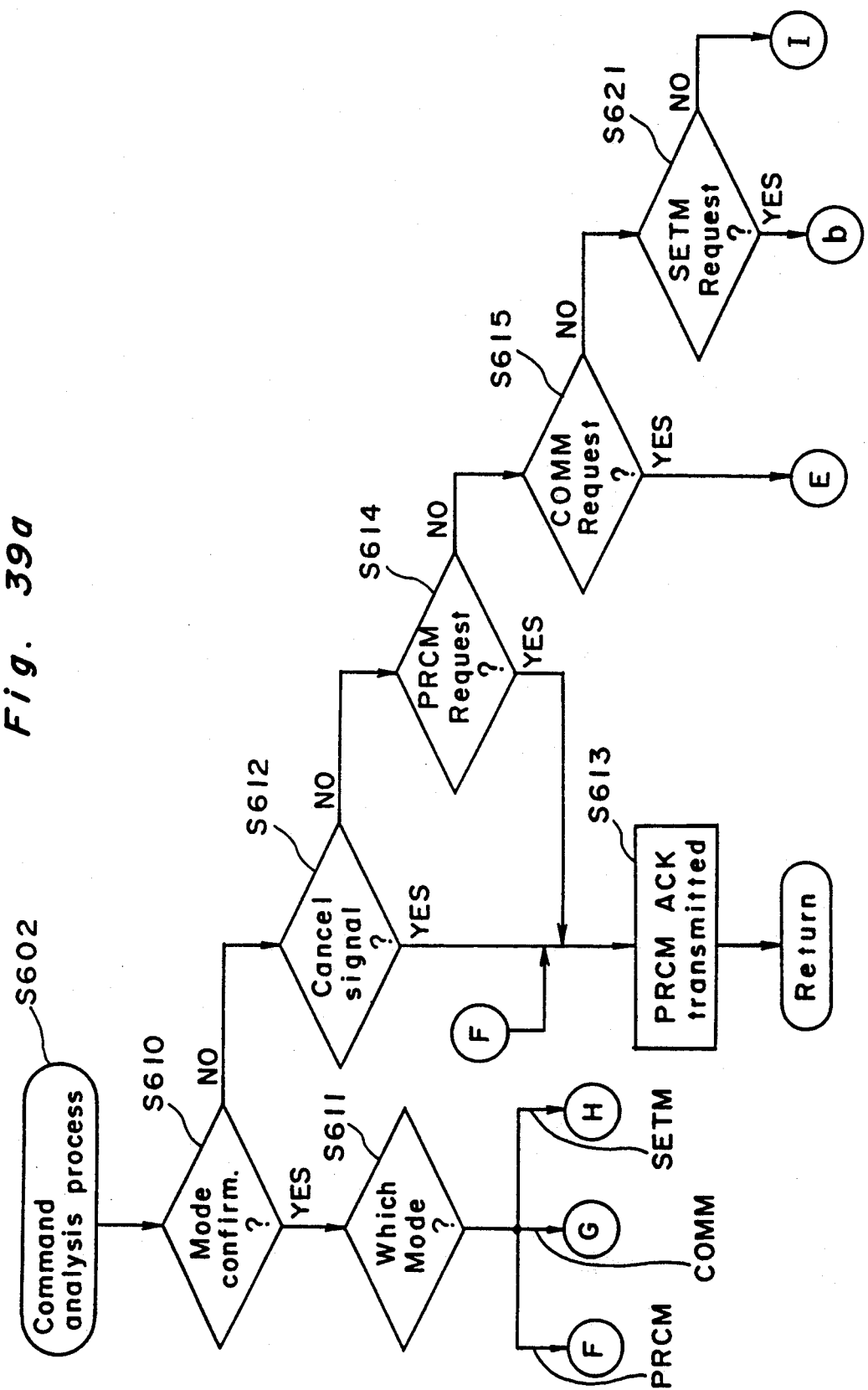
FIGS. 39a to 39d are flowcharts showing a command analysis process of a subroutine of the copy data controller shown in FIG. 1.
Figure 39C:
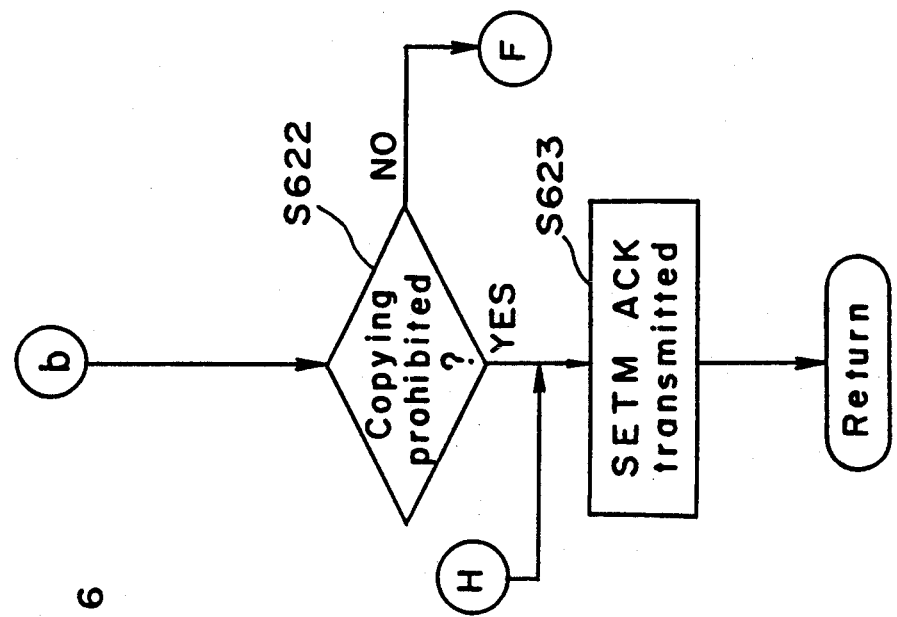
Figure 39B:
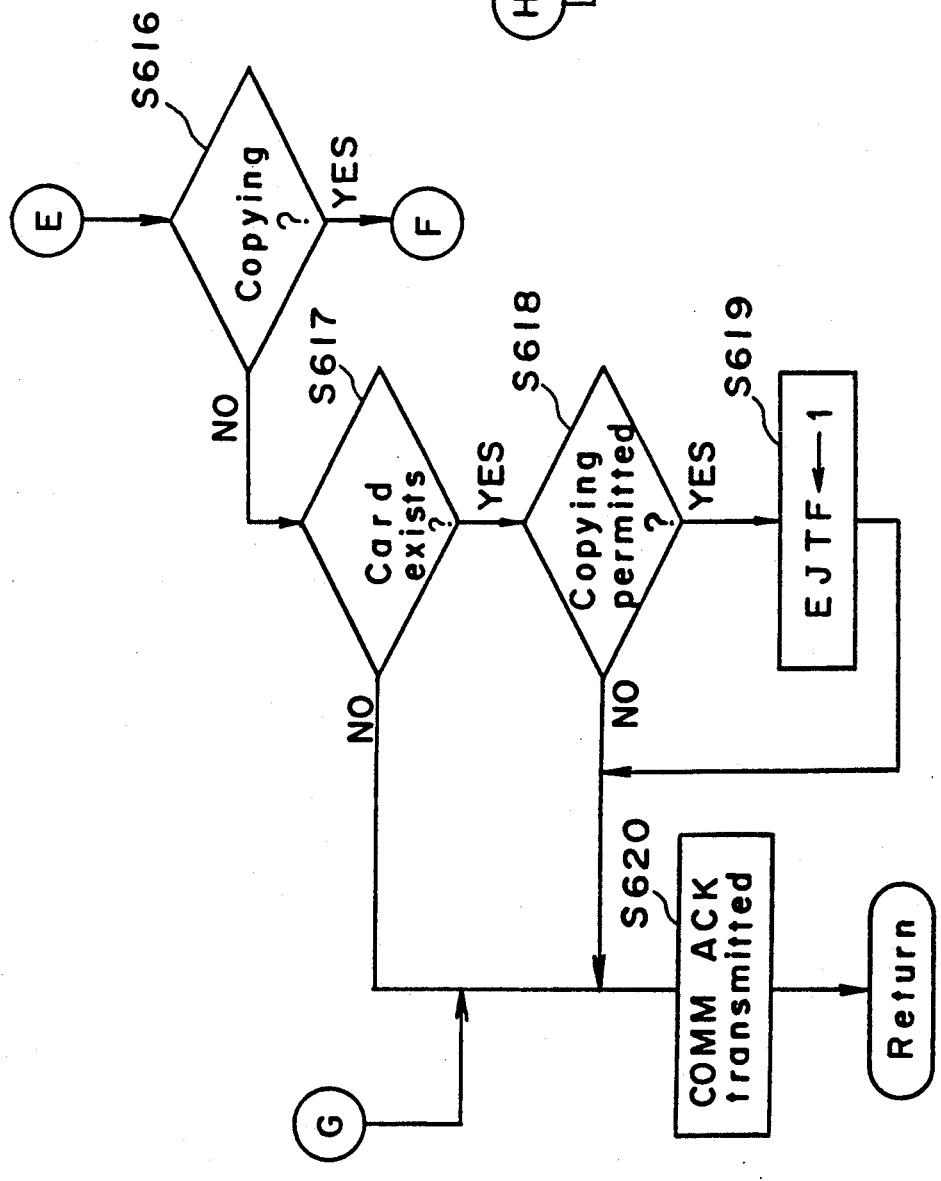
Figure 39D:
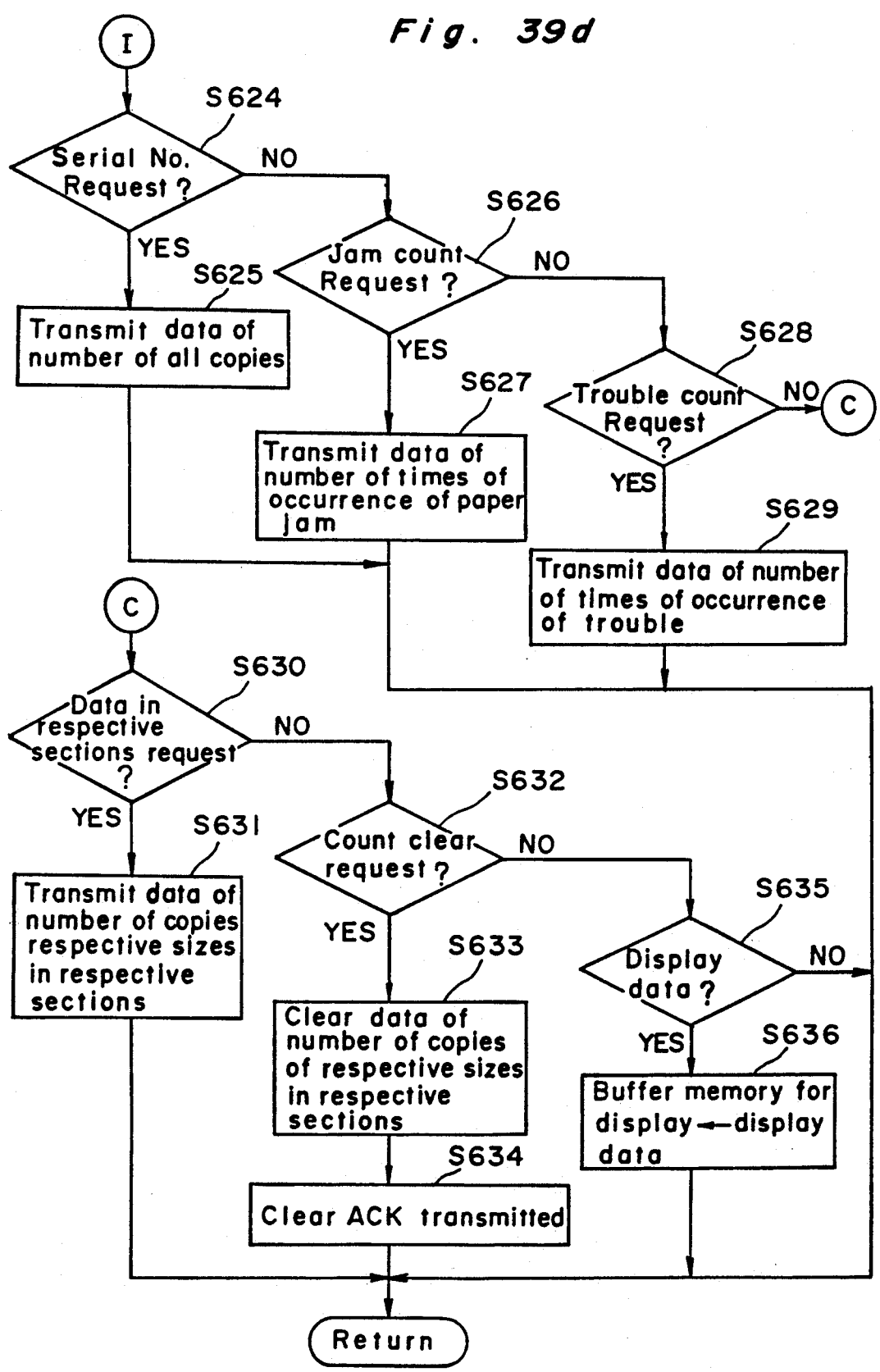

Referring to FIGS. 39a and 39d, it is judged at step S610 whether or not the received data are the mode confirmation signal, it is judged at step S612 whether or not the received data are the cancel signal, it is judged at step S614 whether or not the received data are the processing mode request signal, it is judged at step S615 whether or not the received data are the communication mode request signal, it is judged at step S621 whether or not the received data are the setting mode request signal, it is judged at step S624 whether or not the received data are the serial number request signal, it is judged at step S626 whether or not the received data are the jam count request signal, it is judged at step S628 whether or not the received data are the trouble count request signal, it is judged at step S630 whether or not the received data are the data in respective sections request signal, it is judged at step S632 whether or not the received data are the count clear request signal, and it is judged at step S610 whether or not the received data are the display data signal. If the received data are not the above signals (No at steps S610, S612, S614, S615, S621, S624, S626, S628, S630, S632 and S635), the program flow returns to the main routine, directly.

If the mode confirmation signal is received (Yes at step S610), the present mode is checked in the copy data controller 20 at step S611. If the processing mode (PRCM) is set at step S611, the processing mode acknowledge signal is transmitted to the center control unit 50 through the on-line controller 30, and then, the program flow returns to the original routine. If the communication mode (COMM) is set at step S611, the communication mode acknowledge signal is transmitted to the center control unit 50 through the on-line controller 30, and then, the program flow returns to the original routine. If the processing mode (PRCM) is set at step 611, the processing mode acknowledge signal is transmitted to the center control unit 50 through the on-line controller 30, and then, the program flow returns to the original routine.

If the cancel signal or the processing mode request signal is received (Yes at step S612 or S614), the processing mode acknowledge signal is transmitted to the center control unit 50 trough the on-line controller 30, and then, the program flow returns to the original routine.

If the communication mode request signal is received (Yes at step S615), it is judged at step S616 whether or not the copying operation is being executed in the copying machine 10. If the copying operation is being executed (Yes at step S616), the processing mode acknowledge signal is transmitted to the center control unit 50 through the on-line controller 30, and then, the program flow returns to the original routine. On the other hand, if the copying operation is not being executed therein (No at step S616), it is judged at step S617 whether or not the magnetic card has been inserted in the card data input and output unit 22, and further, it is judged at step S618 whether or not the copying operation is permitted in the copying machine 10.

If the magnetic card has been inserted therein (Yes at step S617) and the copying operation is permitted (Yes at step S618), the ejection flag EJTF is set at one in order to discharge the magnetic card, and then, the program flow goes to step S620. Thereafter, the communication mode acknowledge signal is transmitted to the center control unit 50 through the on-line controller 30, and then, the program flow returns to the original routine.

On the other hand, if the magnetic card has not been inserted therein (No at step S617), or if the copying operation is not permitted (No at step S618) even though the magnetic card has been inserted therein (Yes at step S617), and then, the program flow goes to step S620. Thereafter, the communication mode acknowledge signal is transmitted to the center control unit 50 through the on-line controller 30, and then, the program flow returns to the original routine.

If the processing mode request signal is received (Yes at step S621), it is judged at step S622 of FIG. 39c whether or not the copying operation is prohibited in the copying machine 10, for example, since the section card has not been inserted in the card data input and output unit 22 or a paper jam or a trouble occurs in the copying machine 10. If the copying operation is not prohibited (No at step S622), the program flow goes to step S613, and then, the processing mode acknowledge signal is transmitted to the center control unit 50 through the on-line controller 30. Thereafter, the program flow returns to the original routine. On the other hand, if the copying operation is prohibited (Yes at step S622), the processing mode acknowledge signal is transmitted to the center control unit 50 through the on-line controller 30 at step S623, and then, the program flow returns to the original routine.

If the serial number request signal is received (Yes at step S624), the serial number of the copy data controller 20 and the data of the number of all the copies are transmitted in the format shown in FIG. 12a to the center control unit 50 through the on-line controller 30 at step S625, and then, the program flow returns to the original routine.

If the jam count request signal is received (Yes at step S626), the data of the number of times of occurrence of paper jam at respective positions are transmitted in the format shown in FIG. 12b to the center control unit 50 through the on-line controller 30 at step S627, and then, the program flow returns to the original routine.

If the trouble count request signal is received (Yes at step S628), the data of the number of occurrence of trouble at respective positions are transmitted in the format shown in FIG. 12c to the center control unit 50 through the on-line controller 30 at step S629, and then, the program flow returns to the original routine.

If the data in respective sections request signal is received (Yes at step S630), the data of the number of copies of respective sizes in respective sections are transmitted in the format shown in FIG. 12d to the center control unit 50 through the on-line controller 30 at step S631, and then, the program flow returns to the original routine.

If the count clear request signal is received (Yes at step S632), the data of the number of respective sizes in respective sections stored in the RAM 103 are cleared at step S633, and then, the clear acknowledge signal is transmitted to the center control unit 50 through the on-line controller 30 at step S634. Thereafter, the program flow returns to the original routine.

If the display data signal is received (Yes at step S635), the received display data are stored in the buffer memory 24 for display at step S636, and then, the program flow returns to the original routine.

(6) Process of Center Control Unit

Figure 40:
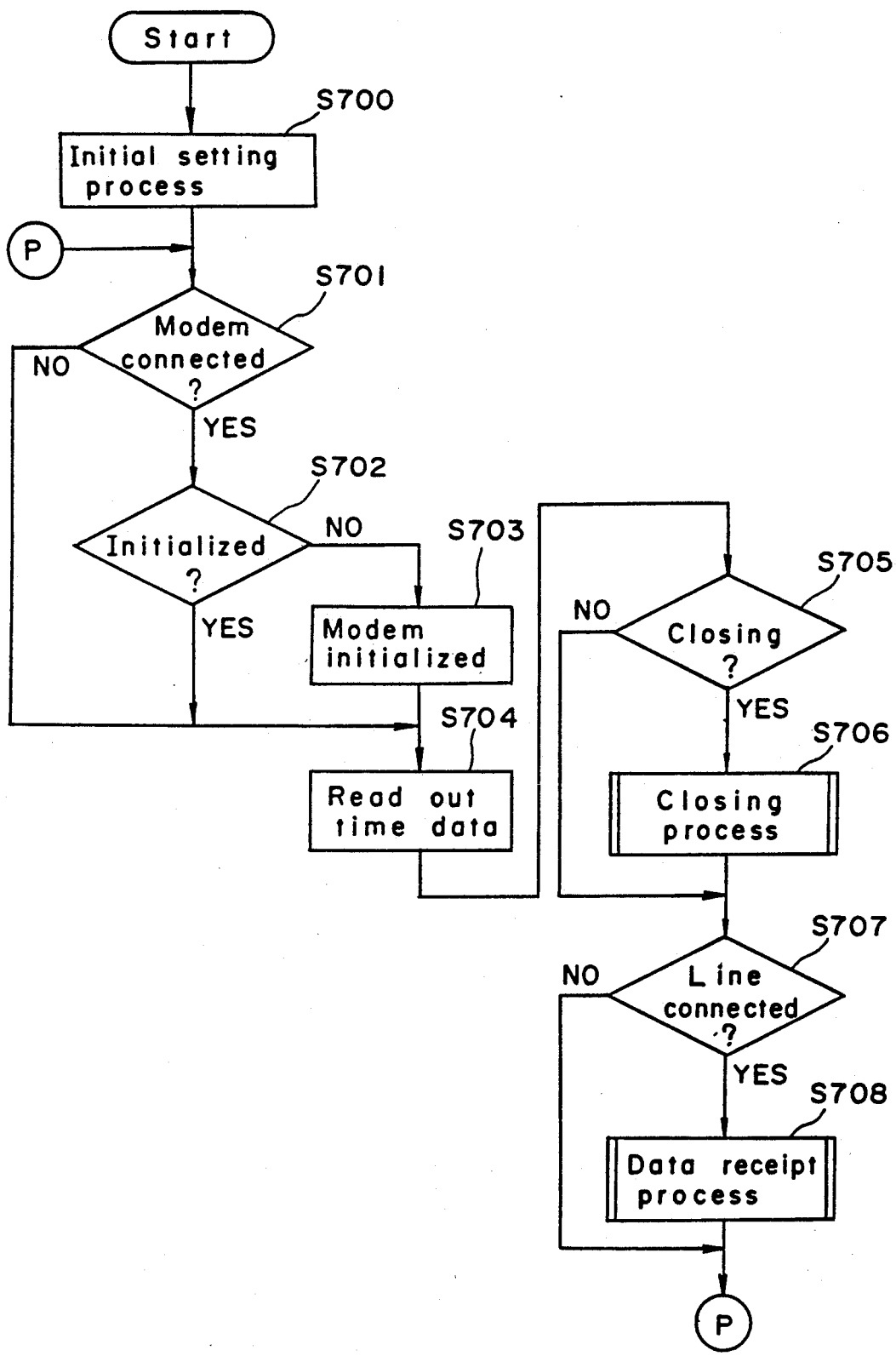
FIG. 40 is a flowchart showing a main routine of the center control unit shown in FIG. 1.

FIG. 40 is a flowchart showing a main routine of the center control unit 50 shown in FIG. 1.

Referring to FIG. 40, first of all, the initial setting process is executed for respective circuits of the center control unit 50 at step S700, and then, it is judged at step S701 whether or not there is the modem 52 in the center control unit 50. If there is no modem 52 therein (No at step S701), the program flow goes to step S704. On the other hand, if there is the modem 52 therein (Yes at step S701), it is judged whether or not the modem 52 has been initialized at step S702. If the modem 52 has been initialized (Yes at step S702), the program flow goes to step S704. On the other hand, if the modem 52 has not initialized (No at step S702), the modem 52 is initialized at step S703, and then, the program flow goes to step S704.

At step S704, data of the present time are read out from the real time clock 304, and then, it is judged at step S705 whether or not the present time coincides with a closing time which is preset using the microcomputer 60 when the copy data are to be summed up. If the present time does not coincide with the closing time (No at step S705), the program flow goes to step S707. On the other hand, if the present time coincides with the closing time (Yes at step S705), a closing process described in detail later is executed at step S706, and then, the program flow goes to step S707.

At step S707, it is judged whether or not the copy data controller 20 is connected to the on-line controller 30 through the telephone line after an incoming call from the on-line controller 30. If the copy data controller 20 is connected to the on-line controller 30 (Yes at step S707), there is executed the data reception process described in detail later at step S708, and then, the program flow goes back to step S701. On the other hand, if the copy data controller 20 is not connected to the on-line controller 30 through the telephone line (No at step S707), the program flow goes back to step S701.

Figure 41:
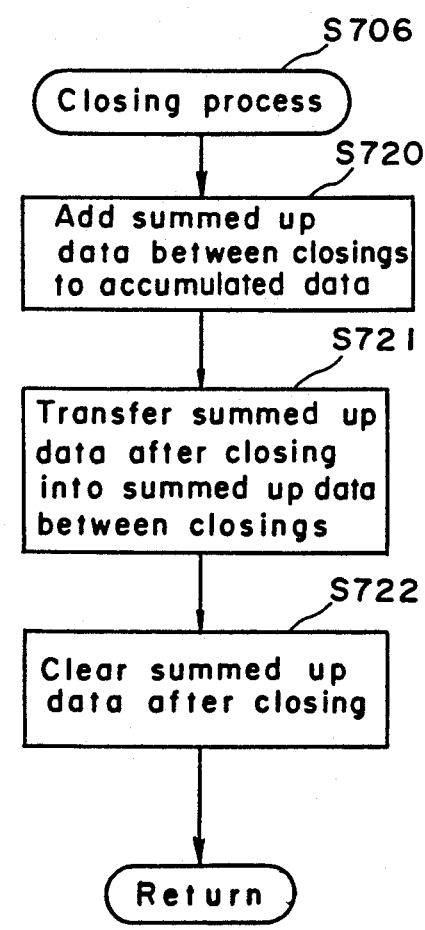
FIG. 41 is a flowchart showing a closing process of a subroutine of the center control unit shown in FIG. 1.

FIG. 41 is a flowchart showing the closing process (step S706 of FIG. 40). The center control unit 50 manages the copy data stored in the file storage unit 61 so as to divide the following three kinds of data every copying machine 10.

(a) Summed up data after closing : the total data of the copy data transferred from the copy data controller 20 after the center control unit 50 executes the closing process.

(b) Summed up data between closings : the total data of the copy data transferred from the copy data controller 20 between the closing time and the next closing time.

(c) Accumulated data : the accumulated data of the copy data up to now. The previous summed up data between closings are added to the accumulated data in the closing process in order to execute the update process.

Referring to FIG. 41, the previous summed up data between closings are added to the accumulated data at step S720, and then, the summed up data after closing are transferred to the summed up data between closings at step S721. Thereafter, the summed up data after closing are cleared at step S722, and then, the program flow returns to the main routine.

Figure 42:
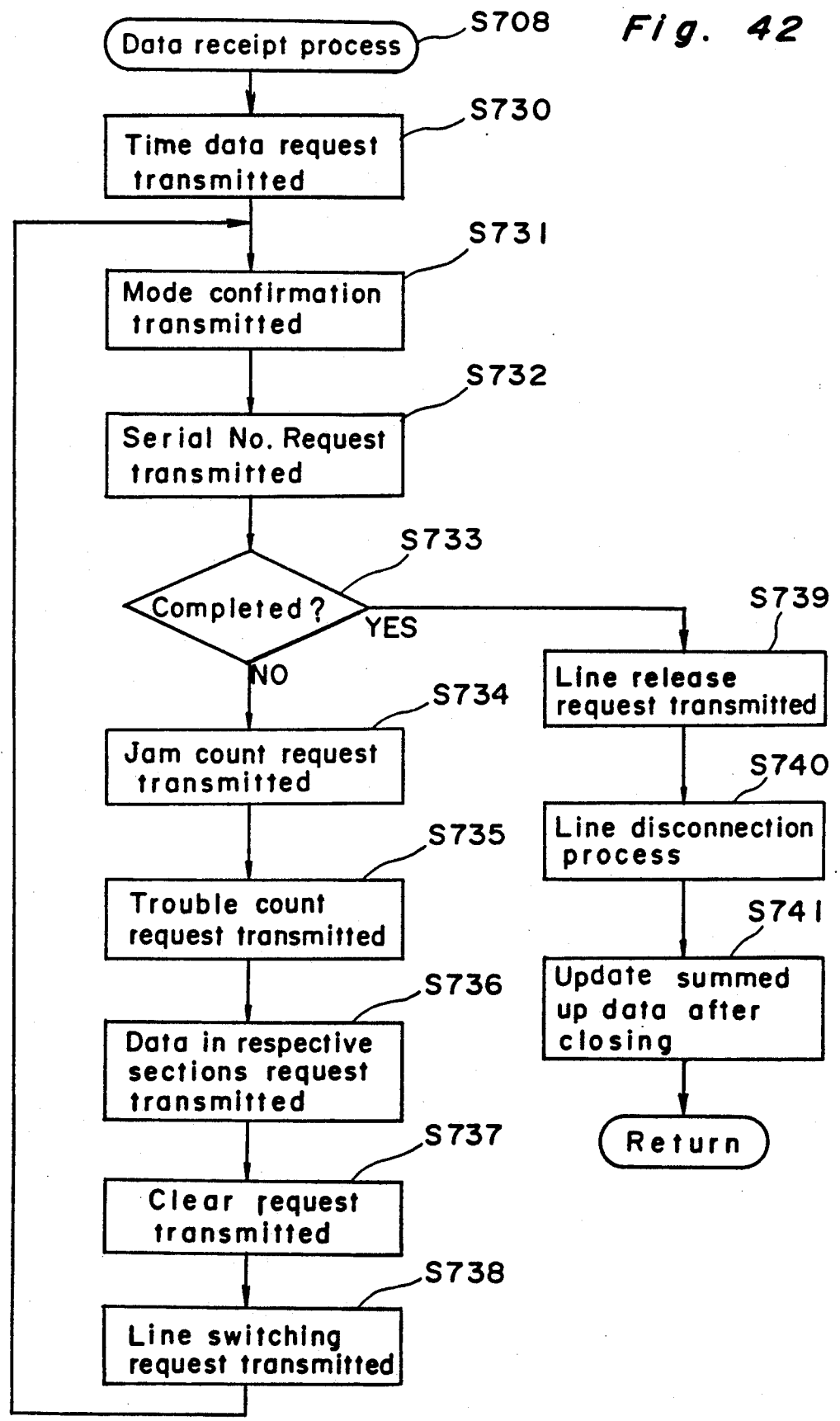
FIG. 42 is a flowchart showing a data receipt process of a subroutine of the center control unit shown in FIG. 1.

FIG. 42 is a flowchart showing the data reception process (step S708 of FIG. 40).

Referring to FIG. 42, first of all, the time request signal is transmitted to the on-line controller 30 at step S730, and then, after the time data are received from the on-line controller 30, the program flow goes to step S731. Then, the mode confirmation signal is transmitted to the on-line controller 30, and the communication mode acknowledge signal is received from the on-line controller 30. Thereafter, the serial number request signal is transmitted to the copy data controller 20 through the on-line controller 30 at step S732, and then, after the serial number data are received therefrom, it is judged at step S733 whether or not the copy data have been received from all the copy data controllers 20 connected to the on-line controller 30 by checking whether or not the received serial number coincides with one of the serial numbers previously received.

If the copy data have been received from all the copy data controllers 20 (Yes at step S733), the program flow goes to step S739. On the other hand, if the copy data have not been received from all the copy data controllers 20 (No at step S733), the program flow goes to step S734.

At steps S734, S735 and S736, there are transmitted to the copy data controller 20 through the on-line controller 30, the jam count request signal, the trouble count request signal, the data in respective sections request signal, respectively, and the data corresponding to respective request signal are received therefrom. Thereafter, the clear request signal is transmitted to the copy data controller 20 through the on-line controller 30 at step S737 in order to clear all the copy data stored in the RAM 103 of the copy data controller 20. Thereafter the line switching request signal is transmitted to the on-line controller 30 at step S738 in order to switch over to the copy data controller 20 of the next channel, and then, the program flow goes back to step S731.

On the other hand, if the data reception is completed (Yes at step S733), the line release request signal is transmitted to the on-line controller 30 at step S739, and then, the copy data controller 20 instructs the modem 52 to execute the line disconnection process at step S740. Thereafter, the received copy data are added to the summed up data after closing at step S741 so as to update the summed up data after closing, and then, the program flow returns to the main routine.

In the present preferred embodiment, there is used the exchange unit 3 provided by a telecommunication company, however, the present invention is not limited to this. An exchange unit such as a private branch exchange unit (PBX) may be used.

In the present preferred embodiment, there are used the telephone lines 4a, 4b and 4c, however, the present invention is not limited this. The other kinds of telecommunication lines such as digital lines may be used.

In the present preferred embodiment, as shown in FIG. 39b, when the magnetic card has been inserted and the copying operation is permitted (Yes at steps S617 and S618), the ejection flag EJTF is set at one at step S619 in order to discharge the magnetic card, and the program flow goes to step S620, the communication mode acknowledge signal is transmitted to the center control unit 50 through the on-line controller 30, thereafter, the program flow returns. However, the present invention is not limited to this. The program flow may go to step S620 without discharging the magnetic card.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. A management system for managing maintenance information of a plurality of image forming apparatuses comprising:

an information management apparatus for managing maintenance information of said plurality of image forming apparatuses;

a plurality of transmission means, connected to said plurality of image forming means, respectively, for transmitting said maintenance information to said information management apparatus through a telephone line, each of said plurality of transmission means comprising storage means for storing said maintenance information to be transmitted and being operable in a first processing mode for executing a transmission process to transmit said maintenance information to said information management apparatus and a second processing mode for executing a process other than said transmission process;

prohibition means, associated with each of said plurality of image forming apparatuses, for prohibiting said associated image forming apparatus connected to a respective said transmission means set in said first processing mode from executing an image forming process;

originating means for executing an origination process so as to connect said information management apparatus to said transmission means through a telephone line;

selection means for selecting either a first communication mode or a second communication mode; and control means for controlling each of said plurality of transmission means and said origination means to execute said origination process after setting in said first processing mode all of said plurality of transmission means from which said maintenance information is to be transmitted when said first communication mode is selected by said selection means upon transmitting said maintenance information, and to set each of said plurality of transmission means in said first processing mode after executing said origination process when said second communication mode is selected by said selection means upon transmitting said maintenance information.

2. In a management system for managing maintenance information of a plurality of image forming apparatuses, a method for transmitting maintenance information of said plurality of image forming apparatuses from a plurality of data control apparatuses respectively connected to said plurality of image forming apparatuses to an information management apparatus through a communication line, including the steps of:

prohibiting said plurality of image forming apparatuses from executing an image forming process; and connecting each of said plurality of data control apparatuses to said information management apparatus through said communication line after completing said prohibiting step.

3. In a management system for managing maintenance information of at least two image forming apparatuses, a method for transmitting maintenance information of first and second image forming apparatuses from first and second data control apparatuses respectively connected to said first and second image forming apparatuses to an information management apparatus through a communication line, including the steps of:

prohibiting said first and second image forming apparatuses from executing an image forming process;

connecting said first data control apparatus to said information management apparatus through said communication line after completing said prohibiting step;

executing a communication process between said first data control apparatus and said information management apparatus;

disconnecting said communication line between said first data control apparatus and said information management apparatus, and connecting a communication line between said second data control apparatus and said information management apparatus;

executing a communication process between said second data control apparatus and said information management apparatus; and disconnecting said communication line between said second data control apparatus and said information management apparatus.

4. A management system for managing maintenance information of an image forming apparatus, comprising:
a telephone;
an information management apparatus for managing maintenance information of said image forming apparatus;
transmission means, connected to said image forming apparatus, for transmitting said maintenance information to said information management apparatus through a telephone line;
connection means for selectively connecting said telephone or said transmission means to said telephone line;
detection means for detecting whether or not said image forming apparatus executes an image forming process; and
prohibition means for prohibiting said transmission means from being connected to said telephone line when it is detected by said detection means that said image forming apparatus executes said image forming process.

5. A management system for managing maintenance information of an image forming apparatus comprising:
a telephone;
an information management apparatus for managing maintenance information of said image forming apparatus;
transmission means, connected to said image forming apparatus, for transmitting said maintenance information to said information management apparatus through a telephone line;
connection means for selectively connecting said telephone or said transmission means to said telephone line;
prohibition means for prohibiting said image forming apparatus from executing an image forming process; and
control means for controlling said prohibition means and said transmission means to transmit said maintenance information after prohibiting said image forming apparatus from executing said image forming during transmission of said maintenance information.

6. A management system for managing maintenance information of an image forming apparatus, comprising:
a telephone;
an information management apparatus for managing maintenance information of said image forming apparatus;
transmission means, connected to said image forming apparatus, for transmitting said maintenance information to said information management apparatus through a telephone line;
connection means for selectively connecting said telephone or said transmission means to said telephone line;
prohibition means for prohibiting said image forming apparatus from executing an image forming process; and
control means for controlling said prohibition means and said connection means to connect said transmission means to said telephone line after prohibiting said image forming apparatus from executing said image forming process during transmission of said maintenance information.

7. A management system for managing maintenance information of an image forming apparatus, comprising:
a telephone;
an information management apparatus for managing maintenance information of said image forming apparatus;
transmission means, connected to said image forming apparatus, for transmitting said maintenance information to said information management apparatus through a telephone line;
connection means for selectively connecting said telephone or said transmission means to said telephone line;
prohibition means for prohibiting said image forming apparatus from executing an image forming process;
detection means for detecting whether or not the execution of said image forming process is prohibited; and
control means for controlling said connection means to connect said transmission means to said telephone line only when it is detected by said detection means that the execution of said image forming process is prohibited.

8. The system as claimed in claim 7, wherein the execution of said image forming process is prohibited by said prohibition means when a paper jam occurs in said image forming apparatus.

9. A management system for managing maintenance information of an image forming apparatus, comprising:
a telephone;
an information management apparatus for managing maintenance information of said image forming apparatus;
transmission means, connected to said image forming apparatus, for transmitting said maintenance information to said information management apparatus through a telephone line;
connection means for selectively connecting said telephone or said transmission means to said telephone line;
detection means for detecting whether or not said telephone is being used; and
first control means for controlling said connection means to connect said transmission means to said telephone line when it is detected by said detection means that said telephone is not used and when a predetermined condition occurs for transmitting said maintenance information;
wherein said first control means prohibits said transmission means from being connected to said telephone line when it is detected by said detection means that said telephone is being used and when said predetermined condition occurs and subsequently controls said connection means to connect said transmission means to said telephone line when it is detected by said detection means that said telephone is not being used.

10. The system as claimed in claim 9,
wherein said predetermined condition includes first and second conditions;
said first control means waits for a predetermined time when it is detected by said detection means that said telephone is being used in the case that said first condition occurs, and controls said connection means to connect said transmission means to said telephone line when it is detected by said detection means that said telephone is not being used after said predetermined time has elapsed, and
said control means supervises a usage state of said telephone when it is detected by said detection means that said telephone is being used in the case that said second condition occurs, and controls said connection means to connect said transmission means to said telephone lie as son as it is detected by said detection means that said telephone is not being used.

11. The system as claimed in claim 10,
wherein said connection means comprises a count means for counting a present time, and storage means for storing a predetermined origination time, and
said first condition is that the present time counted by said count means coincides with said predetermined origination time.

12. The system as claimed in claim 10, further comprising count means for counting a number of papers on which images are formed by said image forming apparatus,
wherein said first condition is that said count means counts a predetermined value.

13. The system as claimed in claim 10, further comprising second detection means for detecting an abnormal state of said image forming apparatus,
wherein said second condition occurs when said second detection means detects said abnormal state of said image forming apparatus.

14. The system as claimed in claim 11, further comprising second detection means for detecting an abnormal state of said image forming apparatus,
wherein said second condition occurs when said second detection means detects said abnormal state of said image forming apparatus.

15. The system as claimed in claim 9,
wherein said transmission means is operable in a first processing mode for transmitting said maintenance information and a second processing mode for executing a process other than said transmission process, and
said system further comprises:
first prohibition means for prohibiting said first processing mode from being set while said image forming apparatus executes said image forming process;
second prohibition means for prohibiting said image forming apparatus from executing said image forming process; and
second control means for controlling said second prohibition means and said transmission means to set said first processing mode after prohibiting said image forming apparatus from executing said image forming process upon transmitting said maintenance information.

16. The system as claimed in claim 15,
wherein said transmission means comprises a storage means for storing said maintenance information to be transmitted, and said transmission means updates said maintenance information stored in said storage means in said second processing mode.

17. The system as claimed in claim 9, further comprising:
operation detection means for detecting an operation state of said image forming apparatus; and
prohibition means for prohibiting said transmission means from transmitting said maintenance information responsive to a detection result of said operation detection means.

18. In a management system for managing maintenance information of at least two image forming apparatuses, a method for transmitting maintenance information of first and second image forming apparatuses from first and second data control apparatuses respectively connected to said first and second image forming apparatuses to an information management apparatus through an on-line controller and a communication line, including the steps of:
connecting said on-line controller to said information management apparatus through said communication line;
prohibiting said first image forming apparatus from executing an image forming process and connecting said first data control apparatus to said on-line controller;
executing a communication process between said first data control apparatus and said information management apparatus;
prohibiting said second image forming apparatus from executing an image forming process and connecting said second data control apparatus to said on-line controller; and
executing a communication process between said second data control apparatus and said information management apparatus.

19. A management system for managing maintenance information of an image forming apparatus, comprising:
an information management apparatus for managing maintenance information of said image forming apparatus; and
transmission means, connected to said image forming apparatus, for transmitting said maintenance information to said information management apparatus through a telephone line;
said transmission means comprising:
first means for transmitting said maintenance information to said information management apparatus when a first condition for transmitting said maintenance information occurs; and
second means for transmitting said maintenance information to said information management apparatus when a second condition, which is different from said first condition, occurs;
wherein said first transmitting means transmits said maintenance information after waiting for a predetermined time when said telephone line is being used in the case that said first condition occurs, and
said second transmitting means supervises usage of said telephone line when said telephone line is being used in the case that said second condition occurs, and transmits said maintenance information as soon as said telephone line is not being used.

20. The system as claimed in claim 19, further comprising count means for counting a number of papers on which images are formed by said image forming apparatus, and said first condition is that said count means counts a predetermined value.

21. The system as claimed in claim 19, further comprising detection means for detecting an abnormal state of said image forming apparatus, and said second condition is that said abnormal state is detected by said detection means.

22. The system as claimed in claim 21, further comprising:
   count means for counting a present time; and
   storage means for storing a predetermined origination time,
   wherein said first condition is that said present time counted by said count means coincides with said predetermined origination time stored in said storage means.

23. A management system for managing maintenance information of an image forming apparatus, comprising:
   an information management apparatus for managing maintenance information of said image forming apparatus;
   transmission means, connected to said image forming apparats, for transmitting said maintenance information to said information management apparatus through a telephone line;
   first transmission request means, connected to said image forming apparatus and said transmission means, for requesting said transmission means to transmit said maintenance information to said information management apparatus at regular intervals; and
   second transmission request means, connected t said image forming apparatus and said transmission means, for requesting said transmission means to transmit said maintenance information to said information management apparatus at irregular intervals;
   wherein, in response to said telephone line being busy, said transmission means executes either a first or second operation based on whether transmission was requested by said first or second transmission request means, respectively.

24. The system as claimed in claim 23,
   wherein said first transmission request means requests to transmit said maintenance information when the present time becomes a predetermined time.

25. The system as claimed in claim 23,
   wherein said first transmission request means requests to transmit said maintenance information when the number of papers on which images are formed by said image forming apparatus becomes a predetermined value.

26. The system as claimed in claim 23,
   wherein said second transmission request means requests to transmit said maintenance information when an abnormal state occurs in said image forming means.

27. The system as claimed in claim 24,
   wherein said second transmission request means requests to transmit said maintenance information when an abnormal state occurs in said image forming apparatus.

28. A management system for managing maintenance information of an image forming apparatus, comprising:
   an information management apparatus for managing maintenance information of said image forming apparatus;
   transmission means, connected to said image forming apparatus, for transmitting said maintenance information to said information management apparatus through a communication line; and
   means for prohibiting said transmission means from beginning to transmit said maintenance information while said image forming apparatus executes an image forming process.

29. A management system for managing maintenance information of an image forming apparatus, comprising:
   an information management apparatus for managing maintenance information of said image forming apparatus;
   transmission means, connecting to said image forming apparatus, for transmitting said maintenance information to said information management apparatus through a communication line; and
   means for prohibiting said image forming apparatus from executing an image foring process while said transmission means transmits said maintenance information.

30. A management system for managing maintenance information of an image forming apparatus, comprising:
   a key member;
   an acceptance member for accepting said key member;
   means for permitting said image forming apparatus to execute an image forming process when said key member is inserted into said acceptance member, and for prohibiting said image forming apparatus from executing said image forming process when said key member is discharged from said acceptance member;
   discharge means or automatically discharging said key member from said acceptance member;
   an information management apparatus for managing maintenance information of said image forming apparatus;
   transmission means, connected to said image forming apparatus, for transmitting said maintenance information to said information management apparatus through a communication line; and
   control means for enabling said discharge means and enabling said transmission means to transmit said maintenance information when a predetermined condition for transmitting said maintenance information occurs.

31. A management system for managing maintenance information of a plurality of image forming apparatuses comprising:
   an information management apparatus for managing maintenance information of said plurality of image forming apparatuses;
   a plurality of transmission means, connected to said plurality of image forming apparatuses, respectively, for transmitting said maintenance information to said information management apparatus through telephone lines, each of said plurality of transmission means being operable in a first processing mode for executing a first process to transmit said maintenance information to said information management apparatus and in a second processing mode for executing a second process different from said first process;

origination means for executing an origination process so as to connect each of said plurality of transmission means to said information management apparatus; and control means for controlling each of said plurality of transmission means and said origination means to enable said origination means to execute said origination process after setting in said first processing mode all of said plurality of transmission means from which said maintenance information is to be transmitted.

32. The system as claimed in claim 31, wherein each of said plurality of transmission means comprises storage means for storing said maintenance information to be transmitted, and updates said maintenance information stored in said storage means in said processing mode.

33. The system as claimed in claim 32, further comprising means, associated with each of said plurality of image forming apparatuses, for prohibiting said associated image forming apparatus wherein said respective transmission means is set in said first processing mode, from executing an image forming process.

34. The system as claimed in claim 33, further comprising means, associated with each of said plurality of image forming apparatuses, for prohibiting said respective transmission means which is connected to said associated image forming apparatus from being set in said first processing mode when said associated image forming apparatus is executing an image forming process, wherein said control mans controls said transmission means and said origination means, when a least one of said plurality of transmission means is prohibited from being set in said first processing mode, to execute said origination process after setting in said first processing mode transmission means which can be set in said first processing mode upon transmitting said maintenance information.

35. A management system for managing maintenance information of a plurality of image forming apparatuses, comprising:

an information management apparatus for managing maintenance information of said plurality of image foring apparatuses;

a plurality of transmission means, connected to said plurality of image forming means, respectively, for transmitting said maintenance information to said information management apparatus, each of said plurality of transmission means being operable in a first processing mode for executing a first process to transmit said maintenance information to said information management apparatus and a second processing mode for executing a second process different from said first process;

communication means for communicating with said information management apparatus through a telephone line;

origination means for executing an origination process so as to connect said communication means to said information management apparatus through said telephone line;

connection means for sequentially connecting each of said plurality of transmission mans to said communication means so as to transmit said maintenance information from each of said plurality of transmission means to said information management apparatus when said telephone line is connected between said communication means and said information management apparatus; and control means for controlling said plurality of transmission means and said origination means to execute said origination process after setting in said first processing mode all of said plurality of transmission means from which said maintenance information is to be transmitted.

36. A management system for managing maintenance information of a plurality of image foring apparatuses comprising:

an information management apparatus for managing maintenance information of said plurality of image forming apparatus;

a plurality of transmission means, connected to said plurality of image forming means, respectively, for transmitting said maintenance information to said information management apparatus through telephone lines, each of said plurality of transmission means being operable in a first processing mode for executing a first process to transmit said maintenance information to said information management apparatus and a second processing mode for executing a second process different from said first process;

origination means for executing an origination process so as to connect said information management apparatus to each of said plurality of transmission means through a telephone line; and control means for controlling each of said plurality of transmission means to set them in said first processing mode after executing said origination process upon transmitting said maintenance information.

37. The system as claimed in claim 36, wherein said transmission means comprises storage means for storing said maintenance information, and updates said information stored in said storage means in said second processing mode.

38. The system as claimed in claim 37, further comprising means, associated with each of said plurality of image forming apparatuses, for prohibiting said associated image foring apparatus, wherein said respective transmission means is set in said first processing mode, from executing an image forming process.

39. A management system for managing maintenance information of a plurality of image forming apparatuses comprising:

an information management apparatus for managing maintenance information of said plurality of image forming apparatuses;

a plurality of transmission means, connected to said plurality of image forming means, respectively, for transmitting said maintenance information to said information management apparatus, each of said plurality of transmission means being operable in a first processing mode for executing a first process to transmit said maintenance information to said information management apparatus and in a second processing mode for executing a second process said transmission first process;

communication means for communicating with said information management apparatus through a telephone line;

origination means for executing an origination process so as to connect said information management apparatus to said communication means through said telephone line;

connection means for sequentially connecting each of said plurality of transmission means to said communication means so as to transmit said maintenance information from each of said plurality of transmission means to said information management apparatus when said telephone line is connected between said communication means and said information management apparatus; and control means for controlling each of said plurality of transmission means so as to set it in said first processing mode after said telephone line is connected between said communication means and said information management apparatus by said origination process upon transmitting said maintenance information.

40. The system as claimed in claim 39, further comprising:

selection means for sequentially selecting each of said plurality of transmission means after said telephone line is connected between said communication means and said information management apparatus; and means for controlling said connection means to sequentially connect each of said plurality of transmission means selected by said selection means to said communication means;

wherein said control means controls each of said plurality of transmission means so as to sequentially set each of said plurality of transmission means selected by said selection means in said first processing mode.

41. The system as claimed in claim 40, further comprising:

prohibition means for prohibiting said transmission means connected to said image forming apparatus which is executing an image forming process from being set in said first processing mode, wherein said selection means selects said transmission means to be next selected when said transmission means to be selected is prohibited by prohibition means from being set in said first processing mode.

* * * * *